US011700086B2

(12) United States Patent
Park et al.

(10) Patent No.: US 11,700,086 B2
(45) Date of Patent: Jul. 11, 2023

(54) METHOD AND APPARATUS FOR USING HARQ IN WIRELESS COMMUNICATIONS

(71) Applicant: Innovative Technology Lab Co., Ltd., Seoul (KR)

(72) Inventors: Dong Hyun Park, Seoul (KR); Ki Bum Kwon, Seoul (KR); Hyo Sun Yang, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 305 days.

(21) Appl. No.: 16/993,719

(22) Filed: Aug. 14, 2020

(65) Prior Publication Data

US 2021/0050953 A1 Feb. 18, 2021

(30) Foreign Application Priority Data

Aug. 16, 2019 (KR) .......................... 10-2019-0100509
Feb. 14, 2020 (KR) .......................... 10-2020-0018609

(51) Int. Cl.
*H04W 4/00* (2018.01)
*H04L 1/1812* (2023.01)
(Continued)

(52) U.S. Cl.
CPC ......... *H04L 1/1819* (2013.01); *H04B 7/0456* (2013.01); *H04L 5/0055* (2013.01);
(Continued)

(58) Field of Classification Search
None
See application file for complete search history.

(56) References Cited

U.S. PATENT DOCUMENTS 10,785,753 B1\* 9/2020 Li ...................... H04L 5/0044
2017/0289733 A1 10/2017 Rajagopal et al.
(Continued)

FOREIGN PATENT DOCUMENTS

CN 108923894 A 11/2018
KR 101215690 B1 12/2012
(Continued)

OTHER PUBLICATIONS

"3rd Generation Partnership Project; Technical Specification Group Radio Access Network; NR; Physical layer procedures for control (Release 15)", 3GPP TS 38.213 V15.6.0, Jun. 2019, pp. 1-107, 3GPP Organizational Partners.
(Continued)

*Primary Examiner* — Zewdu A Beyen

(57) ABSTRACT

Sidelink downlink control information (SL DCI) associated with transmission of one or more sidelink signals may be communicated. A wireless user device may transmit, based on the SL DCI and to one or more second wireless user devices, the one or more sidelink signals via a first quantity of sidelink channel resources. The wireless user device may receive first sidelink HARQ feedback information responsive to the one or more sidelink signals. The wireless user device may determine, based on a sidelink HARQ feedback timing, a time interval to transmit the first sidelink HARQ feedback information. The wireless user device may determine, based on the first quantity, a sidelink HARQ codebook. The wireless user device may transmit, during the time interval, based on the sidelink HARQ codebook, and to the base station, an uplink signal indicating the first sidelink HARQ feedback information.

34 Claims, 27 Drawing Sheets

(51) Int. Cl.
*H04B 7/0456* (2017.01)
*H04W 76/27* (2018.01)
*H04W 72/1263* (2023.01)
*H04L 5/00* (2006.01)
*H04W 4/40* (2018.01)
*H04W 72/0446* (2023.01)
*H04W 72/23* (2023.01)
*H04W 92/18* (2009.01)

(52) U.S. Cl.
CPC ............. *H04L 5/0094* (2013.01); *H04W 4/40* (2018.02); *H04W 72/0446* (2013.01); *H04W 72/1263* (2013.01); *H04W 72/23* (2023.01); *H04W 76/27* (2018.02); *H04W 92/18* (2013.01)

(56) References Cited

U.S. PATENT DOCUMENTS

| | | | |
|---|---|---|---|
| 2018/0006791 | A1 | 1/2018 | Marinier et al. |
| 2019/0044667 | A1 | 2/2019 | Guo et al. |
| 2019/0103943 | A1* | 4/2019 | Wang ................... H04L 1/1854 |
| 2019/0174530 | A1 | 6/2019 | Kim et al. |
| 2020/0029318 | A1* | 1/2020 | Guo .................... H04W 72/042 |
| 2020/0367095 | A1* | 11/2020 | Pan ...................... H04L 1/1874 |

FOREIGN PATENT DOCUMENTS

| | | | |
|---|---|---|---|
| WO | 2017172488 | A1 | 10/2017 |
| WO | 2018201448 | A1 | 11/2018 |
| WO | 2019029652 | A1 | 2/2019 |

OTHER PUBLICATIONS

"3rd Generation Partnership Project; Technical Specification Group Radio Access Network; NR; Medium Access Control (MAC) protocol specification (Release 15)", 3GPP TS 38.321 V15.6.0, Jun. 2019, pp. 1-78, 3GPP Organizational Partners.

"3rd Generation Partnership Project; Technical Specification Group Radio Access Network; NR; Radio Resource Control (RRC) protocol specification (Release 15)", 3GPP TS 38.331 V15.6.0, Jun. 2019, pp. 1-519, 3GPP Organizational Partners.

International Search Report for International Patent Application No. PCT/KR2020/010852, dated Nov. 20, 2020.

Written Opinion of The International Searching Authority for International Patent Application No. PCT/KR2020/010852, dated Nov. 20, 2020.

"Examination report under sections 12 & 13 of the Patents Act, 1970 and the Patents Rules, 2003" for Application No. 202217013164 from Intellectual Property India, dated Dec. 5, 2022.

* cited by examiner

FIG. 5
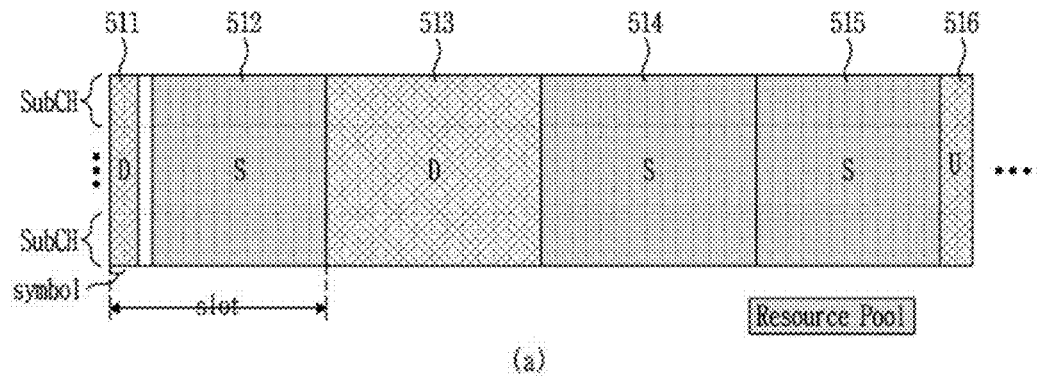
(a)
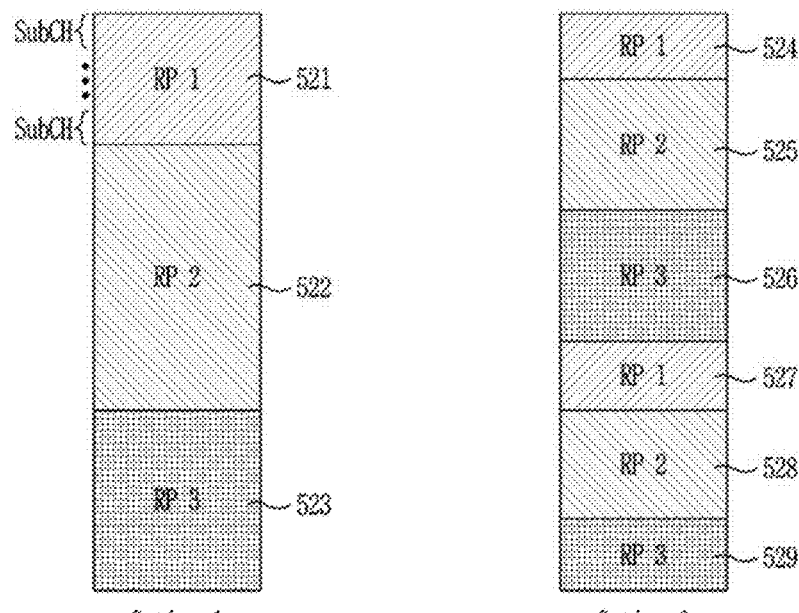
(b)

FIG. 14

| | unicast#0 | unicast#1 | Groupcast#0 (ACK/NACK) | | Groupcast#1 (NACK) |
|---|---|---|---|---|---|
| | Rx UE#0 (Enabled) | Rx UE#1 (Disabled) | G_UE_ID#0 (Rx UE#2) | G_UE_ID#1 (Rx UE#3) | Rx UE#4/5 |
| Associated PSFCH occasions for a PUCCH | slot#1 | | slot#3 | | slot#3 |
| Associated PSFCH occasions for a PSFCH | slot#0 | slot#1 | slot#2 | | slot#3 |
| bit order in codebook | b0 | b1 | b2 | b3 | b4 |
| SL HARQ codebook size (5bits) | SL A/N | NACK | SL A/N | SL A/N | SL NACK |

| Uu HARQ codebook | SL HARQ codebook | | | | |
|---|---|---|---|---|---|
| Uu HARQ bits (5bits) | SL A/N | NACK | SL A/N | SL A/N | SL A/N |

METHOD AND APPARATUS FOR USING HARQ IN WIRELESS COMMUNICATIONS

CROSS-REFERENCE TO RELATED APPLICATIONS

This application claims priority from and the benefit of Korean Patent Application Nos. 10-2019-0100509, filed on Aug. 16, 2019, and 10-2020-0018609, filed on Feb. 14, 2020, which are hereby incorporated by reference in their entirety.

BACKGROUND

1. Field

The present disclosure may provide a method and apparatus for wireless communications. One or more device may determine a Hybrid Automatic Repeat Request (HARQ) codebook in wireless communications, such as new radio (NR) vehicle-to-everything (V2X) communications and any other wireless communications.

2. Discussion of the Background

International Mobile Telecommunication (IMT) framework and standard have been developed by the International Telecommunication Union (ITU). Also, continuous discussion for 5-th generation (5G) communication is ongoing through a program called "IMT for 2020 and beyond".

To satisfy the requirements requested by "IMT for 2020 and beyond", various proposals have been made to support various numerologies about a time-frequency resource unit standard by considering various scenarios, service requirements, and potential system compatibility in a 3-rd Generation Partnership Project (3GPP) new radio (NR) system.

Vehicle-to-everything (V2X) communication may include a communication method of exchanging or sharing road infrastructures during driving and information, such as traffic conditions, through communication with other vehicles. V2X may include, for example, vehicle-to-vehicle (V2V), which may refer to long term evolution (LTE)-based communication between vehicles, vehicle-to-pedestrian (V2P), which may refer to LTE-based communication between a vehicle and a user equipment (UE) carried by a user, and vehicle-to-infrastructure/network (V2I/N), which may refer to LTE-based communication between a vehicle and a roadside unit (RSU)/network. The RSU may be a transportation infrastructure entity configured by a base station or a fixed terminal, such as, an entity that transmits a speed notification to a vehicle.

Low latency and high reliability may need to be secured for V2X communication services. To secure low latency and high reliability in V2X communication services, various examples including determining a HARQ feedback transmission timing in the case of transmitting HARQ feedback information in V2X communication will be described herein.

SUMMARY

A wireless user device (e.g., transmitting user equipment (Tx UE)) may report sidelink HARQ feedback information to a base station (e.g., for V2X communication services). The wireless user device may need to report feedback information (e.g., on a Uu link) to the base station. The wireless user device may transmit a plurality of pieces of HARQ feedback information associated with different links (e.g., Uu link/SL link) to the base station (e.g., through the same physical resource). One or more example HARQ codebook determination methods will be described herein.

An aspect of the present disclosure may provide a method and apparatus for determining a Hybrid Automatic Repeat Request (HARQ) codebook in vehicle-to-everything (V2X) communication.

An aspect of the present disclosure may provide a method and apparatus for semi-statically provide a sidelink HARQ codebook in V2X communication.

An aspect of the present disclosure may provide a method and apparatus for dynamically determining a sidelink HARQ codebook in V2X communication.

A method may include transmitting, by a transmitting user equipment (Tx UE), HARQ feedback information in an NR V2X system. Here, the HARQ feedback information transmitting method may include transmitting a Physical Sideline Shared Channel (PSSCH) to at least one receiving UE (Rx UE) based on a scheduled PSSCH occasion, receiving feedback information about the PSSCH transmission from the at least one Rx UE, configuring a sidelink HARQ bit through a sidelink HARQ codebook configured based on at least one of PSSCH/Physical Sidelink Feedback Channel (PSFCH) occasion associated with an uplink slot, a sidelink data transmission type within the PSSCH occasion, and an associated sidelink HARQ report scheme, and multiplexing the configured sidelink HARQ bit and uplink HARQ bit and transmitting the same to a base station.

The base station may transmit to the wireless user device, one or more radio resource control (RRC) signals indicating one or more parameters associated with sidelink communication between wireless user devices. The base station may transmit sidelink downlink control information (SL DCI) comprising a first indicator field that indicates a sidelink hybrid automatic repeat request (HARQ) feedback timing. The wireless user device may transmit, based on the SL DCI, to one or more second wireless user devices, a plurality of sidelink signals via a first quantity of sidelink channel resources. The wireless user device may receive, during a first time interval and from the one or more second wireless user devices, first sidelink HARQ feedback information responsive to the plurality of sidelink signals. The wireless user device may determine, based on the sidelink HARQ feedback timing and based on the first time interval, a second time interval to transmit the first sidelink HARQ feedback information to the base station. The wireless user device may determine, based on the first quantity, a sidelink HARQ codebook. The wireless user device may transmit, during the second time interval and based on the sidelink HARQ codebook and to the base station, an uplink signal indicating the first sidelink HARQ feedback information.

The base station may transmit, to the wireless user device, sidelink downlink control information (SL DCI) associated with transmission of one or more sidelink signals. The wireless user device may transmit, based on the SL DCI and to one or more second wireless user devices, the one or more sidelink signals via a first quantity of sidelink channel resources. The wireless user device may receive, during a first time interval and from the one or more second wireless user devices, first sidelink HARQ feedback information responsive to the one or more sidelink signals. The wireless user device may determine, based on a sidelink HARQ feedback timing and based on the first time interval, a second time interval to transmit the first sidelink HARQ feedback information. The wireless user device may determine, based on the first quantity, a sidelink HARQ codebook (e.g., the size of the sidelink HARQ codebook). The wireless user device may transmit, during the second time interval, based on the sidelink HARQ codebook, and to the base station, an uplink signal indicating the first sidelink HARQ feedback information.

The HARQ feedback information transmitting method may include transmitting a PSSCH to at least one wireless user device (e.g., an Rx UE based on a scheduled PSSCH occasion, receiving feedback information about the PSSCH transmission from the at least one wireless user device (e.g., the Rx UE), configuring a sidelink HARQ bit through a sidelink HARQ codebook dynamically configured based on a Counter_Sidelink assignment indicator (C_SAI) value, and multiplexing the configured sidelink HARQ bit and uplink HARQ bit and transmitting the same to a base station.

BRIEF DESCRIPTION OF THE DRAWINGS

FIG. 5 illustrates an example of a sidelink resource pool.

FIG. 14 illustrates an example method for configuring a sidelink HARQ codebook.

FIG. 15 illustrates an example method for configuring a HARQ codebook by considering a sidelink multicarrier.

FIG. 24 illustrates an example of dynamically determining a sidelink HARQ codebook if an SCS of an active DL BWP differs from that of an active SL BWP.

DETAILED DESCRIPTION

Figure 1:
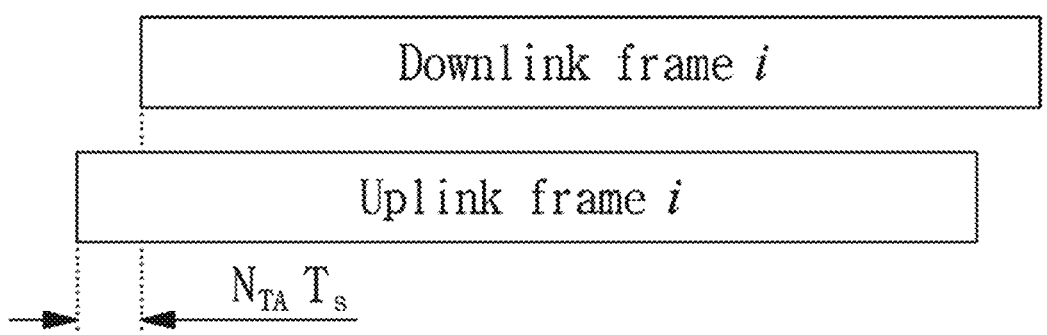
FIG. 1 illustrates an example frame structure for downlink/uplink transmission.

Various embodiments of the disclosure will be described more fully hereinafter with reference to the accompanying drawings such that one of ordinary skill in the art to which the present disclosure pertains may easily implement the embodiments. However, the present disclosure may be implemented in various forms and is not limited to the embodiments described herein.

In describing the embodiments, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to", "coupled to", or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an embodiment may be referred to as a second element in another element. Likewise, a second element in an embodiment may be referred to as a first element in another embodiment.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed embodiment is also included in the scope of the disclosure.

Herein, elements described in various embodiments may not be necessarily essential and may be partially selectable. Therefore, an embodiment including a partial set of elements described in an embodiment is also included in the scope of the disclosure. Also, an embodiment that additionally includes another element to elements described in various embodiments is also included in the scope of the disclosure.

Further, the description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto. Also, the term "NR system" used herein is used as an example of a wireless communication system capable of supporting various subcarrier spacings (SCSs). However, the term "NR system" itself is not limited to the wireless communication system that supports the plurality of SCSs.

FIG. 1 illustrates an example of an NR frame structure and a numerology according to an embodiment of the present disclosure.

In NR, a basic unit of a time domain may be $T_c = 1/(\Delta f_{max} \cdot N_f)$. Here, $\Delta f_{max} = 480^{SM} 10^3$ and $N_f = 4096$. Also, $\kappa = T_s/T_c = 64$ may be a constant about a multiple relationship between an NR time unit and an LTE time unit. In LTE, $T_s = 1/(\Delta f_{ref} \cdot N_{f,ref})$, $\Delta f_{ref} = 15 \cdot 10^3$ Hz, and $N_{f,ref} = 2048$ may be defined as a reference time unit.

Frame Structure

Referring to FIG. 1, a time structure of a frame for a downlink/uplink (DL/UL) transmission may include $T_f (\Delta f_{max} N_f/100) \cdot T_s = 10$ ms. Here, a single frame may include 10 subframes corresponding to $T_{sf} = (\Delta f_{max} N_f/1000) \cdot T_s = 1$ ms. A number of consecutive orthogonal frequency division multiplexing (OFDM) symbols per subframe may be $N_{symb}^{subframe,\mu} = N_{symb}^{slot} N_{slot}^{subframe,\mu}$. Also, each frame may be divided into two half frames and the half frames may include 0~4 subframes and 5~9 subframes. Here, half frame 1 may include 0~4 subframes and half frame 2 may include 5~9 subframes.

Here, a transmission timing of uplink transmission frame i is determined based on a downlink reception timing at a UE according to the following Equation 1.

In Equation 1, $N_{TA,offset}$ denotes a TA offset value occurring due to a duplex mode difference and the like. Basically, in a frequency division duplex (FDD), $N_{TA,offset} = 0$. In a time division duplex (TDD), $N_{TA,offset}$ may be defined as a fixed value by considering a margin for a DL-UL switching time.

$$T_{TA} = (N_{TA} + N_{TA,offset}) T_c$$

Figure 2:
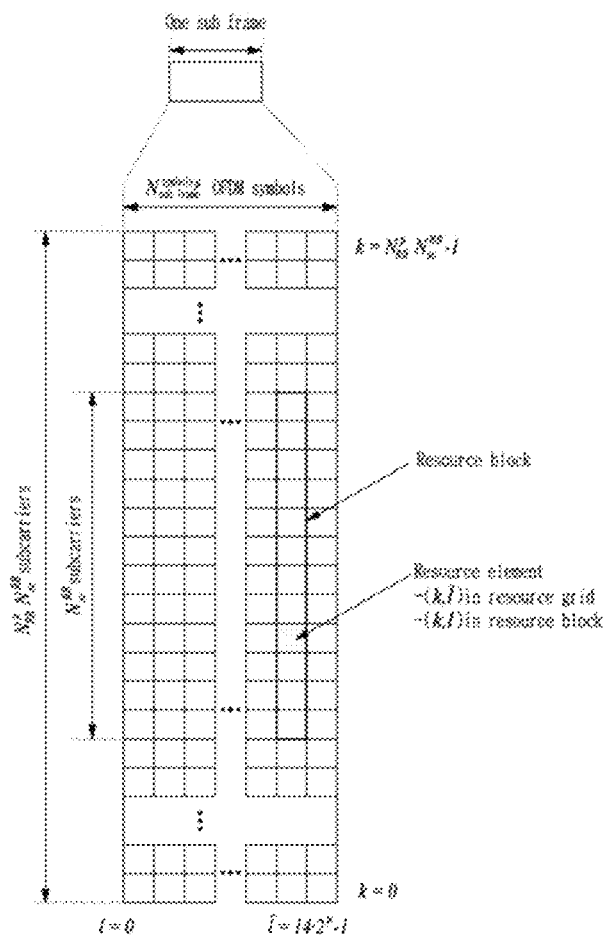
FIG. 2 illustrates an example of a resource grid and a resource block.

FIG. 2 illustrates an example of a resource grid and a resource block.

Referring to FIG. 2, a resource element within a resource grid may be indexed based on each subcarrier spacing. Here, a single resource grid may be generated for each antenna port and for each subcarrier spacing. Uplink/downlink transmission and reception may be performed based on a corresponding resource grid.

A single resource block may be configured on a frequency domain using 12 resource elements and may configure an index $n_{PRB}$ for a single resource block every 12 resource elements as represented by the following Equation 2. An index of the resource block may be used in a specific frequency band or system bandwidth.

$$n_{PRB} = \left\lfloor \frac{k}{N_{sc}^{RB}} \right\rfloor \quad \text{[Equation 2]}$$

Numerologies

Numerologies may be variously configured to meet various services and requirements of the NR system. Also, referring to the following Table 1, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

Also, for example, referring to the following Table 1, if $\mu=2$ and SCS=60 kHz, a normal CP and an extended CP may be applied. In other bands, only the normal CP may be applied.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1.

Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHz. Here, for example, if =4, it may be used only exclusive for a synchronization signal block (SSB), which is described below. However, it is provided as an example only and the present disclosure is not limited thereto.

Also, Table 2 shows a number $N_{slot}^{symb,\mu}$ of OFDM symbols per slot for each SCS setting. Table 2 shows a number of OFDM symbols per slot according to each SCS value, a number of slots per frame, and a number of slots per subframe, as provided by Table 1. Here, in Table 2, the values are based on the normal slot having 14 OFDM symbols.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Also, as described above, if μ=2 and SCS=60 kHz, the extended CP may be applied. In Table 3, in the case of the extended CP, each value may be indicated based on the normal slot of which the number of OFDM symbols per slot $N_{slot}^{symb,\mu}$ is 12. Here, Table 3 shows the number of symbols per slot, the number of slots per frame, and the number of slots per subframe in the case of the extended CP that follows the SCS of 60 kHz.

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

Hereinafter, a structure of an SS/Physical Broadcast Channel (PBCH) block in the NR system and an initial cell access structure in the NR system are described.

Here, an NR base station (i.e., gNB) may periodically transmit signals and channels as shown in the following Table 4 to allow an initial cell selection of UEs in a cell.

TABLE 4

SS/PBCH block (i.e., SSB)
SIB1 (System Information Block 1)
Other SIBs

For example, the SS/PBCH block may be the aforementioned SSB. Here, even in the NR system, a UE may need to receive a broadcast channel for forwarding a synchronization signal and important system information transmitted from a corresponding wireless access system to perform an initial wireless access. To this end, the UE may check receiving sensitivity of a synchronization signal to discover an optical cell present in a most excellent channel environment. The UE may perform a frequency/time synchronization and cell identification operation for performing an initial access to an optimal channel among one or more channels in a specific frequency band operated based on the checked receiving sensitivity. The UE may verify a boundary of OFDM symbol timing through the aforementioned operation and then may initiate a PBCH demodulation in the same SSB.

Here, the UE may receive a PBCH demodulation reference signal (DMRS) and may perform a PBCH demodulation. Also, the UE may acquire 3-least significant bit (LSB) information from SSB index information bits through the PBCH DMRS. The UE may acquire information included in a PBCH payload by performing the PBCH demodulation. The UE may perform a procedure of demodulating SIB 1 based on the information acquired through the PBCH.

For example, in the NR system, the UE may receive remaining system information (RMSI) through a broadcast signal or channel as system information not transmitted from the PBCH. Also, the UE may receive other system information (OSI) and a paging channel through a broadcast signal or channel as other additional system information.

The UE may access a base station through a random access channel (RACH) process and then perform a mobility management.

Also, for example, when the UE receives an SSB, the UE needs to set an SSB composition and an SS burst set composition.

NR V2X Service

In association with a vehicle-to-everything (V2X) service, the existing V2X service (e.g., LTE Rel-14 V2X) may support a set of basic requirements for V2X services. Here, the requirements are designed basically in sufficient consideration of a road safety service. Therefore, V2X UEs may exchange autonomous status information through a sidelink and may exchange the information with infrastructure nodes and/or pedestrians.

Meanwhile, in a further evolved service (e.g., LTE Rel-15) as the V2X service, new features are introduced by considering a carrier aggregation in a sidelink, a high order modulation, a latency reduction, a transmit (Tx) diversity, and feasibility for sTTI. Coexistence with V2X UEs (the same resource pool) is required based on the aforementioned description, and the services are provided based on LTE.

For example, technical features may be classified largely based on four categories as represented by the following Table 5 by considering use cases for supporting a new V2X service as system aspect (SA) 1. Here, in Table 5, "Vehicles Platooning" may be technology that enables a plurality of vehicles to dynamically form a group and similarly operate. Also, "Extended Sensors" may be technology that enables exchange of data gathered from sensors or video images. Also, "Advanced Driving" may be technology that enables a vehicle to drive based on semi-automation or full-automation. Also, "Remote Driving" may be technology for remotely controlling a vehicle and technology for providing an application. Based thereon, further description related thereto may be given by the following Table 5.

TABLE 5

Vehicles Platooning
Vehicles Platooning enables the vehicles to dynamically form a platoon travelling together. All the vehicles in the platoon obtain information from the leading vehicle to manage this platoon. This information allows the vehicles to drive closer than normal in a coordinated manner, going to the same direction and travelling together.

TABLE 5-continued

Extended Sensor
Extended Sensor enables the exchange of raw or processed data gathered through local
sensors or live video images among vehicles, road site units, devices of pedestrian and V2X
application servers. The vehicles can increase the perception of their environment beyond of
what their own sensors can detect and have a more broad and holistic view of the local
situation. High data rate is one of the key characteristics.
Advanced Driving
Advanced Driving enables semi-automated or full-automated driving. Each vehicle and/or
RSU shares its own perception data obtained from its local sensors with vehicles in proximity
and that allows vehicles to synchronize and coordinate their trajectories or maneuvers. Each
vehicle shares its driving intention with vehicles in proximity too.
Remote Driving
Remote Driving enables a remote driver or a V2X application to operate a remote vehicle
for those passengers who cannot drive by themselves or remote vehicles located in dangerous
environments. For a case where variation is limited and routes are predictable, such as public
transportation, driving based on cloud computing can be used. High reliability and low
latency are the main requirements.

Also, the above SA1 may consider all of LTE and NR as enhanced V2X (eV2X) support technology for supporting the new V2X service. For example, an NR V2X system may be a first V2X system. Also, an LTE V2X system may be a second V2X system. That is, the NR V2X system and the LTE V2X system may be different V2X systems. In the following, description is made based on a method of satisfying low latency and high reliability required in an NR sidelink based on the NR V2X system. Here, even in the LTE V2X system, the same or similar composition may be expanded and thereby apply. However, it is provided as an example only and the present disclosure is not limited thereto. That is, even in the LTE V2X system, the present disclosure may apply to an interactable portion and is not limited to the following embodiment. Here, for example, NR V2X capability may not be limited to essentially support only V2X services and V2X RaT to be used may be selected.

NR Sidelink

An NR sidelink may be used for the aforementioned NR V2X service. Here, for example, an NR sidelink frequency may consider FR1 that is a frequency of 6 GHz or less and FR2 (i.e., up to 52.6 GHz) that is a frequency over 6 GHz. Also, for example, the NR sidelink frequency may consider all of unlicensed ITS bands and licensed ITS bands. That is, as described above, a common design method for supporting the respective frequency bands may be required. To this end, an NR sidelink design that considers an NR system may be required. For example, similar to an NR standard design, although it is not beam-based, even an omni-directional Tx/Rx may basically require the NR sidelink design capable of supporting beam-based transmission and reception. However, it is provided as an example only.

Also, for example, a physical channel for NR V2X sidelink may be set. For example, an NR Physical Sidelink Shared Channel (PSSCH) may be a data channel for NR sidelink as a physical channel. Also, for example, an NR Physical Sidelink Control Channel (PSCCH) may be a control channel for NR sidelink as a physical channel. Here, scheduling information for the data channel of the NR sidelink and control information may be forwarded through the NR PSCCH. For example, Sidelink Control Information (SCI) may be transmitted based on a format that defines fields about control information associated with scheduling of the NR sidelink data channel and control information transmitted through the NR PSCCH may be transmitted based on an SCI format.

Also, for example, an NR Physical Sidelink Feedback Channel (PSFCH) may be defined. Here, the NR PSFCH may be an NR Hybrid Automatic Repeat Request (HARQ) feedback channel as a physical channel. Here, HARQ-ACK feedback information, Channel Status Information (CSI), and other information corresponding to the NR sidelink data channel may be forwarded through the NR PSFCH. In detail, Sidelink Feedback Control Information (SFCI) including feedback information may be forwarded through the NR PSFCH. Here, SFCI may include information about at least one of HARQ-ACK, channel quality information (CQI), a precoding matrix indicator (PMI), a rank indicator (RI), reference signal received power (RSRP), reference signal received quality (RSRQ), path-gain/pathloss, a scheduling request indicator (RSI), contention resolution identity (CRI), an interference condition, a vehicle motion, and the like. However, it is provided as an example only and the present disclosure is not limited thereto. Here, for example, the NR PSFCH is further described.

NR V2X QoS Requirements

NR V2X QoS requirements may be a higher level than existing V2X (e.g., LTE V2X) requirements into consideration of a service of the above Table 5. For example, delay may be set within 3 ms to 100 ms based on the following Table 6. Also, reliability may be set between 90% and 99.999%. Also, a data rate may be required up to 1 Gbps.

TABLE 6

Delay: [3, 100 ms]
Reliability: [90%, 99.999%]
Data rate: up to 1 Gbps

That is, as described above, QoS requirements capable of meeting low latency and high reliability may be required into consideration of a V2X service. Here, for example, access stratum (AS) level QoS management may be required to meet the QoS requirements. Also, for example, HARQ and CSI may be required into consideration of link adaptation to meet the QoS requirements. Also, for example, maximum bandwidth (max. BW) capability may differ for each NR V2X UE. That is, AS level information needs to be exchanged between UEs based on the aforementioned description. For example, the AS level information may include at least one of UE capability, QoS related information, radio bearer configuration, and physical layer configuration. Also, for example, the AS level information may further include other information. However, it is provided as an example only and the present disclosure is not limited thereto.

The following Table 7 may show the respective terms applied herein. However, it is provided as an example only and the present disclosure is not limited thereto.

TABLE 7

UMTS (Universal Mobile Telecommunications System):
refers to 3rd Generation (3G) mobile communication technology based on Global System
for Mobile Communication (GSM), developed by 3GPP
EPS (Evolved Packet System):
refers to a network system that includes an Evolved Packet Core (EPC) that is a packed
switched (PS) core network based on an Internet protocol (IP) and an access network such
as LTE/Universal Terrestrial Radio Access Network (UTRAN). A network evolved from
Universal Mobile Telephone System (UMTS).
NodeB:
refers to a base station of GERAN/UTRAN and is installed outdoors and has coverage of
macro cell scale.
eNodeB:
refers to a base station of E-UTRAN and is installed outdoors and has coverage of macro
cell scale.
gNodeB:
refers to a base station of NR and is installed outdoors and has coverage of macro cell scale.
UE (User Equipment):
refers to a user equipment. The UE may also be interchangeably used with terms, terminal,
mobile equipment (ME), mobile station (MS), and the like. Also, the UE may be a portable
device, such as a laptop computer, a mobile phone, a personal digital assistant (PDA), a
smartphone, a multimedia device, etc. The term "UE" or "terminal" in Machine Type
Communications (MTC) related content may refer to an MTC device.
RAN (Radio Access Network):
refers to a unit that includes NodeB, eNodeB, and gNodeB, and a radio network controller
(RNC) for controlling the same in a 3GPP network, and is present between UEs and provides
a connectivity to a core network.
NG-RAN (Next Generation Radio Access Network):
refers to NG-eNB (E-UTRA UP/CP protocol) and gNB (NR UP/CP protocol) base station
nodes connected to 5GC (5G Core NW) based on an NG interface in a 3GPP network.
Xn interface:
refers to an interface for interconnection between NG-eNB and gNB.
PLMN (Public Land Mobile Network):
refers to a network configured to provide a mobile communication service to individuals,
and may be configured for each operator.
Proximity service (or ProSe Service or Proximity based Service):
refers to a service that enables discovery and direct communication between physically
proximate apparatuses, communication through a base station, or communication through a
third apparatus. Here, user plane data is exchanged through a direct data path without going
through a 3GPP core network (e.g., EPC).
LTE SFN (System Frame Number):
refers to a frame index for time domain reference of LTE.
NR SFN (System Frame Number):
refers to a frame index for time domain reference of NR.
NR DFN (Direct Frame Number):
refers to a frame index for time domain reference of an NR sidelink NR Sidelink Design Hereinafter, an NR V2X sidelink design method that meets requirements for the aforementioned evolved V2X (i.e., eV2X) services will be described.

In more detail, a synchronization procedure and method required to form a wireless link for an NR sidelink are further described. For example, as described above, in NR sidelink design, FR1 and FR2 (i.e., up to 52.6 GHz) may be considered as NR sidelink frequencies and unlicensed ITS bands and licensed ITS bands may be considered as frequency band and range in which an NR system operates. Also, for example, the availability of an LTE (NG-eNB)/NR Uu link that is a 3GPP NG-RAN of Table 7 may be considered in the NR sidelink design.

Also, for example, a design for eV2X synchronization information forwarding and signal transmission/reception to meet higher requirements from the evolved V2X services may be considered. Here, a frequency for NR V2X sidelink communication may further consider at least one of elements of the following Table 8 based on the following technologies required in the new system, which differs from the existing system (e.g., LTE). That is, there is a need to meet new V2X service requirements by applying an NR V2X sidelink based on NR radio access technology, particularly, uplink transmission related technologies as shown in the following Table 8.

Also, other elements may be considered by considering the new system as well as the following Table 8. However, it is provided as an example only and the present disclosure is not limited thereto.

TABLE 8

Scalable frequency use and configuration (e.g., Bandwidth Part [BWP]) according to broad
frequency band and maximum bandwidth capability of UE
Various numerologies (e.g., variable SCSs, number of OFDM symbols per slot (or
subframe))
Slot format (slot/non-slot)
Beam-based transmission/reception to cope with signal attenuation in a frequency band of
6 GHz or more corresponding to a high frequency band
Configured grant-based uplink transmission/reception to provide low latency Also, as described above, for example, a signal, a basic slot structure, a physical resource, and a physical channel of NR V2X sidelink may be represented as the following Table 9.

TABLE 9

NR PSSCH (Physical Sidelink Shared Channel)
Refers to a Physical layer NR SL data channel.
NR PSCCH (Physical Sidelink Control Channel)
Refers to a channel for forwarding control information as well as scheduling information of
an NR SL data channel as a physical layer NR SL control channel.
NR SLSS/PSBCH (Sidelink Synchronization Signal/Physical Sidelink Broadcast Channel)
block
Refers to a synchronization and broadcast channel block in which an NR SL
synchronization signal and a broadcast channel are transmitted on a single continuous time
in a physical layer. Periodical transmission is performed based on a set of at least one block
index to support beam-based transmission on an NR frequency band. The synchronization
signal includes a PSSS and a SSSS and a sequence for the corresponding signal is generated
based on at least one SLSSID value. The PSBCH is transmitted with SLSS for the purpose
of forwarding system information required to perform V2X SL communication. Likewise,
periodic transmission is performed based on a set of SLSS/PSBCH block indices to support
beam-based transmission.

Figure 3:
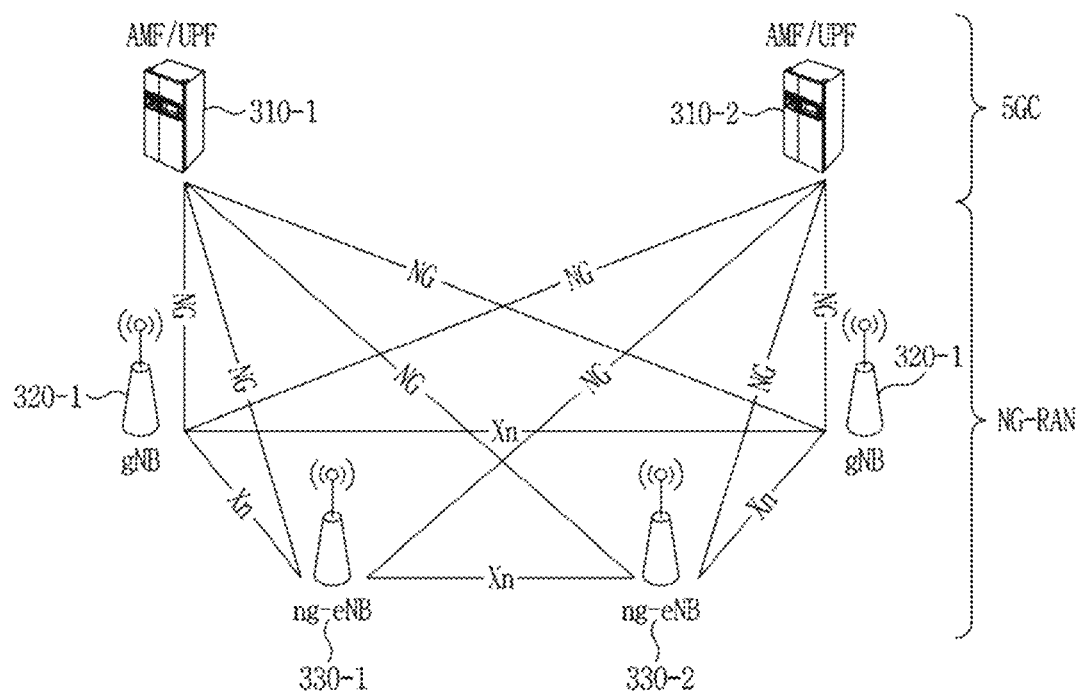
FIG. 3 illustrates an example of a system architecture.

Here, for example, FIG. 3 illustrates an example of a basic network architecture composition considered for an NR V2X sidelink.

For example, referring to FIG. 3, NG interfaces may be set between nodes 310-1 and 310-2 of a 5-th generation core (5GC NW) and nodes 320-1, 320-2, 330-1, and 330-2 of an NG-RAN. Also, Xn interfaces may be set between the nodes 320-1, 320-2, 330-1, and 330-2 of the NG-RAN. Here, in the above architecture, corresponding nodes may be interconnected through the corresponding Xn interface based on gNB (NR UP/CP protocol) corresponding to the nodes 320-1 and 320-2 and ng-eNB (E-UTRA UP/CP protocol) corresponding to the nodes 330-1 and 330-2, which constitute the NG-RAN. Also, as described above, in the 5GC, corresponding nodes may be interconnected through a corresponding NG interface. Here, for example, in the above architecture, all of an LTE sidelink UE and an NR sidelink UE may be controlled by the NG-RAN (i.e., LTE Uu and NR Uu) based on the gNBs and ng-eNBs. Therefore, when transmitting synchronization information, the NR sidelink UE may receive synchronization information from the LTE Uu or NR Uu link, and may transmit NR sidelink synchronization information (e.g., SL synchronization signal/SL Physical Broadcast Channel (PBCH)) based on the received synchronization information. However, it is provided as an example only and the present disclosure is not limited thereto. That is, the NR sidelink UE may also acquire the synchronization information through the LTE Uu link as well as the NR Uu link.

Meanwhile, with respect to V2X sidelink communication, V2X sidelink UEs may perform the V2X sidelink communication. Here, predetermined conditions need to be met such that the V2X sidelink UEs may start the communication. The conditions may be represented by the following Table 10. That is, a V2X sidelink UE may perform V2X sidelink communication in a Radio Resource Control (RRC) idle mode, inactive mode, or connected mode. Also, V2X sidelink UEs that perform the V2X sidelink communication need to be registered on a selected cell on a using frequency or need to belong to the same PLMN. Also, if a V2X sidelink UE is an OOC on a frequency for V2X sidelink communication, the V2X sidelink UE may perform the V2X sidelink communication only when it is possible to perform the V2X sidelink communication based on pre-configuration.

TABLE 10

If a UE is in an RRC_IDLE or INACTIVE or CONNECTED mode in a specific cell,
If a UE is registered to a selected cell on a frequency used for V2X SL communication
or
belongs to the same PLMN,
If a UE is an OCC on a frequency for a V2X SL communication operation, and if a UE
is
capable of performing V2X SL communication based on pre-configuration Here, as described above, to start the V2X sidelink communication, sidelink synchronization information may be required. Therefore, the UE needs to transmit the sidelink synchronization information. Here, a Tx UE (sidelink Tx UE) may receive a configuration for transmitting sidelink synchronization information prior to transmitting corresponding synchronization information. Here, for example, the Tx UE may receive the configuration for transmitting the sidelink synchronization information based on a system information message or an RRC reconfiguration message (in the case of an RRC CONNECTED UE) broadcasted from the above NG-RAN nodes. Also, for example, if an NR V2X sidelink UE (hereinafter, referred to as a UE) is absent in an NG-RAN, the UE may transmit sidelink synchronization information based on the pre-configured information, which is described above.

Figure 4:
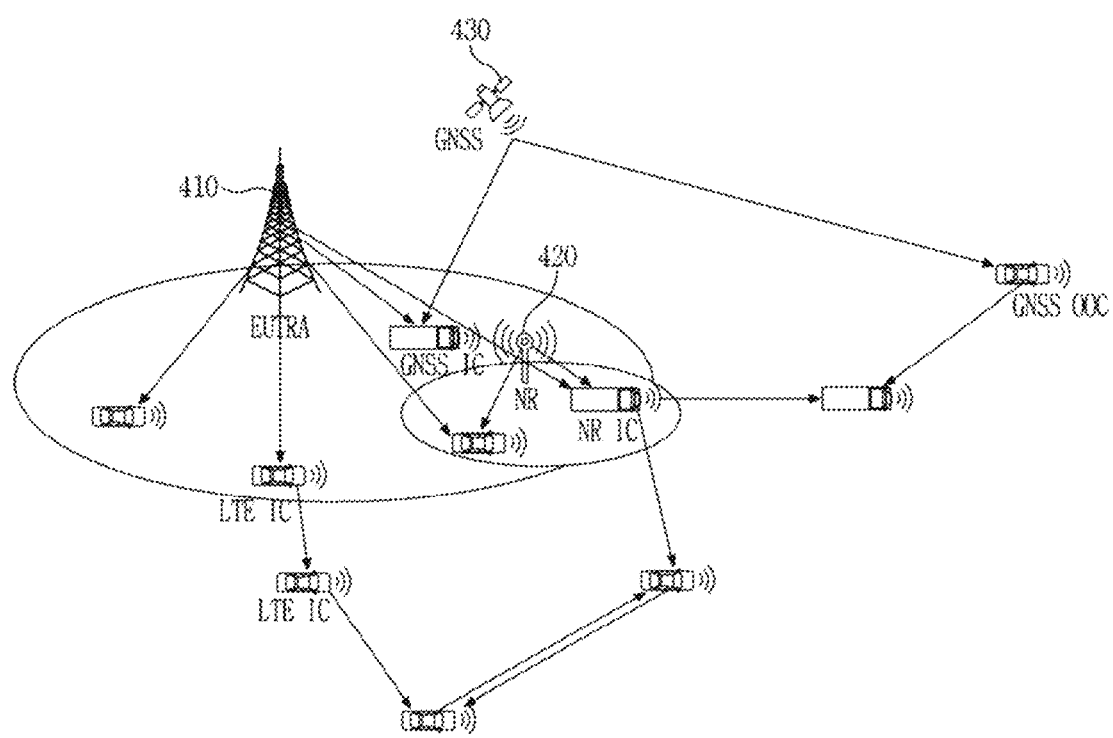
FIG. 4 illustrates an example scenario in which sidelink communication is performed in a wireless network.

Meanwhile, FIG. 4 illustrates an example of a scenario in which NR V2X sidelink communication is performed in a 3GPP network based on the aforementioned description. Here, the NR V2X sidelink communication may be performed on the 3GPP network (hereinafter, NG-RAN). Additionally, presence of a Global Navigation Satellite System (GNSS) signal may be considered.

In detail, referring to FIG. 4, each of NR V2X sidelink UEs may be an IC or an OOC based on EUTRA NG-eNB 410, may also be an IC or an OOC based on gNB 420, and may also be an IC or an OOC based on GNSS 430. Here, NR V2X sidelink UEs may select a resource of synchronization reference based on a position and capability of a UE. Also, for example, in addition to the scenario of FIG. 4, scenarios shown in the following Table 11 may be considered. It is provided as an example only and the present disclosure is not limited thereto.

TABLE 11

NR Uu CONNECTED/IDLE/Inactive for NR Sidelink
NG-eNB Uu CONNECTED/IDLE for NR Sidelink
EN-DC or MR-DC for NR Sidelink Meanwhile, in the following, an NR SCS may refer to one of an SCS value for NR DL SS/PBCH, an SCS value for an NR BWP (data/control channel), and a reference SCS value defined/set for comparison of NR V2X SCS values. As another example, the NR SCS may refer to one of an SCS value for NR V2X SLSS/PSBCH, an SCS value for NR V2X BWP or a resource pool (data/control channel), and a reference SCS value defined/set for comparison of NR V2X SCS values. However, it is provided as an example only and the present disclosure is not limited thereto. Also, for example, 30 kHz SCS value may be set as a default value and used for 5.9 GHz ITS spectrum. However, it is provided as an example only and the present disclosure is not limited thereto.

In the case of performing NR V2X sidelink communication, data transmission may be performed based on unicast/groupcast. Here, for example, unicast transmission may refer to transmitting a message from a single UE to another UE, that is, one-to-one transmission. Also, broadcast transmission may refer to a scheme of transmitting a message to all of UEs regardless of whether a service is supported at an Rx UE. That is, a single UE may transmit a message regardless of whether a plurality of Rx UEs is supporting a service. Meanwhile, a groupcast transmission scheme may be a scheme of transmitting a message to a plurality of UEs that belongs to a group.

Here, for example, whether to activate the unicast, groupcast, or broadcast data transmission and reception and whether to perform a session connection may be determined at an upper layer. That is, although a physical layer of a V2X UE may operate based on an instruction that is determined in an upper layer, it is provided as an example only and the present disclosure is not limited.

Also, for example, a V2X UE may perform corresponding transmission and reception after a session for corresponding unicast or groupcast data transmission is formed. When a V2X UE performs transmission and reception based on the aforementioned session, physical layer parameter information for data transmission corresponding to unicast or groupcast may be known in advance in the physical layer of the V2X UE. For example, the V2X UE may receive and recognize in advance the aforementioned information from a base station. As another example, the aforementioned information may be information preset to the V2X UE. Here, for example, unicast or multicast data transmission and reception may apply only to a case in which a relatively small number of V2X UEs are present around a Tx V2X UE and a session is stably maintained. In addition, if a session is unstable or if adjacent V2X UEs vary a lot, data transmission may be performed based on broadcast transmission. Here, it is provided as an example only and the present disclosure is not limited thereto.

Also, for example, as described above, unicast or groupcast transmission and reception may be determined in an application layer end as an upper layer. Here, for example, data allocable to transmission and reception generated in an application layer may be not directly mapped to a radio layer. Here, for example, in the case of performing the unicast or groupcast transmission and reception, a mapping relationship or a connection establishment procedure may be required to perform data transmission and reception on the radio layer. However, it is provided as an example only and the present disclosure is not limited thereto.

Also, for example, in the case of performing the unicast data transmission and reception, corresponding Tx and Rx UEs may need to establish a session by performing a procedure (e.g., a discovery procedure) of discovering their presence, and such session establishment may be performed based on various methods. Here, the session establishment between the UEs may be performed with assistance of a base station. The base station may gather position information of UEs and may determine whether UEs capable of performing unicast or groupcast data transmission and reception are adjacent to each other. Here, for example, the base station may determine whether the UEs are adjacent to each other based on a threshold. Here, a predetermined value may be used to determine the threshold. When the UEs in a cell are determined to be adjacent to each other, the base station may initialize a corresponding discovery procedure and the UEs may perform the corresponding discovery procedure to discover each other based on an initialization procedure. Also, the base station may determine whether an adjacent V2X SL UE is present by designing a new discovery channel and by periodically transmitting and receiving the corresponding channel. Also, the base station may determine whether an adjacent UE is present by transmitting a corresponding discovery message on a V2X data channel. However, it is provided as an example only and the present disclosure is not limited thereto. That is, session establishment for unicast or groupcast data transmission and reception may be completed based on the aforementioned procedures. Subsequently, the upper layer may notify the physical layer of information about the session establishment and may perform a physical layer operation, such as HARQ-ACK, CSI, and link adaptation.

At least some communications (e.g., wireless communication in accordance with 3GPP 5G NR Release 16, or any earlier or later releases, or any other wireless communications) may use one or more bandwidth parts (BWPs). For example, for certain transmission and reception of a signal, a frequency bandwidth to be used may not need to be as wide as a bandwidth of a serving cell. The bandwidth (e.g., the bandwidth of a BWP) may be configured as a narrower bandwidth than the bandwidth of the serving cell. A frequency position of the bandwidth may be shifted. A bandwidth of an OFDM subcarrier may be changed. It may be defined as a partial set of the entire frequency bandwidth of the serving cell, which may be referred to as a BWP or any other terminology.

A serving cell may include one or more BWPs. One or more messages (e.g., one or more RRC messages) configuring the BWPs of the serving cell may include information about a plurality of different BWPs for a wireless user device (e.g., by way of signaling from a base station). The BWPs of the serving cell may include a pair of an uplink BWP and a downlink BWP (e.g., at all times). Composition information about a single BWP may include composition information about an uplink and a downlink (e.g., at all times). A number of BWPs to be activated may be limited to a single BWP among the plurality of BWPs or more than one BWPs may be activated simultaneously. If the wireless user device is capable of activating at least one BWP, the base station may verify information about a maximum number of active BWPs of the wireless user device and may also simultaneously activate the plurality of BWPs based on the verified information. For example, if the wireless user device is configured with the serving cell, a single BWP may be activated for the serving cell (e.g., without separate signaling from the base station). The wireless user device may perform access to the serving cell and the wireless user device may use the activated BWP (e.g., for an initial access or other types or random access). The initial BWP may be used (e.g., until the wireless user device receives composition information for the wireless user device from the base station).

If the wireless user device receives the composition information for the wireless user device (e.g., UE composition information) from the base station, the wireless user device may be configured with a default BWP. The default bandwidth may be configured as a relatively narrow bandwidth (e.g., narrower than other BWPs). If an amount of data to be transmitted and received is small, the wireless user device may reduce battery consumption of the wireless user device by activating the default bandwidth. If the wireless user device is not configured with the default bandwidth, the wireless user device may use the initial BWP for the same or similar purposes.

The activated BWP of the serving cell may be switched with another BWP depending on one or more circumstances. This operation may be referred to as BWP switching. For a BWP switching, the wireless user device may inactivate the currently activated BWP and may activate a new BWP. The BWP switching operation may be performed, for example, if the wireless user device receives BWP switching order (e.g., through a PDCCH order) or any other BWP switching triggering event. The BWP switching operation may be performed through a predetermined timer "bwp-Inactivity-Timer" as a timer for BWP inactivity. The BWP switching operation may be performed in response to starting a random access. As further described herein, one or more conditions and/or events that may cause a BWP switching will be described. The base station may change an active BWP in the serving cell of the wireless user device depending on one or more circumstances. If the wireless user device determines to change an active BWP, the base station may notify the wireless user device that a BWP is switched. The notification of the BWP switching may be indicated through a PDCCH or any other downlink signaling. The wireless user device may perform the BWP switching operation through BWP switching related information (e.g., included in the PDCCH and/or an RRC configuration).

The timer "BWPInactivityTimer" may be configured for each serving cell or may be commonly used for a plurality of BWPs. "BWPInactivityTimer" may be a timer for inactivating the activated BWP (e.g., if the timer expires). A timer performing the same functionality may be "BWPInactivityTimer" or any other timers. "BWPInactivityTimer" may be used for clarity of description, other timers or timer parameters may perform the functions or operations of "BWPInactivityTimer" described herein. If the timer (e.g., "BWPInactivityTimer") expires, the wireless user device may inactivate the current activate BWP and may activate the default BWP. BWP switching may be performed using the default BWP or any other BWPs. If the wireless user device is not configured with the default BWP, the wireless user device may switch to the initial BWP. The wireless user device may reduce battery consumption by monitoring a narrow bandwidth through the BWP switching operation. Start and restart condition of the timer may be set (e.g., represented by the following Table 2). If the wireless user device needs to maintain the activated BWP as follows, the timer may start or restart to prevent the activated BWP from being inactivated or from being switched to another BWP. One or more features of the BWP is further described below.

At least some communications (e.g., wireless communication in accordance with 3 GPP 5G NR Release 16, or any earlier or later releases, or any other wireless communications) have a wide system bandwidth configurable on a single carrier, which differs from other types of communications, such as LTE. If the NR system (or other communication systems) operates in frequency range 2 (i.e., over 6 GHz frequency bands) in which many frequency bands and bandwidths thereof are available for the NR system, a system bandwidth available for the base station and a bandwidth in which the wireless user device actually operates may be differently configured. The system bandwidth assumed by the base station (or a network and/or system) and the frequency bandwidth used for the wireless user device to actually operate may conform to 3 GPP NR standards (or any other configurations) and may be different in view of capability of maximum RF bandwidth of the base station and the wireless user device, and wireless user device implementations (e.g., UE implementation) and related operation. Configurations of the frequency bandwidth used by the wireless user device may be provided from the base station, which may correspond to a BWP configuration. The BWP configuration used by the wireless user device may vary based on a mode of the wireless user device and a BWP configuration status. In general, bandwidth part (BWP) configuration provided from the base station to the wireless user device through system information for initial cell access may be referred to as an initial active BWP, which may be used to perform a random access procedure.

BWPs may include an initial DL BWP. As the BWP provided from the base station to the wireless user device through system information for the initial cell access of the wireless user device, a bandwidth about an initial DL active BWP for System Information Block (SIB1) transmission and related Control Resource Set (CORESET) configuration information may be provided through an SS/PBCH block reception. The initial DL active BWP may be initial UE bandwidth information for receiving SIB1 information.

kHz, 30 kHz, and 60 kHz and an extended CP for 60 kHz for PSCCH/PSSCH and PSFCH in FR1 (e.g., frequency ranges below 6 GHz). The numerology may support a normal CP for 60 kHz and 120 kHz and an extended CP for 60 kHz for PSCCH/PSSCH and PSFCH in FR2 (e.g., frequency ranges equal to or above 6 GHz). Also, the waveform for NR V2X may support only CP-OFDM without supporting DFT-S-OFDM.

TABLE 12

| | FR 1 | FR 2 |
|---|---|---|
| PSSCH/PSCCH and PSFCH | Normal CP for 15 kHz, 30 kHz, 60 kHz<br>Extended CP for 60 kHz | Normal CP for 60 kHz, 120 kHz<br>Extended CP for 60 kHz |
| Waveform | Supported only CP-OFDM (i.e., No support of DFT-S-OFDM for NR SL in Rel-16) | |

BWPs may include an initial UL BWP. Within the SIB1, configuration information for performing a random access procedure may be provided and information about an initial uplink bandwidth (e.g., an initial UE uplink bandwidth) for some message transmission/reception within the random access procedure. For example, initial UL active BWP information (e.g., a frequency position, a bandwidth, numerology, etc.) may be provided.

Through this information, an uplink PUSCH message of a random access procedure (e.g., msg.3 or an uplink RACH message of a four-step random access procedure) may be transmitted. Numerology of the initial UL active BWP may be identical to numerology information for msg.3 transmission.

PUSCH transmission (e.g., for msg.3) and PUCCH transmission for HARQ feedback transmission (e.g., for msg.4 or a downlink response message of a four-step random access procedure) within the RACH procedure may be limited to be within the initial active UL BWP.

In an unpaired spectrum, such as TDD, an initial DL BWP and an initial UL BWP may share the same center frequency.

A bandwidth of the initial active UL BWP may be generally less than or equal to a minimum Tx bandwidth of the UE.

From wireless user device perspective, only a single initial active UL BWP may be supported per cell-defined SSB.

Once the wireless user device accesses a network through the aforementioned initial cell access procedure, BWP configuration up to maximum 4 BWPs may be provided to the wireless user device (e.g., through wireless user device-specific RRC signaling). Only a single BWP among the plurality of BWPs may be active and used.

The following basic configuration information may be generally included as the BWP configuration.

Numerology
Frequency location (e.g., center frequency)
Bandwidth (e.g., number of PRBs)
PDCCH/PDSCH/PUSCH, a configured grant, an SRS transmission related configuration, and a beam failure recovery (BFR) configuration may be included and thereby provided to the wireless user device.

Numerology and Waveform Supported in NR V2X

Numerology and waveform supported in one or more wireless communications (e.g., NR2V2X or any other wireless communications) may be configured (e.g., represented by the following Table 12). Referring to Table. 12, the numerology for NR V2X may support a normal CP for 15

One or more resource pools may be configured for one or more wireless user devices (e.g., by higher layer signaling, such as an RRC message). The one or more resource pools may include one or more NR V2X resource pools. For example, the NR V2X resource pool may include a set of time and frequency resources available for sidelink transmission and reception (e.g., for NR V2X communication). The resource pool may be in a radio frequency bandwidth (RF BW). Only a single numerology (one different numerologies) may be used in a single resource pool. The wireless user device may be configured with at least one pool on a single carrier. A single resource pool for PSSCH may include discontinuous time resources, and frequency resources may include continuous or discontinuous Physical Resource Blocks (PRBs).

Referring to FIG. 5, part (a), a resource pool for PSSCH may include discontinuous time resources in the NR V2X resource pool. If an NR V2X service is provided on a licensed carrier on which an NR Uu link operates, the wireless user device may be configured with the NR V2X resource pool through a base station or a pre-configuration in addition to a physical resource for the NR Uu link. Resources 512, 514, and 515 for sidelink may be discontinuously configured based on a symbol unit or a slot unit within the NR V2X resource pool. If the sidelink resource pool is configured on the licensed carrier on which the NR Uu link operates, they may be multiplexed on different symbols or slots as shown in FIG. 5, part (a). A single resource pool for PSSCH may be configured as discontinuous time resources.

Referring to FIG. 5, part (b), the resource pool for PSSCH may include continuous or discontinuous PRBs in the NR V2X resource pool. For Option 1 of FIG. 5, part (b), each of resource pools 521, 522, and 523 for PSSCH may include continuous PRBs. For Option 2 of FIG. 5, prat (b), each of resource pools 524, 525, 526, 527, 528, and 529 for PSSCH may include discontinuous PRBs. Resource pool 1 (524 and 527) may be configured on discontinuous frequency resources as shown in FIG. 5, part (b). The wireless user device may perform sidelink communication based on the resource pool, and the operation is further described below.

BWPs may comprise one or more NR V2X sidelink BWPs. The NR V2X sidelink BWP may be configured on a single sidelink carrier. The corresponding sidelink carrier may be a licensed carrier on which an NR Uu link operates or a C-V2X dedicated unlicensed carrier, such as an ITS band. The NR V2X sidelink BWP may be defined independently from an NR Uu BWP within the licensed carrier. Only a single NR V2X sidelink BWP (or multiple NR V2X sidelink BWPs) may be configured on a single carrier. Although the aforementioned numerology configuration may include numerology configured NR V2X sidelink BWP configuration, aspects are not limited thereto. The wireless user device may use the NR V2X sidelink BWP for transmission (Tx) and reception (Rx). The resource pool may be configured within a single sidelink BWP. The wireless user device may assume that an active uplink BWP and a configured sidelink BWP are identical at a specific point in time of the same carrier. Based on the aforementioned description, the wireless user device may perform sidelink communication.

One or more time resources may include one or more time resources for PSFCH. PSFCH time resources may be configured (e.g., by the base station) per a slot, per two slots, or per 4 slots in the V2X sidelink resource pool. PSFCH time resources may be pre-configured (e.g., for the wireless user device) per a slot, per two slots, or per 4 slots in the V2X sidelink resource pool. If a wireless user device receives sidelink data (e.g., PSSCH), the wireless user device may perform PSFCH transmission after a minimum time to prepare PSFCH transmission. The minimum time may be configured by considering a processing time of the wireless user device.

Figure 6:
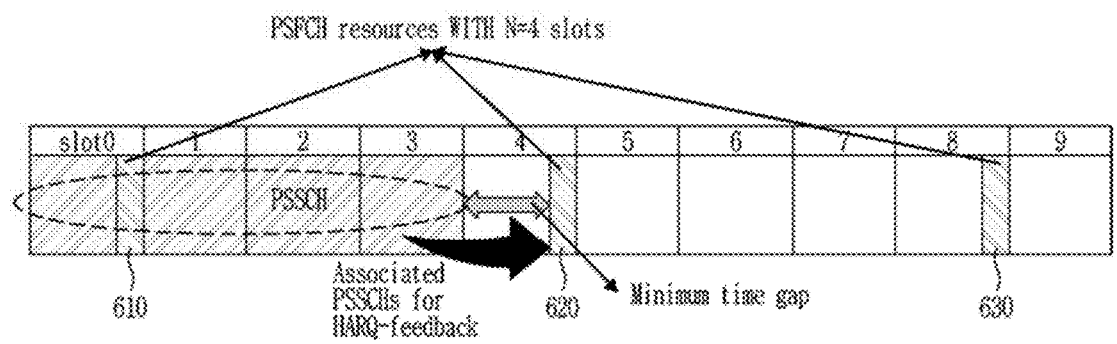
FIG. 6 illustrates an example of Physical Sidelink Feedback Channel (PSFCH) time resources.

Referring to FIG. 6, PSFCH time resources may be configured per 4 slots in the resource pool. The PSFCH may be transmitted per 4 slots (or per any other number of slots). In FIG. 6, a PSFCH time resource 610 may be configured in slot 0 and PSFCH time resources 620 and 630 may be configured in slot 4 and slot 8, respectively. Other configurations may be possible. A wireless user device (e.g., an Rx UE) may transmit HARQ feedback information to another wireless user device (e.g., the Tx UE) through a PSFCH time resource associated with a PSSCH. Referring to FIG. 6, a PSSCH of slot 0, a PSSCH of slot 1, a PSSCH of slot 2, and a PSSCH of slot 3 may be associated with the PSFCH time resource 620 of slot 4. The wireless user device may transmit the PSFCH through a PSFCH time resource (e.g., the first PSFCH time resource 620 occurring after the sidelink HARQ transmission) after a minimum time gap for sidelink HARQ feedback transmission. In FIG. 6, the wireless user device may perform sidelink HARQ feedback transmission through the PSFCH time resource 620 of slot 4 that is a PSFCH time resource occurring after the minimum time gap. If the minimum time gap is large, the wireless user device may perform the sidelink feedback transmission through the PSFCH time resource 630 of slot 8, instead of using the PSFCH time resource 620 of slot 4. However, aspects are not limited thereto.

Figure 7:
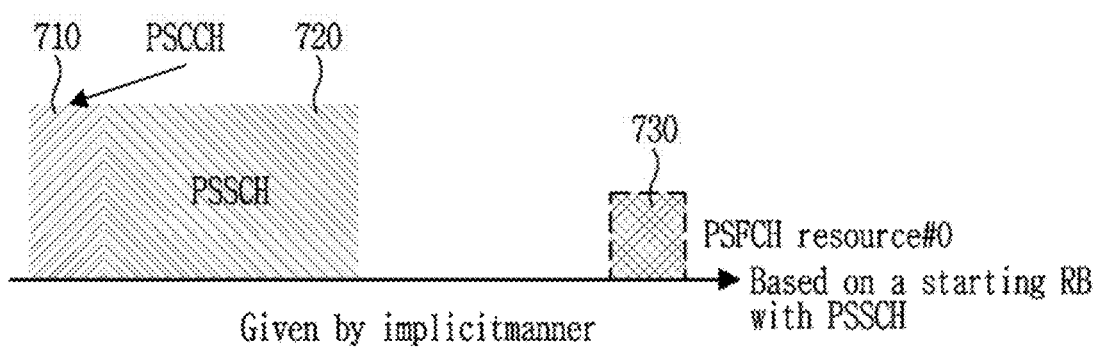
FIG. 7 illustrates an example of PSFCH frequency resources.

PSFCH resources may include frequency resources and/or code resources. In addition to time resources for the PSFCH, frequency resources may need to be determined. Referring to FIG. 7, a wireless user device (e.g., Tx UE) may transmit a PSCCH 710 and a PSSCH 720 to another wireless user device (e.g., an Rx UE). A frequency resource 730 used to transmit a PSFCH may be implicitly determined based on a frequency resource used to transmit the PSSCH 720. The frequency resource 730 used to transmit the PSFCH may be determined based on a starting RB (or a starting subchannel) of the frequency resource used to transmit the PSSCH 720. The frequency resource 730 used to transmit the PSFCH may be determined based on a lowest RB index or a lowest subchannel index in the frequency resource used to transmit the PSSCH 720. However, aspects are not limited thereto.

A wireless user device may perform a sidelink HARQ procedure. Whether to perform sidelink HARQ feedback may be configured (e.g., by an upper layer, such as RRC signaling). The sidelink HARQ feedback may be differently performed based on a cast scheme. The sidelink HARQ feedback may be enabled or disabled based on a configuration (e.g., by the upper layer) in unicast and groupcast. If a HARQ feedback-enabled wireless user device, based on the upper layer configuration, performs a HARQ feedback transmission for a groupcast transmission, it may be determined whether the corresponding wireless user device actually performs the HARQ feedback transmission for the groupcast transmission based on a channel status (e.g., RSRS), Tx-Rx distance, QoS requirements, and other conditions. If sidelink HARQ feedback for unicast is enabled, the wireless user device (e.g., the Rx UE) may transmit HARQ-ACK/NACK to another wireless user device (e.g., the Tx UE) depending on whether a corresponding transport block (TB) is successfully decoded.

If sidelink HARQ feedback for groupcast is enabled and a condition regarding the actual HARQ feedback transmission status is satisfied (e.g., a condition about the Tx-Rx distance), the wireless user device (e.g., the Rx UE) may transmit only HARQ NACK to another wireless user device (e.g., the Tx UE). If the corresponding TB is not successfully decoded, the wireless user device (e.g., the Rx UE) may transmit HARQ NACK to another wireless user device (e.g., the Tx UE) (Option 1). If sidelink HARQ feedback for groupcast is enabled, a wireless user device (e.g., the Rx UE) may transmit HARQ-ACK/NACK to another wireless user device (e.g., the Tx UE) depending on whether the corresponding TB is successfully decoded (Option 2). For the groupcast, a sidelink HARQ feedback report scheme may be supported in a different manner. If a wireless user device (e.g., the Rx UE) reports only HARQ NACK as groupcast (e.g., Option 1), a wireless user device (e.g., the Rx UE) may determine whether to perform reporting by considering a distance from another wireless user device (e.g., the Tx UE). If the Tx-Rx distance is less than or equal to a required communication range, a wireless user device (e.g., the Rx UE) may transmit the HARQ feedback for PSSCH. If the Tx-Rx distance is greater than the required communication range, a wireless user device (e.g., the Rx UE) may not perform the HARQ feedback transmission for PSSCH.

For the groupcast, although the HARQ feedback is enabled, a wireless user device (e.g., the Rx UE) may not perform HARQ report based on the Tx-Rx distance. A position of a wireless user device (e.g., the Tx UE) may be indicated through SCI associated with the PSSCH. A wireless user device (e.g., the Rx UE) may calculate the Tx-Rx distance based on information included in SCI and its position information and may determine whether to perform the HARQ feedback accordingly.

An NR V2X sidelink design that meets requirements for new evolved V2X (i.e., eV2X) services will be described based on the aforementioned description. A sidelink HARQ transmission method in which, if a mode 1 wireless user device performs NR sidelink unicast transmission, the mode 1 wireless user device may transmit sidelink HARQ information to a base station, which will be further described. An NR sidelink frequency for an NR sidelink operation may be within FR1 (410 MHz-7.125 GHz) and FR2 (24.25 GHz 52.6 GHz) and may apply to all of unlicensed ITS bands and licensed ITS bands, and a frequency band range in which the NR system operates, without being limited to a specific band. The NR sidelink frequency may commonly apply to all of the aforementioned FR 1 and FR 2. The availability of an LTE (ng-eNB)/NR (gNB) Uu link (e.g., configured in a 3GPP NG-RAN) may be considered for NR V2X sidelink transmission/reception procedures. By considering the aforementioned aspects, ng-eNB or gNB on the NG-RAN may be described as the base station. However, aspects are not limited to a specific type.

A wireless user device may repot sidelink HARQ (e.g., V2X SL HARQ) to a base station. A wireless user device (e.g., an NR V2X Tx UE) configured with a base station scheduling mode (i.e., mode 1) may be scheduled with a sidelink transmission resource through the base station. The mode 1 wireless user device may request the base station for a transmission resource to transmit V2X service-related data to another wireless user device through a sidelink. in response to the request from the wireless user device, the base station may schedule the sidelink transmission resource and provide the scheduled resource to the wireless user device. The wireless user device may perform a V2X sidelink transmission using the scheduled resource.

A wireless user device (e.g., the V2X Tx UE) configured with a wireless user device auto-control mode (i.e., mode 2) may autonomously select a sidelink transmission resource and may transmit data to another wireless user device through the selected resource. The wireless user device may be pre-configured with a transmission resource pool to be used by the wireless user device (e.g., the V2X Tx UE). The wireless user device may autonomously select a portion of resources to be used for actual V2X data transmission from among resources within the transmission resource pool.

A wireless user device (e.g., the V2X Tx UE) may acquire SL HARQ-ACK feedback information about the PSSCH (data channel) transmitted to another wireless user device (e.g., the V2X Rx UE) through the sidelink, from the other wireless user device (e.g., the Rx UE) through PSFCH. If the wireless user device (e.g., the Tx UE) is in a base station scheduling mode, the wireless user device (e.g., the Tx UE) may transmit corresponding sidelink HARQ-ACK feedback information to the base station (e.g., through an NR Uu link) to inform the base station regarding whether to perform retransmission scheduling. The wireless user device (e.g., the Tx UE) may transmit the corresponding sidelink HARQ-ACK feedback information to the base station (e.g., using an NR Uu uplink channel). The wireless user device (e.g., the Tx UE) may multiplex and thereby transmit CSI (e.g., HARQ-ACK, CQI, PMI, RI, etc.) on the NR Uu link and the sidelink HARQ feedback information through the uplink channel. The wireless user device (e.g., the Tx UE) may transmit only the corresponding sidelink HARQ-ACK feedback information to the base station through the uplink channel. However, aspects are not limited thereto.

Figure 8:
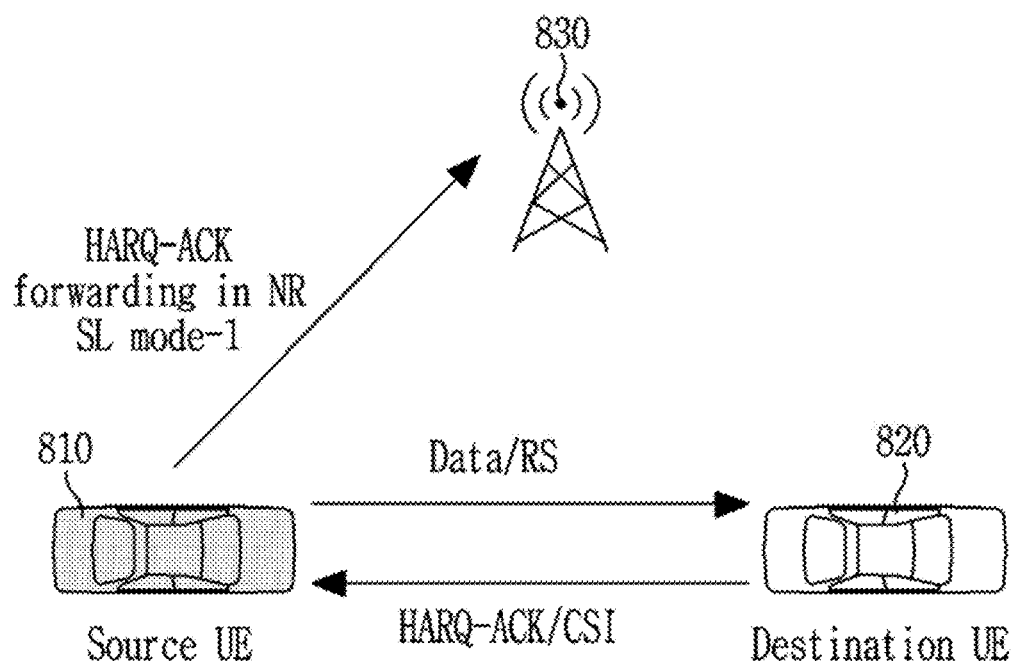
FIG. 8 illustrates an example method for reporting sidelink Hybrid Automatic Repeat Request (HARQ) feedback.

Referring to FIG. 8, a wireless user device (e.g., an NR V2X Tx UE 810) corresponding to a source wireless user device may transmit a PSSCH (i.e., data) to another wireless user device (e.g., an NR V2X Rx UE 820) corresponding to a destination wireless user device through a sidelink. The wireless user device (e.g., NR V2X Tx UE 810) may receive HARQ-ACK feedback information from another wireless user device (e.g., the NR V2X Rx UE 820). If the wireless user device (e.g., the NR V2X Tx UE 810) is a mode 1 configured wireless user device and the sidelink transmission is performed based on unicast, the wireless user device (e.g., the NR V2X Tx UE 810) may report to a base station 830 for sidelink HARQ-ACK feedback information received from the other wireless user device (e.g., the NR V2X Rx UE 820) through an NR Uu uplink channel.

A base station and/or a wireless user device may communicate for one or more HARQ codebook determinations. For example, NR HARQ codebook may be determined for NR sidelink HARQ report. If a wireless user device (e.g., a Tx UE) is configured with a base station scheduling mode (hereinafter, mode 1) as a sidelink resource allocation mode, the base station may schedule one or more resources for sidelink communication between wireless user devices. The wireless user device (e.g., the Tx UE) may transmit a PSSCH (e.g., sidelink data channel) through a sidelink channel to another wireless user device (e.g., an Rx UE), and may receive sidelink HARQ-ACK feedback information about the PSSCH, from the other wireless user device (e.g., the Rx UE) through a PSFCH. If the wireless user device (e.g., Tx UE) is in the base station scheduling mode, the wireless user device (e.g., the Tx UE) may transmit the sidelink HARQ-ACK feedback information received from the other wireless user device (e.g., the Rx UE) to a base station (e.g., through an NR Uu link) to inform the base station regarding whether to perform retransmission rescheduling. The wireless user device (e.g., the Tx UE) may transmit the corresponding sidelink HARQ-ACK feedback information to the base station through an NR Uu uplink channel (e.g., PUCCH or PUSCH).

The wireless user device (e.g., the Tx UE) may transmit Channel Status Information (CSI) (e.g., HARQ-ACK, CQI, PMI, RI, etc.) on an NR Uu link through the uplink channel of the wireless user device (e.g., the Tx UE). For example, the wireless user device (e.g., the Tx UE) may multiplex sidelink HARQ feedback information with CSI and transmit the sidelink HARQ feedback information multiplexed with CSI (e.g., on the NR Uu link). The wireless user device (e.g., the Tx UE) may transmit the CSI on the NR Uu link and the sidelink HARQ feedback information together using the same resource. Accordingly, it may be possible to reduce the number of times the wireless user device reports such information to the base station and to improve the reporting efficiency. For example, if the wireless user device simultaneously reports the CSI on the NR Uu link and the sidelink HARQ feedback information to the base station through multiplexing, a HARQ codebook for reporting the aforementioned information may need to be determined. One or more methods for determining the HARQ codebook will be described based on the aforementioned description.

Figure 9:
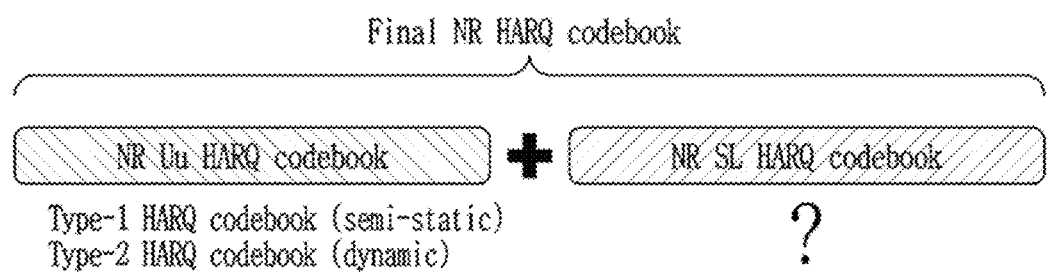
FIG. 9 illustrates an example sidelink HARQ codebook.

The wireless user device (e.g., an NR V2X Tx UE) may report to the base station for sidelink HARQ-ACK feedback information about mode 1 sidelink unicast transmission through an NR Uu (UL). The wireless user device (e.g., the Tx UE) may acquire HARQ feedback information from another wireless user device (e.g., the Rx UE) through the PSFCH with respect to sidelink data transmission performed based on a mode 1 resource allocation method. The wireless user device (e.g., the Tx UE) may multiplex sidelink HARQ feedback information and Uu HARQ feedback information and simultaneously transmit the sidelink HARQ feedback information and the Uu HARQ feedback information for downlink data transmission on the NR Uu link through the same physical channel in the same slot. If the wireless user device (e.g., the Tx UE) transmits HARQ feedback information associated with different links (Uu link/SL link) to the base station through the same physical resource in the same slot, the wireless user device (e.g., the Tx UE) may need to verify a multiplexing method to be applied. Referring to FIG. 9, configurations of a HARQ codebook operating on an NR Uu link may be classified into a type-1 HARQ codebook scheme (semi-static) and a type-2 codebook scheme (dynamic). A codebook scheme configured for the wireless user device (e.g., the Tx UE) may be configured through RRC signaling from the base station. The type-1 HARQ codebook (e.g., used on the NR Uu link) may refer to a method of configuring a HARQ codebook based on semi-static parameter configuration. The wireless user device (e.g., the Tx UE) may be configured with the type-1 HARQ codebook through upper layer signaling from the base station. The type-1 HARQ codebook may be configured, for example, based on at least one of: an associated PDSCH transmission slot timing value that can be transmitted in a single uplink slot, a PDSCH slot format (slot/non-slot), and/or a subcarrier spacing configuration between a downlink and an uplink. The type-1 HARQ codebook may be configured for a TDD scheme, for example, based on a slot/non-slot for PDSCH reception by further considering a TDD UL-DL configuration. However, aspects are not limited thereto.

The type-2 HARQ codebook may refer to a method of configuring a HARQ codebook based on a dynamic indicator (e.g., a downlink assignment indicator (DAI)) within a PDCCH. The wireless user device (e.g., the Tx UE) may be configured with the type-2 HARQ codebook through upper layer signaling from the base station. A method for configuring the type-2 HARQ codebook may be a scheme of providing an accumulative/total number of PDSCH scheduling to the wireless user device (e.g., the Tx UE) through a DAI field within the PDCCH (DCI format 1_0/1_1) indicating PDSCH scheduling information that can be transmitted in a single uplink slot. The type-2 HARQ codebook scheme may provide a further efficient codebook size and composition compared to the type-1 HARQ codebook.

The wireless user device (e.g., the Tx UE) may simultaneously multiplex sidelink HARQ feedback and Uu link feedback information and transmit sidelink HARQ feedback and Uu link feedback information. In determining the HARQ codebook, a final NR Uu HARQ codebook may need to be configured by further considering sidelink HARQ codebook composition.

Figure 10:
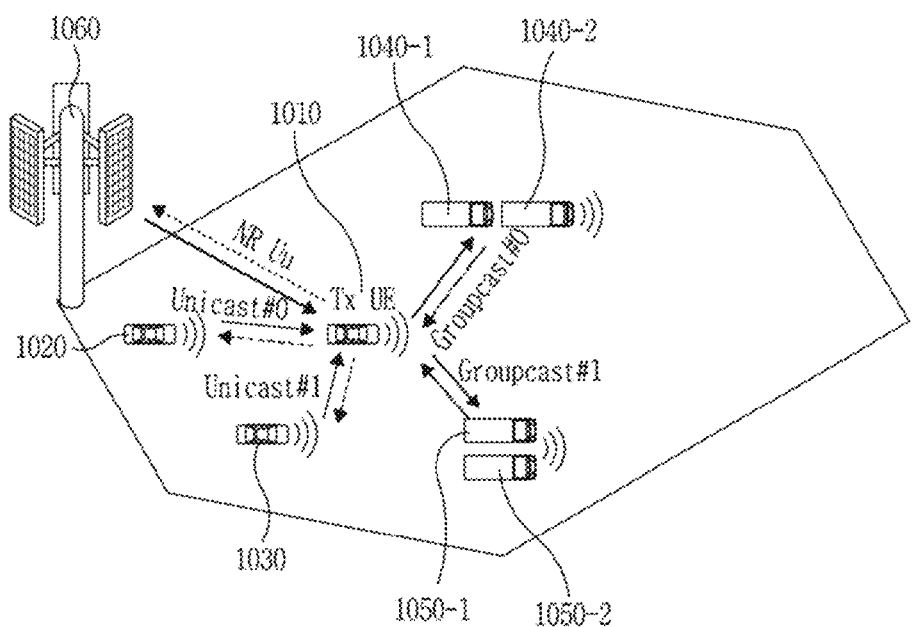
FIG. 10 illustrates an example sidelink scenario.

Referring to FIG. 10, a wireless user device (e.g., Tx UE 1010) may operate in an RRC connected mode on a single serving cell. If the wireless user device (e.g., the Tx UE 1010) operates based on mode 1, the wireless user device (e.g., the Tx UE 1010) may perform sidelink communication through resources allocated from a base station (e.g., a gNB 1060) for sidelink communication. For example, the wireless user device (e.g., the Tx UE 1010) may receive, as a resource allocation for sidelink communication through an NR Uu link from the base station, a specific NR DCI format (e.g., NR DCI format for SL V2X communication) through a PDCCH. The wireless user device (e.g., the Tx UE 1010) may perform sidelink communication with another wireless user devices (e.g., Rx UEs) based on the received information. The wireless user device (e.g., the Tx UE 1010) may perform sidelink communication with the other wireless user devices (e.g., Rx UEs) based on at least one of unicast, groupcast and broadcast transmissions. The wireless user device (e.g., the Tx UE 1010) may establish a session with another wireless user device (e.g., an Rx UE) for each cast. For example, the base station may configure the respective cast transmissions to have a 1:1 relationship or an N:1 relationship with a single resource pool in the corresponding wireless user device (e.g., Tx UE 1010). The N:1 relationship may represent that N (one or a plurality of) unicast, groupcast, and broadcast transmissions are configured to operate in a single resource pool. For example, referring to FIG. 10, two unicast sessions and two groupcast sessions may be established in the wireless user device (e.g., the Tx UE 1010). For example, the wireless user device (e.g., the Tx UE 1010) may establish a unicast session with each of other wireless user devices (e.g., UEs 1020 and 1030). The wireless user device (e.g., the Tx UE 1010) may establish a groupcast session with a plurality of wireless user devices (e.g., UEs 1040-1 and 1040-2). The wireless user device (e.g., the Tx UE 1010) may establish a groupcast session with another plurality of wireless user devices (e.g., UEs 1050-1 and 1050-2).

A sidelink HARQ feedback report performed by a wireless user device (e.g., a Tx UE) for a base station may be performed for a data transmission corresponding to a unicast transmission. For example, the sidelink HARQ feedback report performed by the wireless user device (e.g., the Tx UE) for the base station may be performed for a data transmission corresponding to unicast and groupcast transmissions. The wireless user device (e.g., the UE) may report sidelink HARQ feedback to the base station, for example, based on at least one of: unicast and groupcast transmissions without performing the sidelink HARQ feedback report for a broadcast transmission.

A sidelink data transmission in which the wireless user device (e.g., Tx UE) report sidelink HARQ feedback information to the base station is described. In one or more configurations, only the unicast transmission may be performed (unicast only). In one or more other configurations, unicast and groupcast transmissions may be performed (unicast+groupcast). In an operation of reporting sidelink HARQ feedback information to the base station, it may be considered only the unicast transmission or all of the unicast and groupcast transmissions.

A sidelink HARQ codebook may be configured based on an operation of reporting, by the wireless user device (e.g., the Tx UE), a sidelink HARQ information bit to the base station in a single uplink slot. For example, if the HARQ codebook is configured, the same sidelink HARQ information bit may be transmitted in a single uplink slot. However, an occasion relationship corresponding to a single uplink slot may differ as shown in the following Table 13. For example, the occasion relationship may be defined by considering a PSFCH occasion. In one or more configurations, the occasion relationship may be defined without considering the PSFCH occasion. Hereinafter, a method of configuring the sidelink HARQ codebook by considering all of the relationships shown in the following Table 13 will be described.

TABLE 13

PSSCH occasion -> PSFCH occasion -> one UL slot (e.g. one PUCCH)
PSSCH occasion -> one UL slot (e.g. one PUCCH)

_Sidelink HARQ codebook may be determined semi-statically, for example, for PUSCCH and/or PUSCH transmissions. For example, a wireless user device (e.g., a UE) may be configured with a type-1 HARQ codebook (pdsch-HARQ-ACK-Codebook=semi-static) for HARQ feedback transmission about an NR PDSCH transmission. A sidelink HARQ codebook may also be configured based on the type-1 HARQ codebook. The wireless user device (e.g., the Tx UE) may be configured with the sidelink HARQ codebook based on the type-1 HARQ codebook, for example, if the type-1 HARQ codebook (pdsch-HARQ-ACK-Codebook=semi-static) for HARQ feedback transmission about an NR PDSCH transmission is configured.

The sidelink HARQ codebook may be defined as an independent sidelink type-1 codebook (pssch-HARQ-ACK-Codebook=semi-static). For example, the wireless user device (e.g., the Tx UE) may be configured with the sidelink HARQ codebook based on RRC signaling from a base station. The wireless user device (e.g., the Tx UE) may be configured with the sidelink HARQ codebook through a pre-configuration.

For example, if the wireless user device (e.g., the Tx UE) is configured with the independent sidelink codebook type, HARQ codebook combinations for a Uu link and a sidelink may be represented by the following Table 14. Each of a Uu HARQ codebook and a sidelink HARQ codebook may be configured as the type-1 HARQ codebook and the type-2 HARQ codebook and may be configured based on four cases as show in the following Table 14.

TABLE 14

| |
| --- |
| Uu Type1, SL Type 1 |
| Uu Type1, SL Type 2 |
| Uu Type2, SL Type 1 |
| Uu Type2, SL Type 2 |

For example, the type-1 sidelink HARQ codebook may be determined based on a PSFCH occasion or a PSSCH occasion. The type-1 sidelink HARQ codebook may be determined by considering an active DL BWP, an active UL BWP, and an active SL BWP on a single service cell. The wireless user device (e.g., the Tx UE) may determine a PSFCH occasion set associated with a single uplink slot (e.g., PUCCH/PUSCH transmission slot). For a sidelink HARQ operation, a candidate PSSCH occasion associated with the PSFCH occasion may be pre-configured. The wireless user device (e.g., the Tx UE) may determine a PSSCH occasion set associated with a single uplink slot. PSSCH occasions may be regarded/assumed to be associated with a single uplink slot. For example, in the case of configuring the type-1 sidelink HARQ codebook, the wireless user device (e.g., the Tx UE) may verify a unicast and/or groupcast session associated with the active SL BWP and configured in the wireless user device (e.g., the Tx UE). The wireless user device (e.g., the Tx UE) may determine whether a sidelink feedback transmission is enabled or disabled for each unicast or groupcast session.

For the sidelink HARQ codebook configuration, a number of associated unicast or groupcast PSSCH occasions ($N_{pssch\_occasion}^{psfch}$) may be considered per single PSFCH occasion on the active SL BWP. The unicast or groupcast PSSCH occasion may be considered to determine whether a session in which sidelink HARQ feedback is configured on the sidelink is sidelink HARQ ACK or NACK. For example, if the sidelink HARQ feedback is disabled, NACK may be fixed in the sidelink HARQ codebook (e.g., at all times) with respect to a corresponding PSSCH transmission, for example, although the wireless user device (e.g., the Tx UE) performs a sidelink unicast or groupcast PSSCH transmission.

For the sidelink HARQ codebook configuration, one or more PSFCH time resources may be configured. For example, a PSFCH may be present per N slots. N may be one of various values. For example, as described above with reference 6, N=1, 2, or 4 (or any other number). A minimum time gap may be determined by considering a processing time of the wireless user device (e.g., the UE). PSSCH occasions associated with a single PSFCH transmission slot and a number thereof may be determined based on a configuration about transmission timing correlation between the PSSCH and the PSFCH and signaling. For the sidelink HARQ codebook configuration, at least one PSSCH occasion may configure a descending or ascending codebook.

Figure 11:
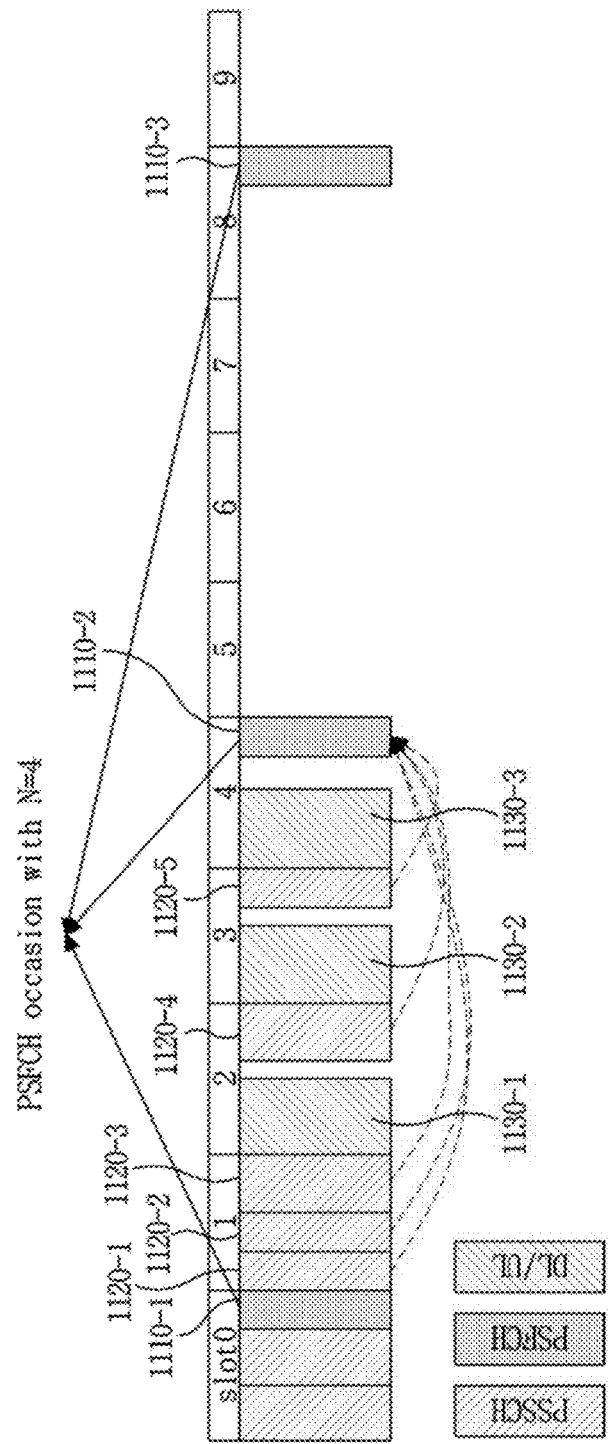
FIG. 11 illustrates an example method for reporting sidelink HARQ feedback to a base station.

Referring to FIG. 11, a case in which at least one PSSCH occasion transmission is present within a single sidelink slot may be considered. FIG. 11 illustrates an example in which a PSSCH is transmitted based on a non-slot. PSSCH occasions 1120-1, 1120-2, 1120-3, 1120-4, and 1120-5 and an associated PSFCH occasion 1110-2 may be present. For the sidelink HARQ codebook configuration, the PSSCH occasions 1120-1, 1120-2, 1120-3, 1120-4, and 1120-5 and a number thereof may be considered. A PSSCH occasion may correspond to a unicast or groupcast transmission and a broadcast transmission may not consider the PSSCH occasion.

For example, if a wireless user device (e.g., the Tx UE) transmits the PSSCH to another wireless user device (e.g., an Rx UE) based on a unicast session, the wireless user device (e.g., the Tx UE) may transmit a single transport block (TB). HARQ feedback information for a single unicast PSSCH transmission may be 1 bit. For example, a case in which all of PSSCH occasions corresponding to $N_{pssch\_occasion}^{psfch}$ are unicast PSSCH transmissions may be considered. For example, it may be a case in which sidelink HARQ feedback is enabled. The wireless user device (e.g., the Tx UE) may determine a number of sidelink HARQ feedback information bits as many as a number of $N_{pssch\_occasion}^{psfch}$. The number of information bits corresponding to the number of $N_{pssch\_occasion}^{psfch}$ may be required based on each PSSCH transmission. A case in which the wireless user device (e.g., the Tx UE) performs a PSSCH transmission based on a code block group (CBG) in a sidelink may be considered. For example, HARQ feedback may be performed based on each CBG within a single TB. A number of sidelink HARQ feedback information bits as many as a number of CBGs may be generated. For example, the number of sidelink HARQ feedback information bits corresponding to the number of CBG within a single TB may be generated. For example, if 10 CBGs are included in a single TB, SL HARQ for a single TB (PSSCH) may include 10 bits for the respective CBGs.

A case in which at least one PSSCH occasion in $N_{pssch\_occasion}^{psfch}$ corresponds to a groupcast transmission may be considered. An option of reporting sidelink HARQ "ACK/NACK" feedback information may be configured. For example, Option 1 may refer to a case in which the wireless user device (e.g., the Tx UE) reports to a base station for only "NACK" feedback information in sidelink HARQ feedback information for the groupcast transmission. The wireless user device (e.g., the Tx UE) may report only "NACK" feedback information to the base station by considering only a transmission failure. Only NACK may be present in sidelink HARQ information. If the wireless user device (e.g., the Tx UE) receives at least NACK on the same PSFCH resource from another wireless user device (e.g., one or more of the Rx UEs) within a group, the wireless user device (e.g., the Tx UE) may report NACK to the base station through an uplink channel. If the wireless user device (e.g., the Tx UE) does not receive any NACK, the wireless user device (e.g., the Tx UE) may report ACK through the uplink channel.

Option 2 may refer to a case in which the wireless user device (e.g., the Tx UE) forwards HARQ ACK/NACK for each PSSCH. For example, in the case of groupcast PSSCH, a number of sidelink HARQ feedback information bits as many as a number of Rx wireless user devices (e.g., the Rx UEs) ($N_{RX\_UE}^{groupcast}$) associated with a groupcast may need to be determined. Each of the wireless user devices (e.g., the UEs within a group) may be identified based on a valid group wireless device ID (e.g., a valid group UE ID)

within the group. HARQ feedback information bit order for a corresponding groupcast transmission may be determined in descending or ascending order based on an ID value for identifying a wireless user device (e.g., a UE) within the corresponding group. For a groupcast PSSCH transmission in Option 1, only a sidelink bit may be generated. Since the wireless user device (e.g., the Tx UE) transmits ACK/NACK feedback information based on the entire groupcast, only a single sidelink bit may be required, which may be identical to unicast. For Option 2, each HARQ feedback information bit may be required for each PSSCH transmission within groupcast and thus, a number of sidelink HARQ feedback information bits corresponding to the number of Rx wireless user devices (e.g., the Rx UEs) ($N_{RX\_UE}^{groupcast}$) may be required.

Figure 12:
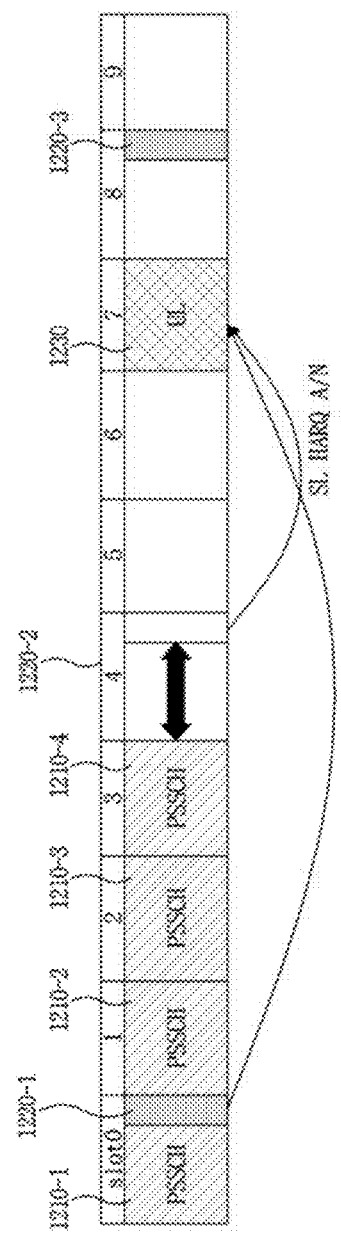
FIG. 12 illustrates an example method for reporting sidelink HARQ feedback to a base station.

The type-1 sidelink HARQ codebook may be determined based on a number of PSFCH occasions ($N_{psfch\_occasion}^{pucch}$) associated with a single PUCCH transmission slot on an active UL BWP. Referring to FIG. 12, one or more PSFCH occasions 1220-1 and 1220-2 may be associated with a single PUCCH transmission slot 1230. The wireless user device (e.g., the Tx UE) may determine a number of available PSFCH occasions ($N_{psfch\_occasion}^{pucch}$) based on transmittable candidate PSFCH slot timing (e.g., PSFCH occasions 1220-1, 1220-2, and 1220-3). The type-1 sidelink HARQ codebook may be configured by considering the number of PSFCH occasions ($N_{psfch\_occasion}^{pucch}$).

The type-1 sidelink HARQ codebook may be determined by considering the SCS ratio ($2^{\mu_{SL}-\mu_{UL}}$) between the sidelink BWP and the uplink BWP. For example, a case in which an SCS value of a sidelink BWP differs from that of an uplink BWP may be considered. The following proposed type-2 sidelink HARQ codebook may be determined by considering the SCS ratio between the sidelink BWP and the downlink BWP. For example, if sidelink communication is performed based on SL V2X carrier aggregation (CA) or dual-connectivity (DC), the sidelink BWP and the uplink BWP may have different SCS values. For example, if the sidelink BWP and the uplink BWP have different SCS values, a ratio of the number of PSFCH/PSSCH occasions associated with a single PUCCH (UL) transmission slot may vary. For example, the ratio may be valid even for the wireless user device (e.g., the UE) configured with the sidelink V2X CA/DC. A case in which sidelink unicast or groupcast transmission is performed through a single serving cell (carrier) (SCell) may be considered. For example, the wireless user device (e.g., the Tx UE) may transmit sidelink HARQ feedback information about the aforementioned transmission to the base station through the uplink channel (PUCCH/PUSCH) on PSCell or PCell that is another serving cell. An SCS of an uplink BWP of the PCell or PSCell may differ from an SCS of a sidelink BWP of a sidelink serving cell. For example, if the SCSs differ from each other, a number of slots included in a single subframe may differ. For example, if a u value of μ value of the above Table 2 increases, a number of slots included in a single subframe may increase and a time length of a single slot may decrease. If a sidelink HARQ feedback transmission is performed through the uplink channel, the wireless user device (e.g., the UE) may consider a slot ratio. If an SCS between the sidelink BWP and the uplink BWP is identical at all times, the aforementioned ratio may not be considered to configure the type-1 sidelink codebook.

Although a slot timing value is described based on a sidelink, a case of including a downlink/uplink slot may be considered. For example, TDD UL-DL configuration common may be indicated by a System Information Block (SIB). The wireless user device (e.g., the Tx UE) may receive an indication of TDD-UL-DL configuration dedicated through RRC signaling. In determining slot timing based on slot information acquired as above, the wireless user device (e.g., the Tx UE) may not consider non-corresponding slot timing to determine the number of occasions.

The wireless user device (e.g., the Tx UE) may determine the type-1 HARQ codebook for transmitting sidelink HARQ feedback information through the uplink channel based on the aforementioned information.

A candidate PSSCH occasion or PSFCH occasion ($M_{SL,c}$) associated with a single uplink slot (PUCCH or PUSCH) for a single serving cell to determine the type-1 HARQ codebook may be determined. If the candidate PSSCH occasion or PSFCH occasion ($M_{SL,c}$) associated with the uplink slot is determined, a set of slot timing values $K_{SL}$, between a slot associated with the sidelink BWP and the uplink BWP and the PSSCH/PSFCH occasion may be considered. For example, $K_{SL}$ may be configured by an upper layer or may be indicated to the wireless user device (e.g., the Tx UE) through a pre-configuration. If the aforementioned upper layer signaling is absent, default $K_{SL}$ value (e.g., 1, 2, 3, 4, 5, 6, 7, 8) may be used. Slot timing may be used even for non-slot scheduling.

A scaled TB or CBG within a single PSSCH occasion for determining the type-1 HARQ codebook may be considered. For example, if transmission is performed based on the TB, T=1 HARQ bit may be generated for a single PSSCH occasion, for example, as described above. If transmission is performed based on the CBG, $T=N_{CBG}^{TB}$ HARQ bits corresponding to a number of CBGs configured per a single TB may be generated, for example, as described above.

A cast type and a sidelink feedback option scheduled within a single PSSCH occasion for determining the type-1 HARQ codebook may be considered. For example, in the case of a unicast PSSCH, if sidelink feedback is enabled, a number of sidelink feedback information bits may be T HARQ bits. In the case of a single TB, it may be 1 bit. In the case of a plurality of CBGs, T HARQ bits may be configured based on a number of CBGs. For a groupcast PSSCH, if sidelink HARQ feedback is enabled, the number of sidelink information bits may consider a number of Rx wireless user devices (e.g., the Rx UEs). For example, in the case of the aforementioned Option 2, a number of HARQ bits corresponding to a multiplication between the T bits and the number of Rx wireless user devices (e.g., the Rx UEs) may be generated. For the aforementioned Option 1, the number of sidelink information bits may be determined as the T bits, without considering the number of Rx wireless user devices (e.g., the Rx UEs).

The number of sidelink HARQ feedback information bits for the groupcast PSSCH may be generated as fixed K HARQ bits regardless of a groupcast option. The SCS ratio between the active sidelink BWP and the active uplink BWP for determining the type-1 HARQ codebook may be considered. For example, if TDD UL-DL configuration is provided, downlink and uplink OFDM symbols may be excluded from the PSSCH/PSFCH occasion by considering TDD UL-DL configuration. The PSSCH or PSFCH occasion ($M_{SL,c}$) determined for the serving cell c may sort sidelink HARQ information bits in descending order/ascending order of the slot timing values, for example, as described above.

To configure the type-1 sidelink HARQ codebook, the base station may provide additional information related to unicast/groupcast to the wireless user device (e.g., the Tx UE). The base station may allocate a resource for sidelink data transmission to the wireless user device (e.g., the Tx UE) that operates based on mode 1. For example, the base station may simply allocate only the resource for the sidelink data transmission and the wireless user device (e.g., the Tx UE) may determine for which unicast session or groupcast session the wireless user device (e.g., the Tx UE) may perform the sidelink data transmission using the allocated resource. The base station may simply indicate a resource to be used for the sidelink and may not clearly verify whether the wireless user device (e.g., the Tx UE) has performed the data transmission for which unicast session or groupcast session on the scheduled resource.

For a groupcast transmission, the wireless user device (e.g., the Tx UE) may receive sidelink HARQ information bits for the groupcast transmission and may report the corresponding information bits to the base station. As described above, the base station may be unaware of whether the wireless user device (e.g., the Tx UE) has performed PSSCH transmission for which groupcast session on a specific PSSCH occasion. In the case of unicast, the base station may not be clearly aware of for which unicast session the wireless user device (e.g., the Tx UE) has performed the PSSCH transmission on a specific PSSCH occasion.

The base station may not be clearly aware of a PSSCH transmission associated with a single sidelink HARQ information bit. By considering this aspect, the base station may configure at least one of a destination ID field, an SL HARQ process number field, and a new data indicator (NDI) field within an SL DCI format and may provide session information for resource scheduling to the mode 1 wireless user device (e.g., the mode 1 Tx UE) through the configured field. The wireless user device (e.g., the Tx UE) may schedule an initial transmission or a retransmission for unicast, groupcast, or broadcast based on resource allocation information and session information received from the base station. Through this, for which unicast or groupcast session the PSSCH transmission is performed on the PSSCH occasion may become clear. In this manner, an issue regarding HARQ codebook composition may be resolved.

In the case of the groupcast transmission, sidelink HARQ feedback may allow K HARQ bits to be generated regardless of the sidelink HARQ feedback option (e.g., Option 1 or Option 2). For example, a K value may be the aforementioned T value. The K value may be a value acquired by multiplying the T value by the number of Rx wireless user device (e.g., the Rx UEs). Uncertainty that may occur in the groupcast transmission may be removed or reduced. For example, the K value may be configurable through RRC signaling.

Figure 13:
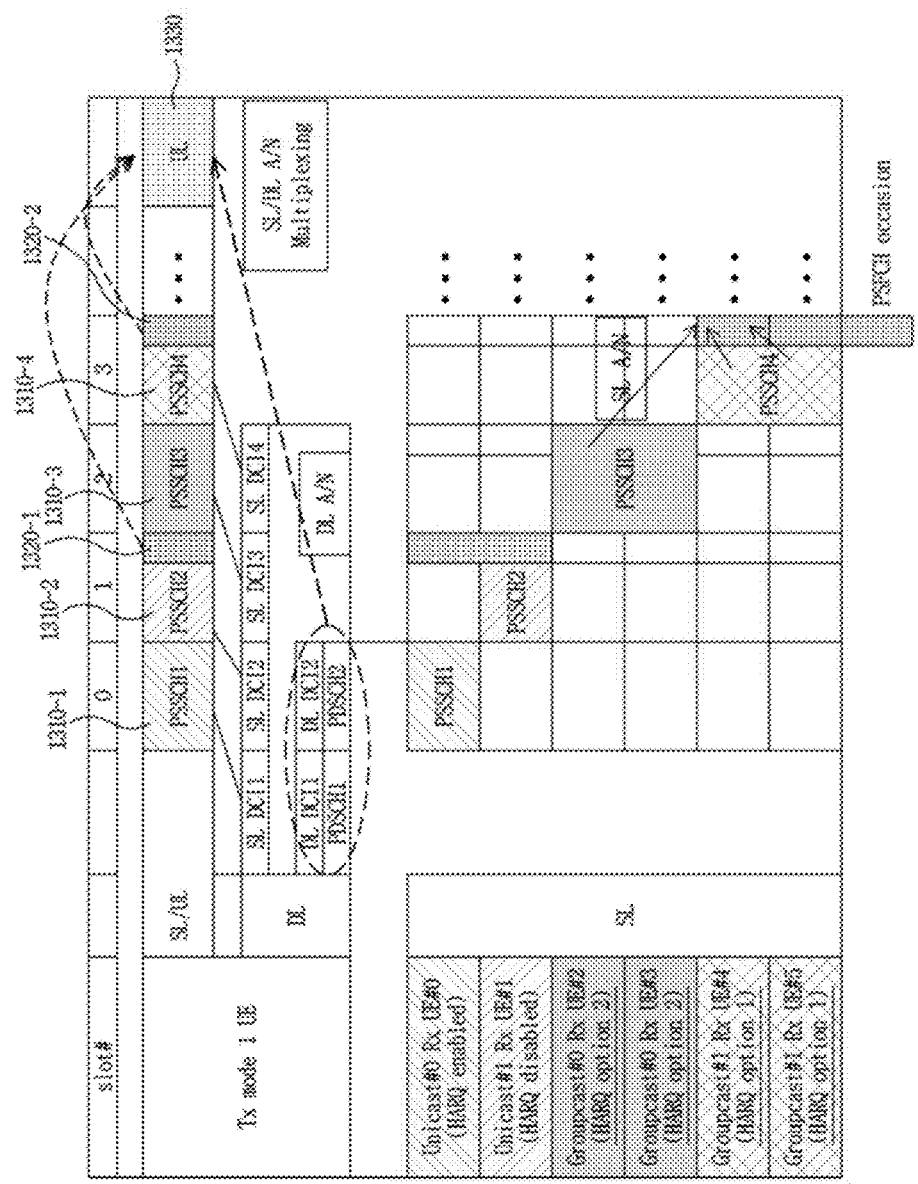
FIG. 13 illustrates an example method for reporting sidelink HARQ feedback to a base station.

Referring to FIG. 13, a wireless user device (e.g., the Tx UE) that operates based on mode 1 may connect a base station (e.g., gNB) to an RRC connected mode as a serving base station. The wireless user device (e.g., the Tx UE) may operate based on the aforementioned mode 1 for sidelink communication. The wireless user device (e.g., the Tx UE) may additionally provide a sidelink V2X service on a licensed carrier on which a cellular data service is provided through an NR Uu link. For example, based on the aforementioned description, the wireless user device (e.g., the Tx UE) may perform HARQ report about a downlink data transmission (PDCCH/PDSCH) in a specific uplink slot 1330. The wireless user device (e.g., the Tx UE) may perform sidelink communication with another wireless user device (e.g., the Rx UE) based on at least one of unicast and groupcast transmissions. The wireless user device (e.g., the Tx UE) may report to the base station for the sidelink HARQ feedback report received from another wireless user device (e.g., an Rx UE). For example, as described above, the wireless user device (e.g., the Tx UE) may simultaneously transmit the HARQ feedback about the downlink data transmission (PDCCH/PDSCH) and the HARQ feedback about the sidelink through multiplexing in the specific uplink slot 1330.

The wireless user device (e.g., the Tx UE) may transmit a PSSCH1 1310-1 to another wireless user device (e.g., an Rx UE 0) through a unicast session 0. The wireless user device (e.g., the Tx UE) may receive sidelink feedback information from the wireless user device (e.g., the Rx UE 0) through the PSFCH 1320-1 of slot 1. For example, HARQ feedback about the unicast session 0 may be in an enabled state. For example, the wireless user device (e.g., the Tx UE) may transmit a PSSCH2 1310-2 to another wireless user device (e.g., an Rx UE 1) through a unicast session 1 and may receive sidelink HARQ feedback information from the wireless user device (e.g., the Rx UE 1) through the PSFCH 1310-2 of the slot 1. Since HARQ feedback about the unicast session 1 may be in a disabled state, the wireless user device (e.g., the Tx UE) may not receive sidelink HARQ feedback from the wireless user device (e.g., the Rx UE 1). The wireless user device (e.g., the Tx UE) may transmit a PSSCH3 1310-3 to other wireless user devices (e.g., an Rx UE 2 and an Rx UE 3) through a groupcast session 0 as a single groupcast session. In the groupcast session 0, HARQ report may be performed based on the aforementioned HARQ Option 2. Each of the wireless user devices (e.g., the RX UE 2 and the RX UE 3) may transmit HARQ ACK/NACK to the wireless user device (e.g., the Tx UE) through the PSFCH 1320-2 of a slot 3. The wireless user device (e.g., the Tx UE) may transmit each piece of sidelink HARQ feedback information to the base station based on a number of Rx wireless user devices (e.g., the Rx UEs) in the specific uplink slot 1330.

The wireless user device (e.g., the Tx UE) may transmit a PSSCH4 1310-4 to wireless user devices (e.g., an Rx UE 4 and an Rx UE 5) through a groupcast session 1 as another groupcast session. In the groupcast session 1, HARQ report may be performed based on the aforementioned HARQ Option 1. Each of the Rx wireless user devices (e.g., the Rx UE 4 and the Rx UE 5) may transmit HARQ ACK/NACK to the Tx wireless user device (e.g., the Tx UE) through the PSFCH 1320-2 of the slot 3. If all of the HARQ feedback information received from the Rx wireless user device (e.g., the Rx UEs) is ACK, the Tx wireless user device (e.g., the Tx UE) may transmit HARQ-ACK to the base station as sidelink HARQ feedback information in the specific uplink slot 1330. If even a single piece of the HARQ feedback information received from the Rx wireless user device (e.g., the Rx UEs) is NACK, the Tx wireless user device (e.g., the Tx UE) may transmit HARQ-NACK to the base station as sidelink HARQ feedback information in the specific uplink slot 1330. For example, all of the groupcast 0 and the groupcast 1 may be in an enabled state.

The wireless user device (e.g., the Tx UE) may configure a codebook by considering the aforementioned situation. For example, the wireless user device (e.g., the Tx UE) may determine an associated unicast or groupcast PSSCH occasion per a single PSFCH occasion on an active sidelink BWP. For example, although description of FIG. 13 is made based on an example in which a PSSCH is transmitted based on a slot, a non-slot-based transmission may apply as described above. Although description of FIG. 13 is made based on an example in which a PSSCH is transmitted based on a TB, CBG-based transmission may also apply as described above.

The wireless user device (e.g., the Tx UE) may determine a PSFCH occasion associated with a single PUCCH transmission slot on an active uplink BWP. For example, in FIG. 13, two PSFCH occasions 1320-1 and 1320-2 may be associated with a single PUCCH transmission slot, for example, the specific uplink slot 1330. For example, the SCS ratio ($2^{\mu_{SL}-\mu_{UL}}$) between the sidelink BWP and the uplink BWP may be determined (e.g., a ratio between a sidelink SCS configuration $\mu_{SL}$ and an uplink SCS configuration $\mu_{UL}$). For example, although the SCS ratio between the sidelink BWP and the uplink BWP may be 1:1 in FIG. 13, aspects are not limited thereto. As described above, a PSSCH/PSFCH occasion not corresponding to the sidelink based on TDD UL-DL configuration may be excluded. A sidelink codebook may be determined based on the aforementioned description. In the case of FIG. 13, the sidelink codebook may be determined as shown in FIG. 14. In the unicast 0, HARQ feedback is enabled and only the TB is considered and thus, 1-bit HARQ information may be required. In the unicast 1, HARQ feedback is disabled and thus, HARQ feedback may be NACK and 1-bit HARQ information may be required. In the groupcast 0, HARQ feedback is reported based on Option 2 and thus, 2-bit HARQ feedback may be required based on the number of Rx wireless user devices (e.g., the Rx UEs). In the groupcast 1, only NACK information is reported to the base station based on Option 1 and thus, 1-bit HARQ feedback may be required and the sidelink HARQ codebook may include 5 bits. A codebook for sidelink HARQ may be generated and may be finally reported to the base station through an uplink channel in concatenation with an NR Uu HARQ codebook. A concatenation scheme may refer to a scheme of generating a final NR HARQ codebook by attaching the determined sidelink HARQ codebook right after the NR Uu HARQ codebook. A plurality of PDSCH occasions and PSSCH occasions or PSFCH occasions associated with a single UL slot (e.g., PUCCH/PUSCH Tx slot) may be concatenated between associated HARQ bits in time order.

Figure 15:
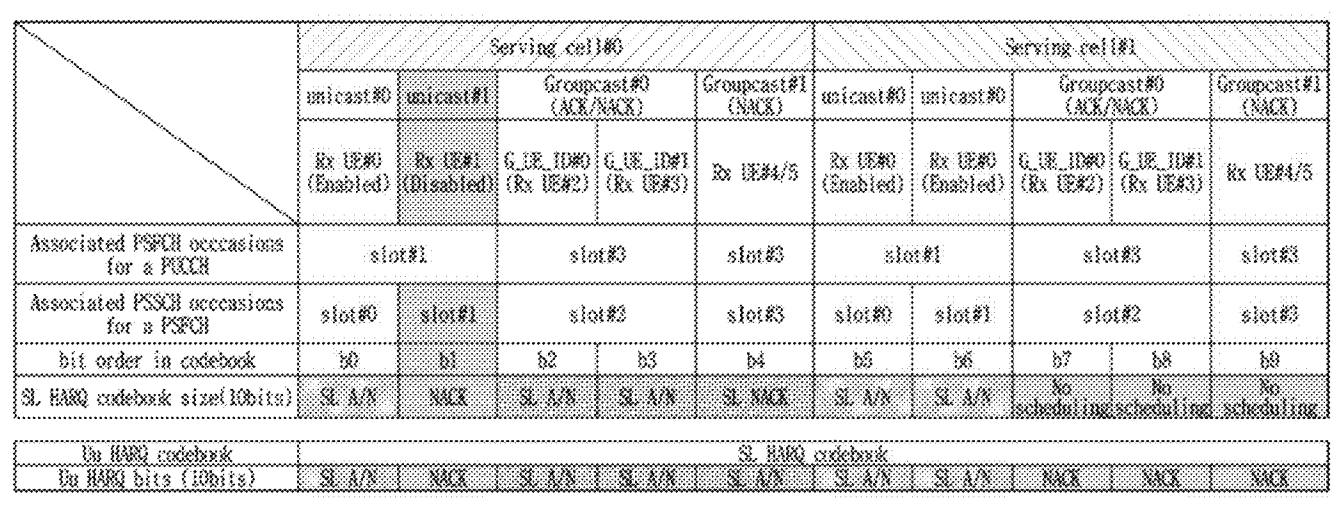

FIG. 15 illustrates an example of determining a sidelink HARQ codebook by considering a carrier aggregation (CA)/dual connectivity (CD). For example, if a wireless user device (e.g., the Tx UE) performs sidelink communication, the wireless user device (e.g., the Tx UE) may perform sidelink communication based on at least two serving cells. For example, FIG. 15 illustrates an example in which the wireless user device (e.g., the Tx UE) is configured with two serving cells (serving cell 0 and serving cell 1). Sidelink HARQ feedback may be configured for each serving cell. A sidelink HARQ codebook may be configured for each serving cell based on at least one of a PSSCH/PSFCH occasion, a sidelink HARQ report option, and a sidelink HARQ enable/disable status for each serving cell. A final sidelink HARQ codebook may be configured by concatenating codebooks for the respective serving cells. For example, in FIG. 15, a 5-bit sidelink HARQ codebook may be configured for each serving cell. The final sidelink HARQ codebook may be configured as a 10-bit sidelink HARQ codebook by concatenating the respective sidelink HARQ codebooks. In the sidelink HARQ codebook, sidelink HARQ feedback about a PSSCH transmission associated with each bit may be scheduled based on a lowest serving cell index. In the sidelink HARQ codebook, subsequent bits may be scheduled based on a subsequent serving cell index, and such scheduling may end in a highest serving cell index. In the sidelink HARQ codebook, sidelink HARQ feedback about a PSSCH transmission associated with each bit may be scheduled based on a highest serving cell index. In the sidelink HARQ codebook, subsequent bits may be scheduled based on a subsequent serving cell index, and such scheduling may end in a lowest serving cell index. The final sidelink HARQ codebook may be configured based on the sidelink HARQ codebooks configured for the respective serving cells.

The wireless user device (e.g., the Tx UE) may map sidelink ACK/NACK information based on the configured sidelink HARQ codebook and thereby transmit the same to the base station. If a wireless user device (e.g., an Rx UE) does not successfully receive a PSSCH transmitted from the Tx wireless user device (e.g., the Tx UE) in a state in which HARQ feedback is enabled, the Rx wireless user device (e.g., the Rx UE) may map NACK for the corresponding PSSCH transmission and may feedback the same to the Tx wireless user device (e.g., the Tx UE) through a PSFCH. If the Rx wireless user device (e.g., the Rx UE) successfully receives the PSSCH transmitted from the Tx wireless user device (e.g., the Tx UE), the Rx wireless user device (e.g., the Rx UE) may map ACK for the corresponding PSSCH transmission and may feedback the same to the Tx wireless user device (e.g., the Tx UE) through the PSFCH. For example, if the Rx wireless user device (e.g., the Rx UE) successfully receives the PSSCH transmitted from the Tx wireless user device (e.g., the Tx UE), the Rx wireless user device (e.g., the Rx UE) may not perform the PSFCH transmission for the corresponding PSSCH transmission. The Rx wireless user device (e.g., the Rx UE) may perform the PSFCH transmission only for NACK. If the PSFCH is not received, the Tx wireless user device (e.g., the Tx UE) may determine that the PSSCH transmission is a success. Although sidelink HARQ feedback is in a disabled state, the Tx wireless user device (e.g., the Tx UE) may transmit the PSSCH to the Rx wireless user device (e.g., the Rx UE). If the sidelink HARQ feedback is disabled, a sidelink HARQ bit corresponding to a corresponding PSSCH occasion may be mapped to NACK (e.g., at all times).

If the Tx wireless user device (e.g., the Tx UE) transmits a PSSCH to the Rx wireless user device (e.g., the Rx UE) in a state in which sidelink HARQ feedback is disabled, the Tx wireless user device (e.g., the Tx UE) may map sidelink HARQ feedback report for the corresponding PSSCH transmission to ACK (e.g., at all times) and may transmit the same to the base station. If the sidelink HARQ feedback is disabled, the Tx wireless user device (e.g., the Tx UE) may map the sidelink HARQ feedback report to a preconfigured state and transmit the same to the base station.

Since the semi-statically configured type-1 sidelink codebook may be basically configured based on a PSSCH occasion, there may be a need to configure sidelink HARQ feedback for an unscheduled PSSCH occasion. A corresponding sidelink HARQ bit may be mapped to NACK (e.g., at all times). For example, a corresponding sidelink HARQ bit may be mapped to ACK (e.g., at all times). Although a sidelink HARQ bit is configured by considering the PSSCH occasion, the Tx wireless user device (e.g., the Tx UE) may map the sidelink HARQ bit to a pre-configured state and report the same to the base station since the PSSCH occasion is not scheduled.

As described above with reference to FIG. 15, sidelink HARQ bits may be sorted for each cast (unicast/groupcast) session configured in the wireless user device (e.g., the Tx UE) instead of being sorted based on a serving cell index. For example, a sidelink HARQ codebook may configure a sidelink HARQ bit based on a lowest cast index (e.g., unicast #0). The HARQ codebook may configure a sidelink HARQ bit based on a lowest PSSCH/PSFCH occasion index in each cast. The sidelink HARQ codebook may configure a sidelink HARQ bit based on a subsequent cast index and may end such sidelink HARQ bit composition in a cast having a highest index. The sidelink HARQ codebook may configure a sidelink HARQ bit based on a highest cast index (e.g., unicast #1). The HARQ codebook may configure a sidelink HARQ bit based on the lowest (or highest) PSSCH/PSFCH occasion index in each cast. The sidelink HARQ codebook may configure a sidelink HARQ bit based on a subsequent cast index and may end such sidelink HARQ bit composition in a cast having a lowest index. In this manner, sidelink HARQ bits may be sorted.

Figure 16:
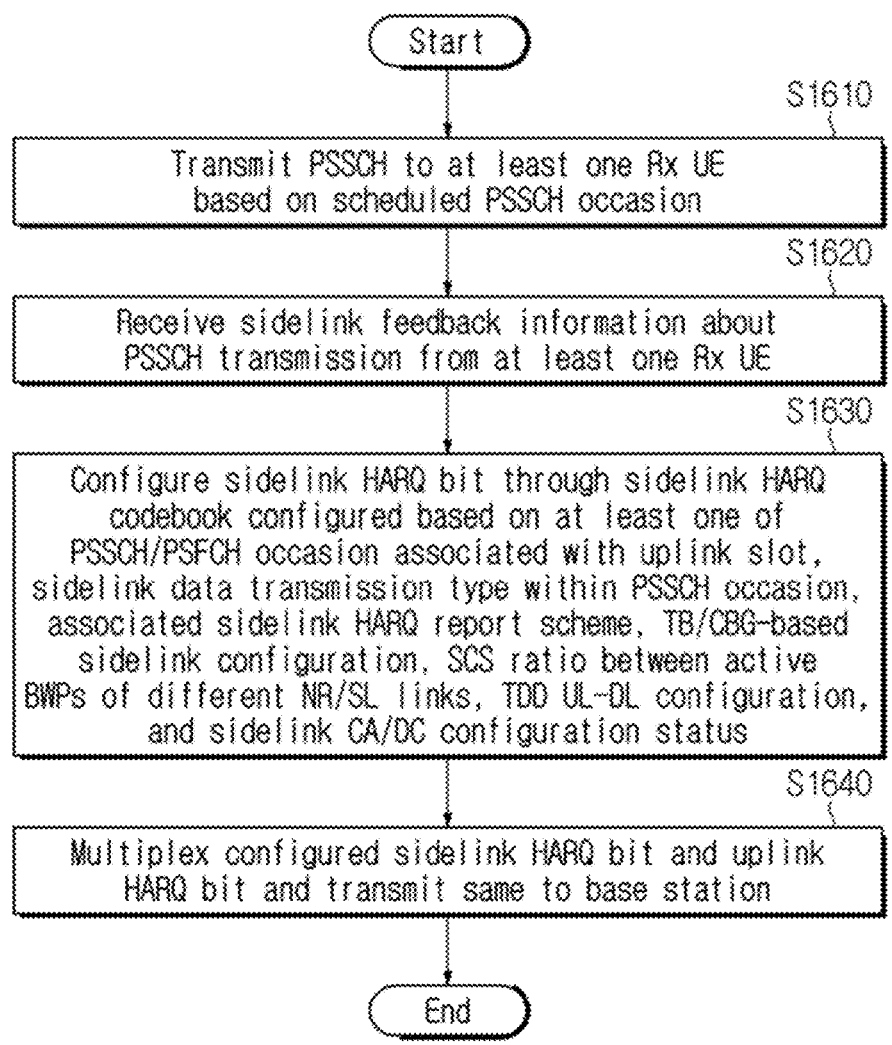
FIG. 16 is a flowchart illustrating an example method for semi-statically determining a sidelink HARQ codebook.

FIG. 16 is a flowchart illustrating an example method for reporting sidelink HARQ feedback to a base station based on a sidelink HARQ codebook. Referring to FIG. 16, the Tx wireless user device (e.g., the Tx UE) may transmit a PSSCH to at least one Rx wireless user device (e.g., the Rx UE) based on a scheduled PSSCH occasion (S1610). The wireless user device (e.g., the Tx UE) may refer to a wireless user device that performs sidelink communication based on a resource allocated by the base station based on mode 1. The wireless user device (e.g., the Tx UE) may be aware of session information associated with the PSSCH transmission based on at least one of SL DCI format, destination ID, sidelink HARQ number, and NDI fields.

The wireless user device (e.g., the Tx UE) may receive sidelink feedback information about the PSSCH transmission from the at least one Rx wireless user device (e.g., the Rx UE) (S1620). The wireless user device (e.g., the Tx UE) may receive sidelink HARQ feedback information through a PSFCH associated with the PSSCH occasion. The wireless user device (e.g., the Tx UE) may receive sidelink HARQ feedback information based on a cast type. As described above, sidelink HARQ bit information may differ depending on whether the sidelink HARQ feedback information is single TB-based feedback information or CBG-based feedback information. In the case of groupcast, sidelink HARQ bit information may differ based on a number of Rx wireless user device (e.g., the Rx UEs). For example, in the case of the aforementioned Option 1, if the Tx wireless user device (e.g., the Tx UE) receives NACK from at least one Rx wireless user device (e.g., the Rx UE), the Tx wireless user device (e.g., the Tx UE) may map sidelink HARQ feedback to NACK. The sidelink HARQ feedback may include a single bit, which may be similar to unicast. In the case of the aforementioned Option 2, the Tx wireless user device (e.g., the Tx UE) may receive ACK/NACK from each of Rx wireless user device (e.g., the Rx UEs). As described above, a number of bits for sidelink HARQ feedback may differ based on the number of Rx wireless user device (e.g., the Rx UEs). The wireless user device (e.g., the Tx UE) may configure a sidelink HARQ bit through a sidelink HARQ codebook configured based on at least one of a PSSCH/PSFCH occasion associated with an uplink slot, a sidelink data transmission type (unicast/groupcast) within the PSSCH occasion, an associated sidelink HARQ report scheme (Option 1/Option 2), TB/CBG-based sidelink scheduling, an SCS ratio between active BWPs of different NR/SL links, TDD UL-DL configuration, and a sidelink CA/DC configuration status (S1630). The wireless user device (e.g., the Tx UE) may multiplex the configured sidelink HARQ bit and an uplink HARQ bit and transmit the same to the base station (S1640). As described above, the sidelink HARQ codebook may be configured to be concatenated with the uplink HARQ codebook.

Figure 27:
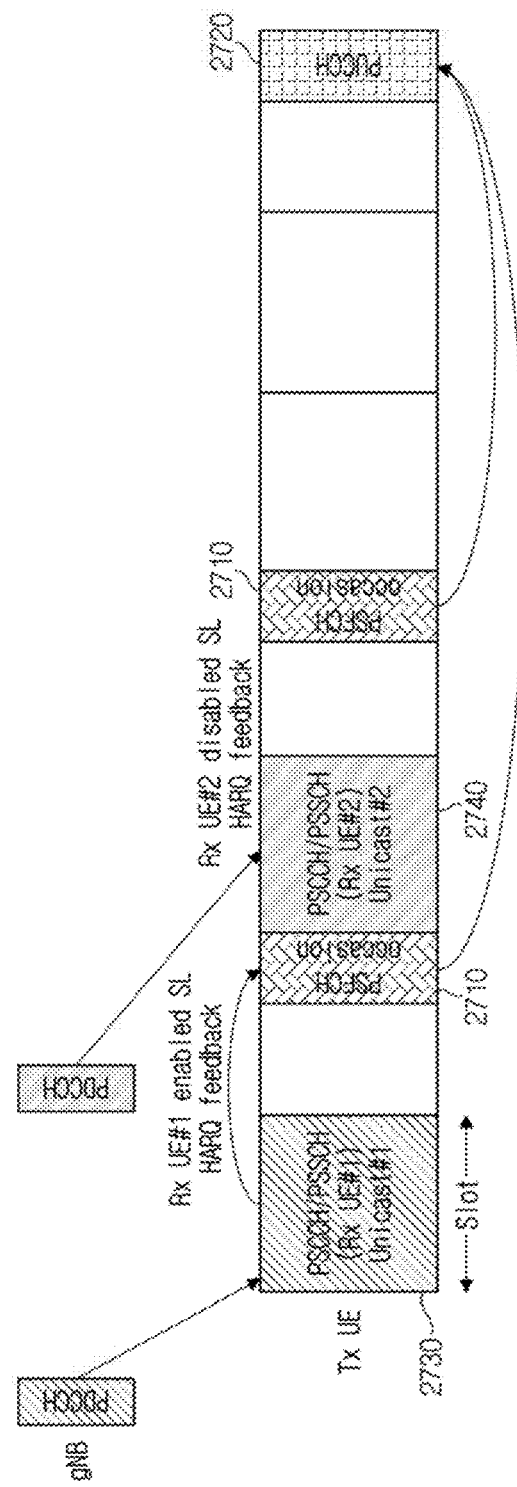
FIG. 27 illustrates an example for a transmitting user equipment (Tx UE) that determines an SL HARQ-ACK state.

FIG. 27 illustrates an example of a case in which a wireless user device requires a necessary SL HARQ-ACK state determining method in a specific situation.

Referring to the example of FIG. 27, a base station (e.g., a gNB) transmits two PDCCHs (SL grants) to the wireless user device (e.g., the Tx UE) for SL transmission resource scheduling of a first PSCCH/PSSCH (RX UE #1, Unicast #1) and a second PSCCH/PSSCH (Rx UE #2, Unicast #2). A Tx resource pool configured in the corresponding wireless user device (e.g., the Tx UE) may refer to a resource pool configured with PSFCH resources. In FIG. 27, the corresponding Tx resource pool is configured such tat that a PSFCH occasion may be present per two slots. Each of PSCCH/PSSCH transmission slots scheduled through the two PDCCHs has a single associated PSFCH occasion as described above. SL HARQ-ACK information received by the corresponding wireless user device (e.g., the Tx UE) from an Rx wireless user device (e.g., an Rx UE) is reported to the base station (e.g., the gNB) through an uplink (Uu link) PUCCH/PUSCH transmission. A codebook (e.g., a number of SL HARQ-ACK bits commonly understood by a base station and the Tx wireless user device) configured for SL HARQ feedback to be transmitted on the PUCCH/PUSCH corresponds to a type-1 codebook (i.e., semi-static codebook). As discussed above, the type-1 codebook may provide configuration regarding PSFCH occasions associated with a single PUCCH transmission through RRC signaling and a size of the SL HARQ-ACK codebook to report SL HARQ feedback to the base station is determined based on the configuration. For example, referring to FIG. 27, with the assumption that two PSFCH occasions 2710 are associated with a single PUCCH transmission 2720 and it is configured through the RRC signaling, the type-1 codebook is configured using two SL HARQ-ACK bits corresponding to the respective PSFCH occasions and the two SL HARQ-ACK bits may be reported to the base station through the PUCCH (or PUSCH) transmission. SL transmission resources indicated through the received PDCCHs (SL grants) may be used to perform SL data (PSCCH/PSSCH) transmission through two different Rx wireless user devices (e.g., Rx UEs) or different unicast/groupcast/broadcast transmissions based on SL scheduling determination of the wireless user device (e.g., the Tx UE). While the first PSCCH/PSSCH transmission 2730 is performed with respect to SL HARQ feedback enabled Rx UE/radio bearer/cast type, the second PSCCH/PSSCH transmission 2740 may be performed with respect to SL HARQ feedback disabled Rx UE/radio bearer/cast type (e.g., SL HARQ feedback disabled unicast/groupcast or broadcast not requiring SL HARQ feedback). The wireless user device (e.g., the Tx UE) expects SL HARQ feedback reception from the Rx wireless user device (e.g., Rx UE), for example, only with respect to the first PSCCH/PSSCH transmission, and may not expect SL HARQ feedback reception from the Rx wireless user device (e.g., Rx UE) associated the second PSCCH/PSSCH transmission. This is because SL feedback is disabled or SL feedback is not required with respect to the UE/radio bearer/cast type corresponding to the second transmission. The wireless user device (e.g., the Tx UE) does not expect PSFCH reception in the second PSFCH occasion associated with the second PSCCH/PSSCH transmission. Since the PSFCH is not received, the wireless user device (e.g., Tx UE) may determine an SL HARQ-ACK state for the corresponding PSFCH occasion as "NACK" at all times and may report the same to the base station through a PUCCH. Such Tx wireless user device (e.g., Tx UE) operation may cause an erroneous misalignment and/or an incorrect indication that the Tx wireless user device (e.g., Tx UE) requests the base station to retransmit resources for the second PSCCH/PSSCH transmission. This is because the base station is unaware of whether data is transmitted to actual SL HARQ feedback enabled Rx UE/bearer/cast type with respect to the second transmission resource. If the Tx wireless user device (e.g., Tx UE) reports NACK to the base station as above, transmission of SL data that is transmitted to the SL HARQ feedback enabled Rx wireless user device (e.g., RX UE) may be incorrectly indicated as a failure. As a result, the Tx wireless user device (e.g., Tx UE) may additionally perform unnecessary PDCCH transmission (SL grant for retransmission) for retransmission of the base station. To resolve the above issue, if the Tx wireless user device (e.g., Tx UE) needs to report SL HARQ feedback to the base station with respect to the above case (e.g., the PSCCH/PSSCH transmission for which SL HARQ feedback is disabled or SL HARQ feedback is not required, such as broadcast transmission), an SL HARQ-ACK state corresponding to the corresponding PSFCH occasion may be allocated as "ACK" at all times and the wireless user device (e.g., Tx UE) may report the same to the base station. In this manner, the base station may avoid additional PDCCH scheduling for retransmission of the PSCCH/PSSCH and may avoid unnecessary system overhead and operation associated PDCCH reception of the wireless user device (e.g., UE) accordingly.

Dynamic SL HARQ codebook may be configured. The sidelink HARQ codebook may be configured based on dynamic signaling. For example, the codebook configured based on dynamic signaling may be a type-2 sidelink codebook. For example, if an NR Uu type-2 HARQ codebook (pdsch-HARQ-ACK-Codebook=dynamic) is configured, the sidelink HARQ codebook may also be configured as a type-2 sidelink HARQ codebook. A Tx wireless user device (e.g., a Tx UE) may configure the sidelink HARQ codebook based on dynamic signaling and may transmit the configured sidelink HARQ codebook to a base station through an uplink channel. For example, the base station may define/determine a sidelink codebook composition configuration (pssch-HARQ-ACK-Codebook=dynamic) and may allow the wireless user device (e.g., the Tx UE) to operate based on the aforementioned type-2 sidelink HARQ codebook, for example, based on RRC signaling or a pre-configuration.

If the wireless user device (e.g., the Tx UE) is configured with the type-2 sidelink HARQ codebook, the wireless user device (e.g., the Tx UE) may determine PDCCH occasions (for PDSCH or PDSCH SPS release scheduling) and PSSCH occasions associated with a single uplink slot (PUCCH transmission slot) based on related timing values, for an active DL BWP, an active UL BWP, and an active SL BWP on a single serving cell. Available candidate sets may be configured based on a configuration about timing relationship between the PSSCH/PSFCH occasion and the UL slot (PUCCH/PUSCH) of the aforementioned semi-static SL HARQ codebook determination.

For the aforementioned semi-static SL HARQ codebook determination, the HARQ codebook may be statically configured by considering available candidate PSSCH/PSFCH occasions, and a size of the sidelink HARQ codebook may be predetermined and all of the Tx wireless user device (e.g., the Tx UE) and the base station may verify clear information. For the aforementioned semi-static SL HARQ codebook determination, an unnecessary sidelink HARQ feedback bit may be set, which may cause an inefficient sidelink HARQ codebook size. A method for configuring the sidelink HARQ codebook based on dynamic signaling is described by considering the above aspect.

The HARQ codebook for (e.g., actually) scheduled PDSCH or PDSCH SPS release may be configured through a downlink assignment indicator (DAI) field within a PDCCH in association with NR Uu. By considering this, the sidelink HARQ codebook may be configured by defining/determining a sidelink assignment indicator (SAI) field within an SL DCI format.

For example, only a counter SAI may be defined in the SL DCI format. An accumulative number of sidelink PDCCH monitoring occasions (e.g., where unicast or groupcast PSSCH transmissions are scheduled, up to a current PDCCH monitoring occasion including each SL DCI) may be indicated based on the counter SAI. For example, a total SAI may be defined/determined. For example, the total SAI may indicate a total number of unicast or groupcast PSSCH scheduling, scheduled up to a current sidelink PDCCH monitoring occasion.

A candidate PSSCH or PSFCH occasion ($M_{SL,c}$) associated with a single uplink slot (PUCCH or PUSCH) for a serving cell c may be determined. Slot timing values between a UL slot associated with the sidelink BWP/uplink BWP and the PSSCH/PSFCH occasion may be a set of $K_{SL}$. For example, $K_{SL}$, may be configured by the upper layer or may be indicated to the wireless user device (e.g., the UE) through a pre-configuration. If there is no upper layer signaling or pre-configuration, default $K_{SL}$ may be used. For example, default $K_{SL}$ may be "$\{1, 2, 3, 4, 5, 6, 7, 8\}$". Default K_SL may have larger various timing values than the above values. Slot timing may be available for non-slot scheduling. A slot timing value may apply based on a non-slot structure. The wireless user device (e.g., the Tx UE) may receive the SL DCI format through SL DCI. The SL DCI format may include Counter-SAI (C-SAI) or Counter-DSAI (C-DSAI). The SL DCI format may include Total-SAI (T-SAI) or Total-DSAI (T-DSAI). Similar to the aforementioned semi-static SL HARQ codebook determination, TB or CBG-based scheduling may be performed within a single PSCCH occasion. For example, if TB-based scheduling is performed, a number of sidelink HARQ feedback information bits may be 1 bit (T=1 HARQ bit) by considering only a single TB. If CBG-based scheduling is performed, a number of sidelink HARQ feedback information bits may be T bits (T=$N_{CBG}^{TB}$ HARQ bits) based on a number $N_{CBG}^{TB}$ of CBGs configured per a TB. A cast type and sidelink HARQ feedback option scheduled within a single PSSCH occasion may be considered. In the case of a unicast PSSCH and sidelink HARQ feedback enabled, the number of sidelink HARQ feedback information bits may be T bits. In the case of the aforementioned Option 2 corresponding to a groupcast PSSCH and sidelink HARQ feedback enabled, the number of sidelink HARQ feedback information bits may be determined through a multiplication of the T bits and the number of Rx wireless user devices (e.g., the Rx UEs) (T×R_UE HARQ bits). In the case of the aforementioned Option 1 corresponding to the groupcast PSSCH and sidelink HARQ feedback enabled, the number of sidelink HARQ feedback information bits may be the T bits. On PSSCH or PSFCH occasions ($M_{SL,c}$) determined for the serving cell c, sidelink HARQ feedback information bits may be sorted in (ascending/descending) order of C-SAI or C-DSAI values. If another serving cell is configured based on CA/DC, sidelink HARQ feedback information bits may be sorted even or subsequent another serving cell based on the aforementioned method.

If a Counter_Sidelink assignment indicator (C_SAI) value indicated through a C_SAI field value within the SL DCI format increases by 1, the sidelink HARQ codebook may be differently determined. The sidelink HARQ codebook may be differently configured through dynamic signaling. If a C_SAI value increases by 1, a sidelink HARQ codebook bit may change. For example, if sidelink DCI scheduling for unicast PSSCH (HARQ enable) or groupcast PSSCH (HARQ Option 1 enable) is provided with a C_SAI value, the Tx wireless user device (e.g., the Tx UE) may determine that sidelink HARQ feedback information corresponds to T bits. For example, if TB-based scheduling is performed within the PSSCH occasion, a number of sidelink HARQ feedback information bits may be 1 bit. If CBG-based scheduling is performed within the PSSCH occasion, a number of sidelink HARQ feedback information bits may be T bits based on a number of CBGs. The sidelink HARQ codebook may be generated by a number of added bits.

If SL DCI scheduling for groupcast PSSCH (HARQ Option 2 enable) is provided with a C_SAI value, the Tx wireless user device (e.g., the Tx UE) may generate sidelink HARQ bit information based on the number of Rx UEs within a group. For example, if the groupcast PSSCH is based on a CBG, the number of sidelink HARQ feedback information bits may be generated by a value acquired by multiplying the number of Rx wireless user devices (e.g., the Rx UEs), for example, by the number of CBGs per TB (Rx UE×CBG per TB).

Figure 17:
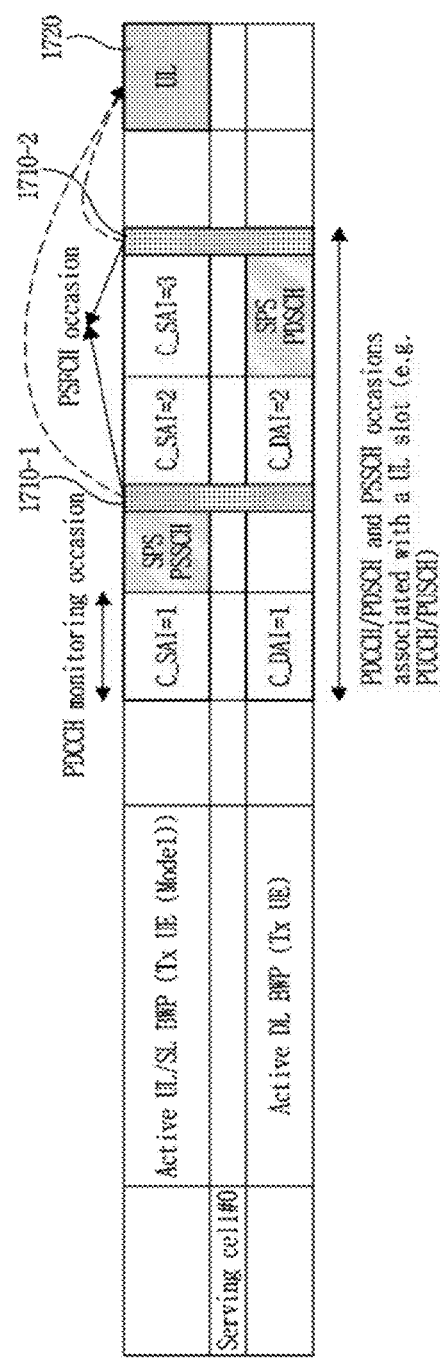
FIG. 17 illustrates an example method for dynamically determining a sidelink HARQ codebook.

Referring to FIG. 17, a C_SAI value may be additionally indicated based on dynamic signaling with respect to C_DAI for a downlink BWP. C_DAI and C_SAI may be separated and indicated. In a sidelink HARQ codebook, sidelink HARQ feedback information bits may be sorted based on the aforementioned C_SAI. A Tx wireless user device (e.g., the Tx UE) may transmit a PSSCH to an Rx wireless user device (e.g., an Rx UE) based on a PDCCH monitoring occasion included in SL DCI. The wireless user device (e.g., the Tx UE) may receive sidelink feedback information about the corresponding PSSCH from the Rx wireless user device (e.g., the Rx UE) through a PSFCH 1710-1. The SL DCI may include the aforementioned C_SAI, and sidelink HARQ feedback information bits may vary in the sidelink codebook based on C_SAI. If the same C_SAI value is scheduled for the Tx wireless user device (e.g., the Tx UE), the Tx wireless user device (e.g., the Tx UE) may configure different sidelink codebooks based on a cast type of sidelink HARQ and a sidelink HARQ option of the corresponding cast type. For example, referring to part (a) of FIG. 18, all of C_SAI values may be associated with a unicast transmission type, and sidelink HARQ bits corresponding to T bits may be sorted for the respective SAI values. For example, as described above, a number of sidelink HARQ bits may be 1 bit based on a TB and may be T bits based on a CBG. If two TB transmissions are allowed (configured) even in a PSSCH, such as NR Uu, the number of sidelink HARQ feedback information bits may be associated with 2 bits every time a single SAI value increases. The NR Uu may be configured by an upper layer such that two TB s are transmitted for a single PDSCH on a corresponding serving cell. Every time a single C_DAI value increases, 2 NR Uu HARQ bits may be associated.

Figure 18:
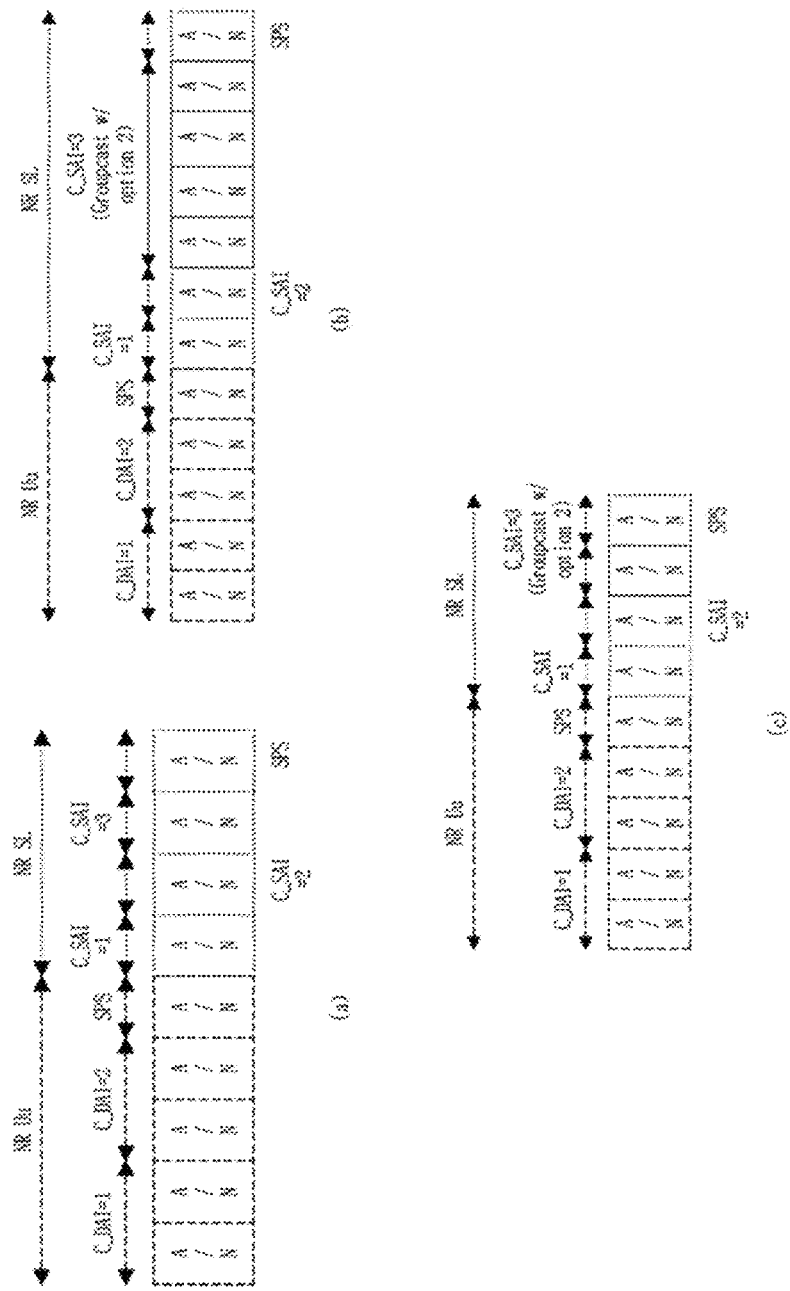
FIG. 18 illustrates an example method for dynamically determining a sidelink HARQ codebook.

Part (b) of FIG. 18 illustrates a case in which the groupcast transmission is configured and the sidelink HARQ feedback option is 2. If a groupcast PSSCH transmission including C_SAI=3 is scheduled for the Tx wireless user device (e.g., the Tx UE), the number of sidelink HARQ feedback information bits corresponding to the number of Rx wireless user devices (e.g., the Rx UEs) within the corresponding group may be associated with a single SAI value. Part (c) of FIG. 18 illustrates a case in which the groupcast transmission is configured and the sidelink HARQ feedback option is 1. If the groupcast PSSCH transmission including C_SAI=3 is scheduled for the Tx wireless user device (e.g., the Tx UE), a single sidelink HARQ feedback bit may be associated with a SAI value. In the case of sidelink HARQ feedback Option 2, the Tx wireless user device (e.g., the Tx UE) may receive sidelink HARQ information bits for the respective wireless user devices from the Rx wireless user devices (e.g., the Rx UEs) through independent PSFCH resources, respectively. The wireless user device (e.g., the Tx UE) may report the same to the base station through the uplink channel and may assist the base station with determining a scheduling method for retransmission. In the case of sidelink HARQ feedback Option 1, a single sidelink HARQ feedback information bit may be associated per C_SAI, which may be similar to the unicast transmission.

If PSSCH SPS transmission is present on a timing occasion associated with the uplink slot, it may be allocated at the end of a HARQ codebook determined based on DAI/SAI. For example, if PDSCH SPS is present on the corresponding occasion with the PSSCH SPS, they may be mapped at the end of a Uu HARQ codebook and SL HARQ codebook determined based on the DAI and the SAI, respectively. If at least one SPS transmission is performed, all of the at least one SPS transmission may be arranged at the end of the HARQ codebook and the first received SPS may be allocated in order from the back. HARQ information bits for the PDSCH SPS and the PSSCH SPS may be mapped, for example, after the Uu HARQ codebook and the SL HARQ codebook determined based on the DAI and the SAI.

Figure 19:
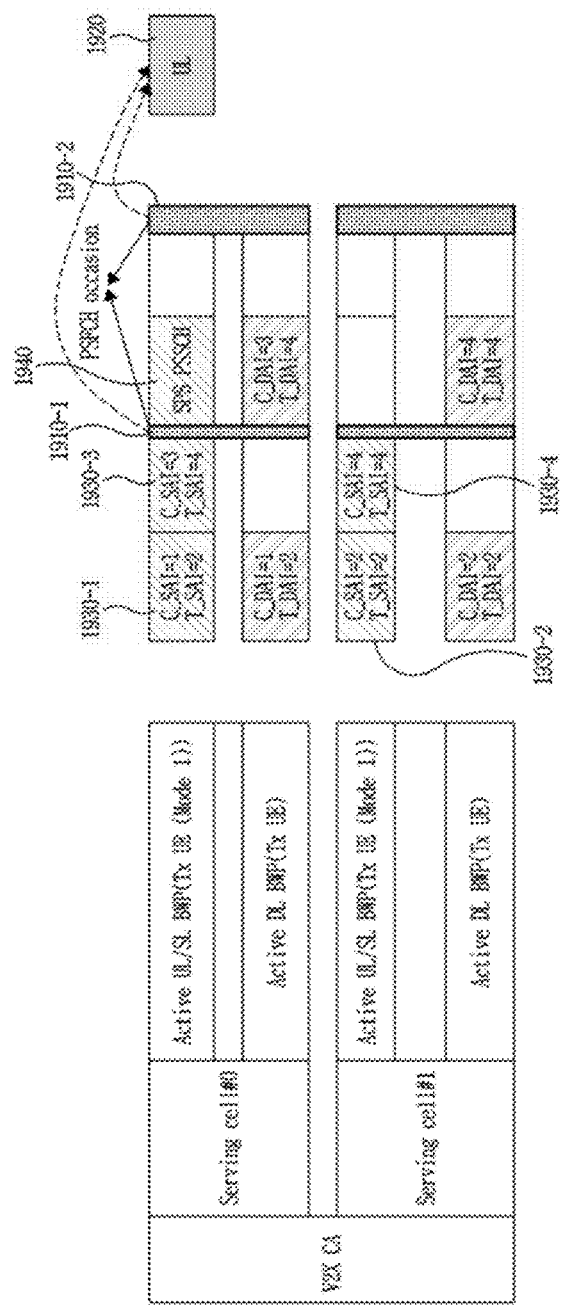
FIG. 19 illustrates an example method for dynamically determining a sidelink HARQ codebook by considering a sidelink multicarrier.

FIG. 19 illustrates an example method for configuring a sidelink codebook by considering a sidelink multicarrier (CA/DC). If sidelink communication is performed based on a multicarrier, a T_SAI value may be indicated with C_SAI per each PDDCH monitoring occasion. The T_SAI value may indicate a total accumulative number of PSSCH scheduling up to a current PDCCH monitoring occasion. The T_SAI value may indicate a refreshed value per each PDCCH occasion. Referring to FIG. 19, although sidelink communication is performed based on the multicarrier, sidelink HARQ feedback information may be reported to a base station in an uplink slot associated with PSFCH occasions 1910-1 and 1910-2, for example, as described above. A C_SAI value may apply alike in the same or similar manner as the aforementioned sidelink HARQ bit sorting manner. A C_SAI value may be determined based on a serving cell index. For example, the C_SAI value may be determined in ascending order from a low serving cell index to a high serving cell index (or in descending order). The C_SAI value may be determined by another method. In FIG. 19, the C_SAI value may be 1 in a PDCCH monitoring occasion 1930-1 for serving cell 0 and the C_SAI value may be 2 in a PDCCH monitoring occasion 1930-2 for serving cell 1. The C_SAI value of the serving cell 0 may be 3 in a PDCCH monitoring occasion 1930-3 for subsequent serving cell 0 and the C_SAI value of the serving cell 1 may be 4 in a PDCCH monitoring occasion 1930-4 for subsequent serving cell 1. The T_SAI value may be a total SAI value in a corresponding PDCCH monitoring occasion. In the first PDCCH monitoring occasions 1930-1 and 1930-2 for the respective serving cells 0 and 1, the T_SAI value may be 2.

In the PDCCH monitoring occasions 1930-3 and 1930-4 for the subsequent other serving cells 0 and 1, the T_SAI value may be 4.

Table 15 may show a C_SAI value and a T_SAI value within a sidelink DCI format. For example, a SAI value may be defined as shown in Table 15 as a 2-bit field within the SL DCI format. In Table 15, a K value may indicate an accumulative SAI (C-SAI) or total SAI (T-SAI) value of received SL DCI in a serving cell and a PDCCH monitoring occasion (for SL DCI). The C-SAI value may indicate an accumulative number of sidelink scheduling up to a specific PDCCH monitoring occasion. In the case of sidelink CA (or DC), the C-SAI value may indicate an accumulative number of sidelink scheduling in a frequency domain (e.g., a serving cell index) within the same PDCCH monitoring occasion. As described above, the T_SAI value may indicate a total number of sidelink scheduling up to the specific PDCCH monitoring occasion.

Figure 20:
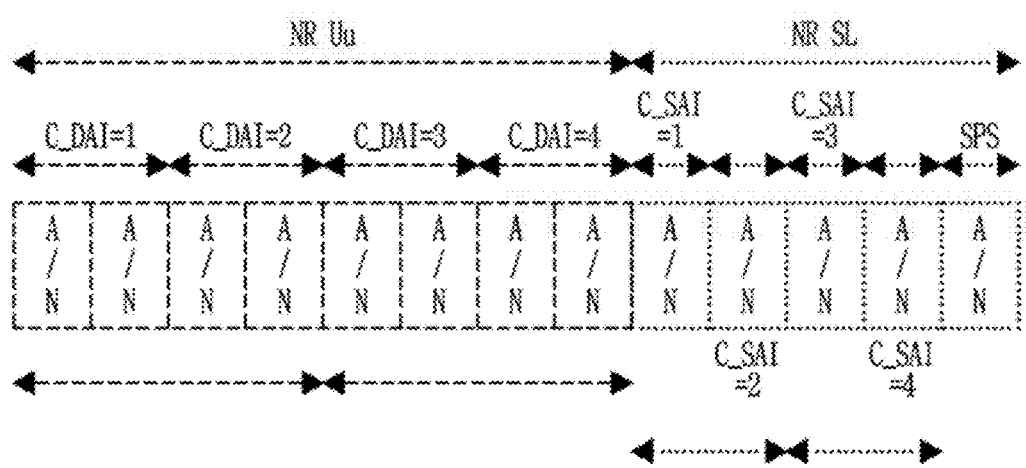
FIG. 20 illustrates an example method for configuring a sidelink HARQ feedback information bit.

Referring to FIG. 20, a sidelink HARQ feedback information bit may be associated with a sidelink HARQ feedback information bit determined by considering at least one of a sidelink HARQ option and a cast type per C_SAI. As described above, if PSSCH SPS transmission is present on a timing occasion associated with the uplink slot, it may be allocated at the end of a HARQ codebook determined based on DAI/SAI.

TABLE 15

| SAI MSB, LSB | $V_{C\text{-}SAI}^{SL}$ or $V_{T\text{-}SAI}^{SL}$ | Number of serving cells, PDCCH monitoring occasions in which SPS PSSCH release indicated by PDCCH or PSSCH transmisson associated with SL DCI (PDCCH) in present (K and K ≥ 1) |
|---|---|---|
| 0, 0 | 1 | (K − 1)mod4 + 1 = 1 |
| 0, 1 | 2 | (K − 1)mod4 + 1 = 2 |
| 1, 0 | 3 | (K − 1)mod4 + 1 = 3 |
| 1, 1 | 4 | (K − 1)mod4 + 1 = 4 |

Figure 21:
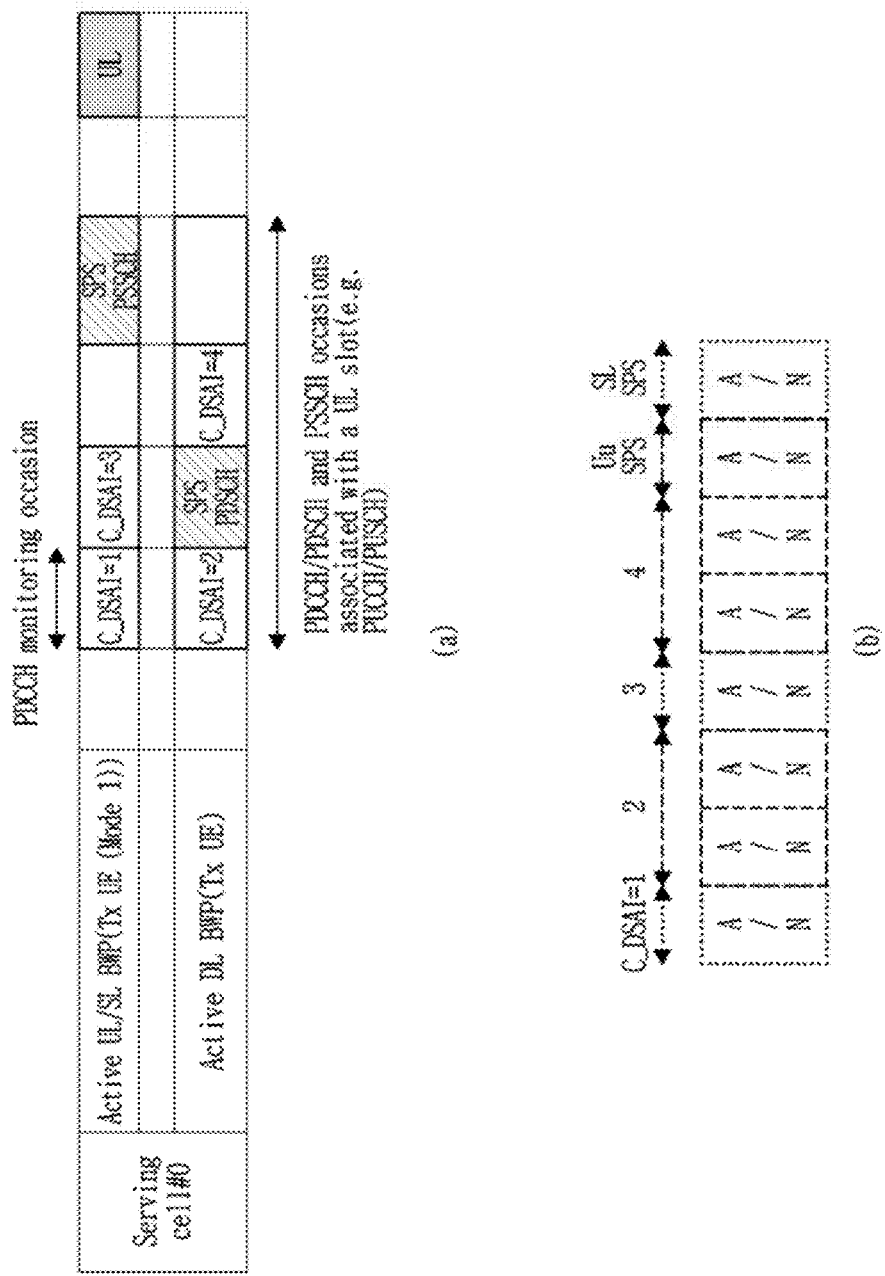
FIG. 21 illustrates an example of dynamically determining a sidelink HARQ codebook by considering all of a Physical Downlink Control Channel (PDCCH) monitoring occasion for a sidelink and a PDCCH monitoring occasion for a downlink.

Referring to FIG. 21, C_DAI and C_SAI may be integrally counted in a single serving cell. Referring to part (a) of FIG. 21, a Tx wireless user device (e.g., the Tx UE) configured with mode 1 may perform an uplink HARQ transmission by defining, in each of a DCI format and an SL DCI format, a Counter_Downlink and sidelink assignment indicator (C_DSAI) field as a common field with respect to scheduling allocation corresponding to PDSCH/PDSCH SPS release on a Uu link and scheduling allocation corresponding to unicast or groupcast (HARQ enable) PSSCH/PSSCH SPS release on a sidelink. Downlink HARQ feedback composition and sidelink HARQ feedback composition may be accumulatively counted by the same value. Referring to part (b) of FIG. 21, if C_DSAI=1, a sidelink HARQ feedback information bit may be configured. If C_DSAI=2, downlink HARQ feedback information bits may be configured. As described above, counting may be performed using the same value, and the sidelink HARQ feedback information bit and the downlink HARQ feedback information bits may be alternately present (e.g., which differs from configurations shown in FIGS. 18 and 20). If SPS transmission is present in a timing occasion associated with the uplink slot, it may be allocated at the end of a HARQ codebook determined based on DAI/SAI.

Only a number of scheduling for PSSCH transmission may not be counted to define a K value in the above Table 15. The K value may be acquired by integrally counting PDSCH/PDCCH indicating PDSCH SPS release and PSSCH/PDCCH indicating PSSCH SPS release for each serving cell and PDCCH monitoring occasion and may be used to perform sidelink HARQ bit ordering. As described above, Uu HARQ and SL HARQ feedback information bits may be discontinuously allocated and thereby transmitted to the base station.

Figure 22:
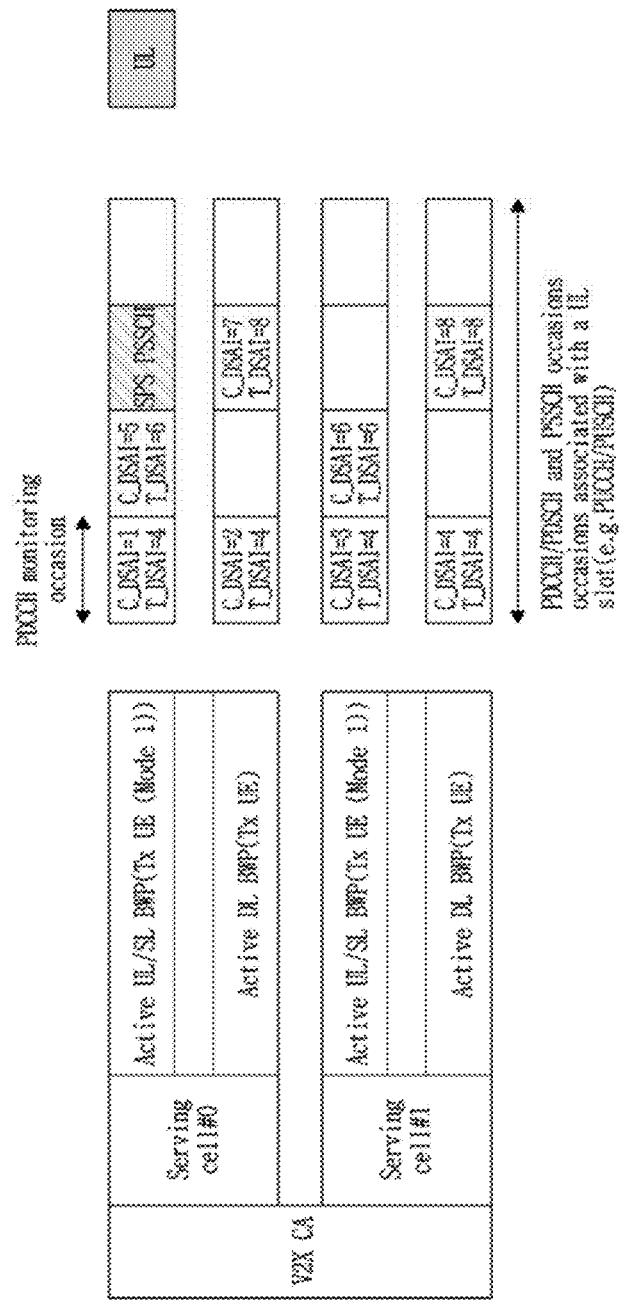
FIG. 22 illustrates an example of dynamically determining a sidelink HARQ codebook if a subcarrier spacing (SCS) of an active DL bandwidth part (BWP) differs from that of an active SL BWP.

FIG. 22 illustrates a case in which C_DAI and C_SAI are integrally counted in a single serving cell based on a sidelink multicarrier. Referring to FIG. 22, a Tx wireless user device (e.g., the Tx UE) configured with mode 1 may perform an uplink HARQ transmission by defining, in each of a DCI format and an SL DCI format, a C_DSAI field as a common field with respect to scheduling allocation corresponding to PDSCH/PDSCH SPS release on a Uu link and scheduling allocation corresponding to unicast or groupcast (HARQ enable) PSSCH/PSSCH SPS release on a sidelink. If the sidelink operates based on the multicarrier, a Total Downlink and sidelink assignment indicator (T DSAI) field may be defined in each of the DCI format and the SL DCI format.

Figure 23:
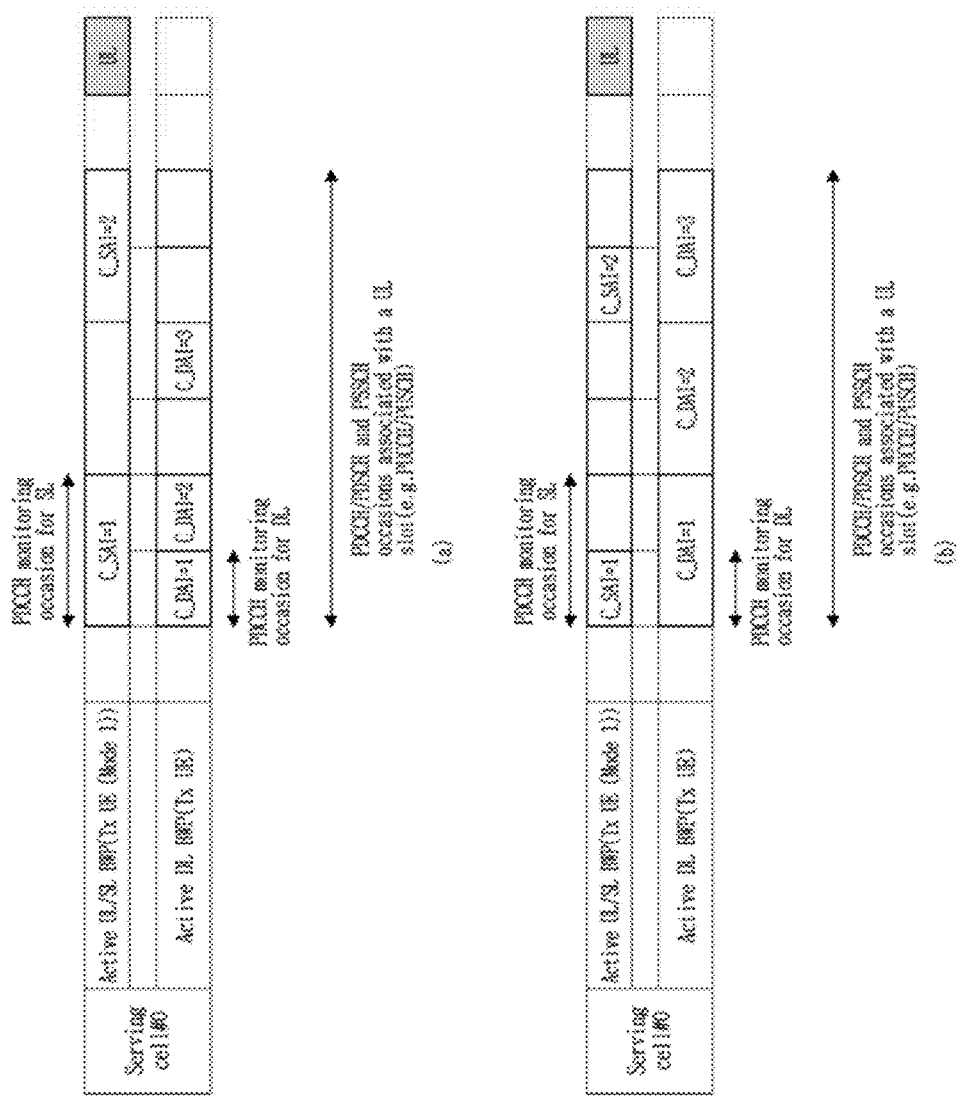
FIG. 23 illustrates an example of dynamically determining a sidelink HARQ codebook if an SCS of an active DL BWP differs from that of an active SL BWP.
Figure 24:
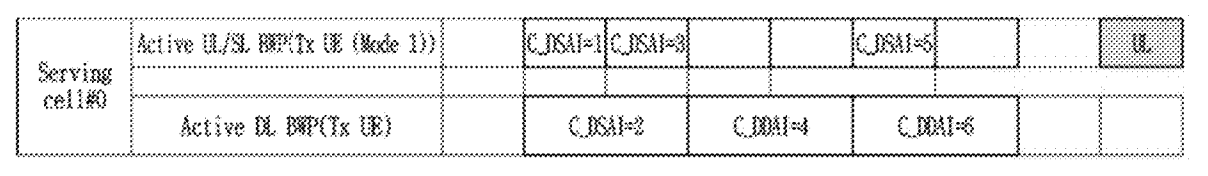

A case in which an SCS of an active DL BWP and an SCS of an active SL BWP differ from each other may be considered. Referring to FIGS. 23 and 24, a time length of a PDCCH monitoring occasion for SL and a time length of a PDCCH monitoring occasion for DL may differ from each other. C_SAI, D_SAI and C_DSAI values may increase starting from an occasion that is located first in time and other operations are described above. Referring to parts (a) and (b) of FIG. 23, a C_SAI value and a D_SAI value may be separated from each other and may be separately counted. Referring to FIG. 24, a C_SAI value and a D_SAI value may be integrated and used as a single C_DSAI value. The C_DSAI value may be counted based on an occasion that is located first in time in a PDCCH monitoring occasion for SL and a PDCCH monitoring occasion for DL.

Figure 25:
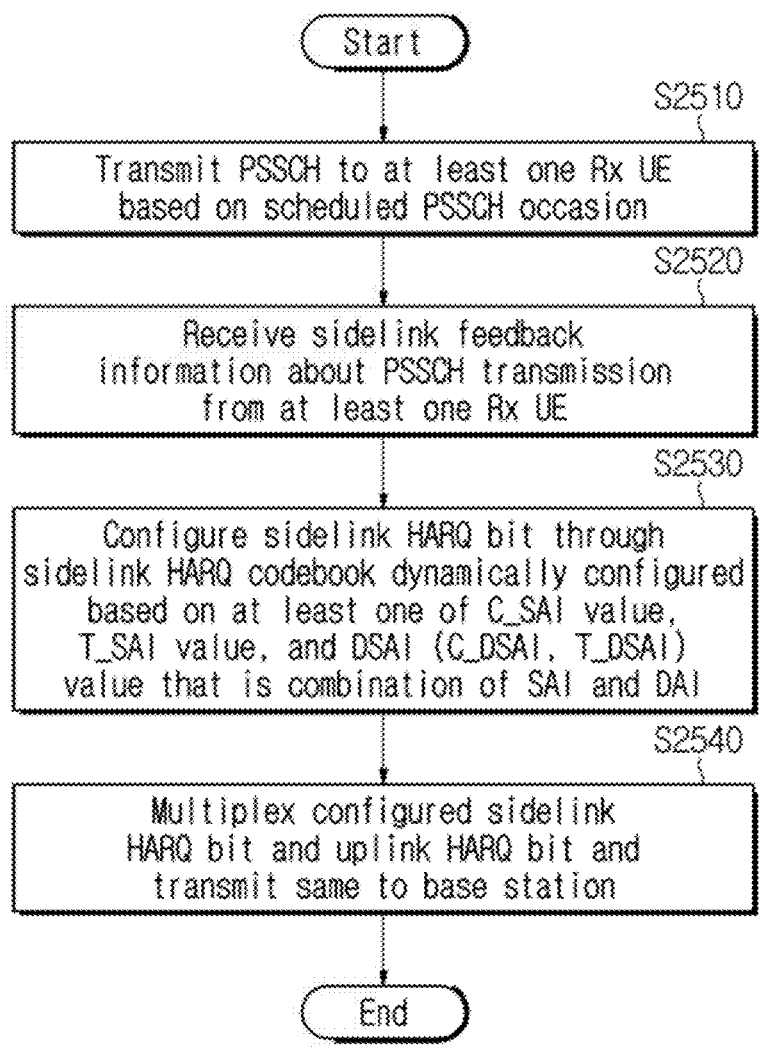
FIG. 25 is a flowchart illustrating an example of dynamically determining a sidelink HARQ codebook.

FIG. 25 is a flowchart illustrating an example of a method of reporting, by a wireless user device, sidelink HARQ feedback to a base station based on a sidelink HARQ codebook. Referring to FIG. 25, the Tx wireless user device (e.g., the Tx UE) may transmit a PSSCH to at least one Rx wireless user device (e.g., the Rx UE) based on a scheduled PSSCH occasion (S2510). The wireless user device (e.g., the Tx UE) may refer to a wireless user device that performs sidelink communication based on a resource allocated from the base station based on mode 1. The wireless user device (e.g., the Tx UE) may receive sidelink feedback information about the PSSCH transmission from the at least one Rx wireless user device (e.g., the Rx UE) (S2520). The wireless user device (e.g., the Tx UE) may receive sidelink HARQ feedback information through a PSFCH associated with the PSSCH occasion. The wireless user device (e.g., the Tx UE) may receive sidelink HARQ feedback information based on a cast type. Sidelink HARQ bit information may differ depending on whether sidelink HARQ feedback information is single TB-based feedback information or CBG-based feedback information. The sidelink HARQ bit information may differ based on TB/CBG-based sidelink scheduling, the SCS ratio between active BWPs of different NR/SL links, TDD UL-DL configuration, and sidelink CA/DC configuration status. In the case of groupcast, the sidelink HARQ bit information may differ based on a number of Rx wireless user devices (e.g., the Rx UEs) or a predetermined fixed value. For the aforementioned Option 1, if the Tx wireless user device (e.g., the Tx UE) receives NACK from at least one Rx wireless user device (e.g., an Rx UE), the Tx wireless user device (e.g., the Tx UE) may map sidelink HARQ feedback to NACK. The sidelink HARQ feedback may include a single bit, which is similar to unicast. For the aforementioned Option 2, the Tx wireless user device (e.g., the Tx UE) may receive ACK/NACK from each of Rx wireless user devices (e.g., the Rx UEs). Regardless of the options, in the case of groupcast, the sidelink HARQ bit information may be generated based on a fixed K bit value at all times. A number of bits for sidelink HARQ feedback may differ based on the number of Rx wireless user device (e.g., the Rx UEs) or the fixed value. The wireless user device (e.g., the Tx UE) may configure a sidelink HARQ bit through a sidelink HARQ codebook dynamically configured based on at least one of a C_SAI value, a T_SAI value, and a DSAI (C_DSAI, T DSAI) value that is a combination of SAI and DAI (S2530). The C_SAI value may indicate an accumulative number of unicast or groupcast PSSCH scheduling allocations up to a current sidelink PDCCH monitoring occasion, including each SL DCI. The T_SAI value may be configured by considering a sidelink multicarrier. The sidelink HARQ codebook may add a number of sidelink HARQ feedback information bits by considering a scheduled PSSCH every time the C_SAI value increases. For example, the T_SAI value may be provided to the Tx wireless user device (e.g., the Tx UE) by refreshing a total accumulative number of PSSCH scheduling up to a current PDCCH occasion, per a PDCCH occasion. The wireless user device (e.g., the Tx UE) may multiplex the configured sidelink HARQ bit and uplink HARQ bit and transmit the same to the base station (S2540).

Figure 26:
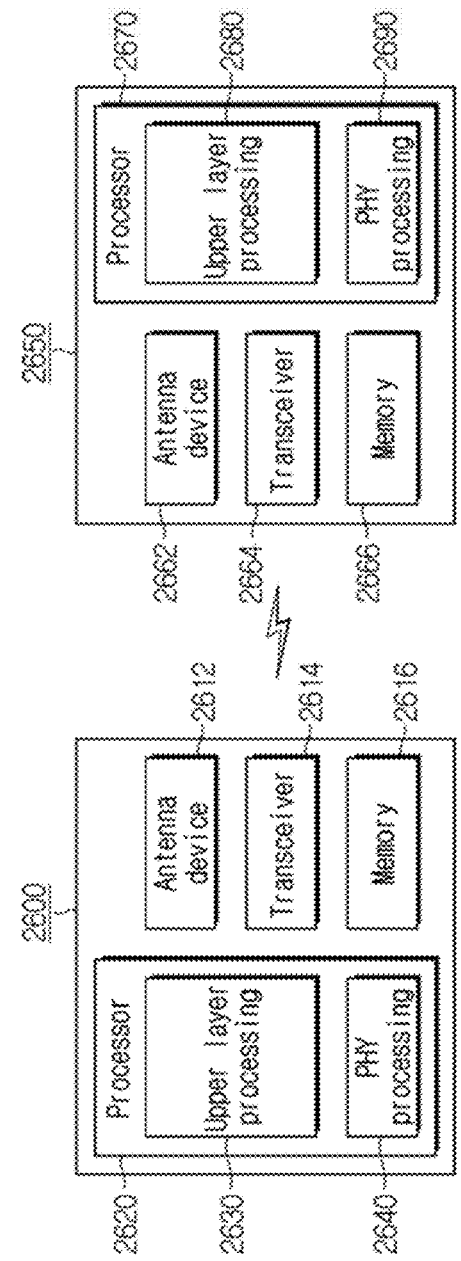
FIG. 26 is a diagram illustrating an example configuration of a base station device and a terminal device.

FIG. 26 illustrates a base station device and a terminal device (e.g., a wireless user device, a UE, etc.). Referring to FIG. 26, a base station device 2600 may include a processor 2620, an antenna device 2612, a transceiver 2614, and a memory 2616.

The processor 2620 may perform baseband related signal processing and may include an upper layer processing 2630 and a physical (PHY) layer processing 2640. The upper layer processing 2630 may process an operation of a Medium Access Control (MAC) layer, a Radio Resource Control (RRC) layer, or more upper layers. The PHY layer processing 2640 may process an operation (e.g., uplink received signal processing and downlink transmission signal processing) of a PHY layer. The processor 2620 may perform the overall operation of the base station device 2600 in addition to performing baseband related signal processing.

The antenna device 2612 may include at least one PHY antenna. If the antenna device 2612 includes a plurality of antennas, Multiple Input Multiple Output (MIMO) transmission and reception may be supported. The transceiver 2614 may include a radio frequency (RF) transmitter and an RF receiver. The memory 2616 may include operation processed information of the processor 2620, software associated with an operation of the base station device 2600, an operating system (OS), an application, etc., and may include a component, for example, a buffer.

The processor 2620 of the base station device 2600 may be configured to implement an operation of a base station described herein. The terminal device 2650 may include a processor 2670, an antenna device 2662, a transceiver 2664, and a memory 2666. Communication between the terminal devices 2650 may be performed based on sidelink communication. Each terminal device 2650 performing sidelink communication may refer to a device that performs sidelink communication with another terminal device 2650 in addition to the base station device 2600.

The processor 2670 may perform baseband-related signal processing and may include an upper layer processing 2680 and a PHY layer processing 2690. The upper layer processing 2680 may process an operation of a MAC layer, an RRC layer, or more upper layers. The PHY layer processing 2690 may process an operation (e.g., downlink received signal processing and uplink transmission signal processing) of a PHY layer. The processor 2670 may control the overall operation of the terminal device 2650 in addition to performing baseband-related signal processing.

The antenna device 2662 may include at least one PHY antenna. If the antenna device 2662 includes a plurality of antennas, MIMO transmission and reception may be supported. The transceiver 2664 may include an RF transmitter and an RF receiver. The memory 2666 may store operation processed information of the processor 2670, software associated with an operation of the terminal device 2650, an OS, an application, etc., and may include a component, for example, a buffer. The processor 2670 of the terminal device 2650 may be configured to implement an operation of a wireless user device described herein.

The processor 2620 of the base station 2600 may transmit, via RRC signaling, configuration information to the terminal device (e.g., a wireless user device). The configuration information may comprise information required to transmit sidelink HARQ feedback information to the base station 2600. The processor 2620 of the base station device 2600 may indicate to a terminal device one or plural uplink slot configuration information associated with a PSFCH occasion. The processor 2620 of the base station device 2600 may transmit SL DCI to the terminal device. The SL DCI may include at least one of a C_SAI value and a C_DSAI value.

The processor 2670 of the terminal device 2650 may transmit a PSSCH to at least one another terminal device based on a scheduled PSSCH occasion. The processor 2670 of the terminal device 2650 may receive feedback information about the PSSCH transmission from the at least one other terminal device. The processor 2670 of the terminal device 2650 may configure a sidelink HARQ bit through a sidelink HARQ codebook configured based on at least one of a PSSCH/PSFCH occasion associated with an uplink slot, a sidelink data transmission type within the PSSCH occasion, and an associated sidelink HARQ report scheme. The processor 2670 of the terminal device 2650 may multiplex the configured sidelink HARQ bit and uplink HARQ bit and transmit the same to the base station device 2600.

The processor 2670 of the terminal device 2650 may transmit the PSSCH to at least one another terminal device based on the scheduled PSSCH occasion. The processor 2670 of the terminal device 2650 may receive feedback information about the PSSCH transmission from the at least one other terminal device. The processor 2670 of the terminal device 2650 may configure a sidelink HARQ bit through a sidelink HARQ codebook dynamically configured based on the C_SAI value. The processor 2670 of the terminal device 2650 may multiplex the configured sidelink HARQ bit and uplink HARQ bit and transmit the same to the base station device 2600.

In addition to the feature described above, the base station and the wireless user device may implement one or more features described hereinafter. The base station may transmit to the wireless user device, one or more radio resource control (RRC) signals indicating one or more parameters associated with sidelink communication between wireless user devices. The sidelink communication may be configured as semi-static sidelink configuration (e.g., type 1 SL HARQ codebook). The one or more parameters may comprise a set of slot timing values (e.g., {1, 2, 3, 4, 5, 6, 7, 8}). The base station may transmit sidelink downlink control information (SL DCI) comprising a first indicator field that indicates a sidelink hybrid automatic repeat request (HARQ) feedback timing. A value of the first indicator field may comprise one of the set of slot timing values. The wireless user device may transmit, based on the SL DCI, to one or more second wireless user devices, a plurality of sidelink signals via a first quantity of sidelink channel resources (e.g., a first quantity of sidelink channel occasions, such as PSCCH occasions and PSSCH occasions). The wireless user device may receive, during a first time interval and from the one or more second wireless user devices, first sidelink HARQ feedback information responsive to the plurality of sidelink signals. The wireless user device may determine, based on the sidelink HARQ feedback timing and based on the first time interval, a second time interval to transmit the first sidelink HARQ feedback information to the base station. The wireless user device may determine, based on the first quantity, a sidelink HARQ codebook (e.g., a size of the sidelink HARQ codebook). The wireless user device may transmit, during the second time interval and based on the sidelink HARQ codebook and to the base station, an uplink signal indicating the first sidelink HARQ feedback information.

The base station may transmit, to the wireless user device, second SL DCI comprising a second indicator field that indicates a second sidelink HARQ feedback timing. A value of the second SL DCI may comprise another one of the set of slot timing values. The wireless user device may transmit, based on the second SL DCI, a plurality of second sidelink signals via a second quantity of second sidelink channel resources. The plurality of second sidelink signals may be transmitted to the one or more second wireless user devices or any other wireless user devices. The wireless user device may receive, during a third time interval, second sidelink HARQ feedback information responsive to the plurality of second sidelink signals. The wireless user device may determine, based on the second sidelink HARQ feedback timing and based on the third time interval, the second time interval to transmit the second sidelink HARQ feedback information. The determining the sidelink HARQ codebook (e.g., the size of the sidelink HARQ codebook) may be further based on the second quantity. The uplink signal may further indicate the second sidelink HARQ feedback information. The first sidelink HARQ feedback information and the second sidelink HARQ feedback information may be multiplexed in the uplink signal. A value of the first indicator field may correspond to a slot timing value between the first time interval and the second time interval. The first time interval may correspond to a physical sidelink feedback channel (PSFCH) occasion and the second time interval may correspond to a physical uplink control channel (PUCCH) slot. The one or more parameters may indicate information of a set of slot timing values, $K_{SL}$. Each slot timing value may indicate a timing between a physical sidelink feedback channel (PSFCH) occasion and a physical uplink control channel (PUCCH) slot. The PUCCH slot may comprise the second time interval. The determining the sidelink HARQ codebook may comprise determining, based on the set of slot timing values, $K_{SL}$, the sidelink HARQ codebook (e.g., the size of the sidelink HARQ codebook). The determining the sidelink HARQ codebook may comprise determining, based on a ratio between a sidelink subcarrier spacing (SCS) configuration and an uplink SCS configuration, the sidelink HARQ codebook (e.g., the size of the sidelink HARQ codebook). The determining the sidelink HARQ codebook may comprise determining, based on a time resource associated with a physical sidelink feedback channel (PSFCH) (e.g., a period of a PSFCH time resource), the sidelink HARQ codebook (e.g., the size of the sidelink HARQ codebook). The wireless user device may sort, based on a descending order of slot timing values indicated by the one or more parameters, sidelink HARQ feedback information bits, and may generate, based on the sorting, the uplink signal. The first time interval may correspond to a physical sidelink feedback channel (PSFCH) reception slot. The second time interval may correspond to an uplink slot (e.g., a PUCCH slot) or a slot comprising one or more uplink symbols. The determining the sidelink HARQ codebook may comprise determining, based on a quantity of physical sidelink feedback channel (PSFCH) occasions associated with the uplink signal, the sidelink HARQ codebook (e.g., the size of the sidelink HARQ codebook). The plurality of sidelink signals may comprise a first sidelink signal transmitted to a wireless user device for which a sidelink HARQ feedback is disabled. The wireless user device may determine, based on determining that the sidelink HARQ feedback is disabled for the wireless user device and based on determining that a retransmission of a sidelink channel (e.g., a PSSCH and/or a PSCCH) is not required, a positive acknowledgment for the first sidelink signal. The wireless user device may determine a positive acknowledgement associated with a scheduled sidelink channel resource of the first quantity of sidelink channel resources. The wireless user device may not transmit a sideilnk signal via the scheduled sidelink channel resource.

The base station may transmit, to the wireless user device, sidelink downlink control information (SL DCI) associated with transmission of one or more sidelink signals. The wireless user device may transmit, based on the SL DCI and to one or more second wireless user devices, the one or more sidelink signals via a first quantity of sidelink channel resources. The wireless user device may receive, during a first time interval and from the one or more second wireless user devices, first sidelink HARQ feedback information responsive to the one or more sidelink signals. The wireless user device may determine, based on a sidelink HARQ feedback timing and based on the first time interval, a second time interval to transmit the first sidelink HARQ feedback information. The wireless user device may determine, based on the first quantity, a sidelink HARQ codebook (e.g., the size of the sidelink HARQ codebook). The wireless user device may transmit, during the second time interval, based on the sidelink HARQ codebook, and to the base station, an uplink signal indicating the first sidelink HARQ feedback information.

The base station may transmit, to the wireless user device, one or more radio resource control (RRC) signals indicating one or more parameters associated with sidelink communication between wireless user devices. The one or more parameter may comprise information of a set of slot timing values, $K_{SL}$. The SL DCI may comprise a first indicator field that comprises one of the set of slot timing values, $K_{SL}$, to indicate the sidelink HARQ feedback timing. The base station may transmit, to the wireless user device, second SL DCI associated with transmission of one or more second sidelink signals. The second SL DCI may comprise a second indicator field that indicates a second sidelink HARQ feedback timing. The wireless user device may transmit, based on the second SL DCI, one or more second sidelink signals via a second quantity of second sidelink channel resources. The wireless user device may receive, during a third time interval, second sidelink HARQ feedback information responsive to the one or more second sidelink signals. The wireless user device may determine, based on the second sidelink HARQ feedback timing and based on the third time interval, the second time interval to transmit the second sidelink HARQ feedback information. The determining the sidelink HARQ codebook may be further based on the second quantity. The uplink signal may further indicate the second sidelink HARQ feedback information. The determining the sidelink HARQ codebook may comprise determining, based on a quantity of physical sidelink feedback channel (PSFCH) occasions associated with the uplink signal, a size of the sidelink HARQ codebook (e.g., the size of the sidelink HARQ codebook). The one or more sidelink signals may comprise a first sidelink signal transmitted to a wireless user device for which a sidelink HARQ feedback is disabled. The wireless user device may determine, based on determining that the sidelink HARQ feedback is disabled for the wireless user device and based on determining that a retransmission of a sidelink channel (e.g., a PSSCH and/or a PSCCH) is not required, a positive acknowledgment for the first sidelink signal. The wireless user device may determine a positive acknowledgement associated with a scheduled sidelink channel resource of the first quantity of sidelink channel resources. The wireless user device may not transmit a sideilnk signal via the scheduled sidelink channel resource.

The base station may transmit to the wireless user device, one or more radio resource control (RRC) signals indicating one or more parameters associated with sidelink communication between wireless user devices. The sidelink communication may be configured as dynamic sidelink configuration (e.g., type 2 SL HARQ codebook). The one or more parameters may comprise a set of slot timing values (e.g., {1, 2, 3, 4, 5, 6, 7, 8}). The base station may transmit first sidelink downlink control information (SL DCI) comprising a first indicator field that indicates a sidelink hybrid automatic repeat request (HARQ) feedback timing and first counter SAI indicating a first value (e.g., 1). The base station may transmit second SL DCI comprising a second indicator field that indicates a second HARQ feedback timing and second counter SAI indicating a second value (e.g., 2). The base station may transmit third SL DCI comprising a third indicator field that indicates a third HARQ feedback timing and third counter SAI indicating a third value (e.g., 3). One or more additional SL DCI may be transmitted by the base station to the wireless user device by incrementing the counter SAI value of the one or more additional SL DCI (e.g., by one). The values of the first indicator field, the second indicator field, and the third indicator field may comprise one of the set of slot timing values. The wireless user device may transmit, based on the first SL DCI, to one or more second wireless user devices, a first sidelink signal via a first sidelink channel resource (e.g., a first sidelink channel occasion, such as a PSCCH occasion and a PSSCH occasion). The wireless user device may transmit, based on the second SL DCI, to one or more second wireless user devices, a second sidelink signal via a second sidelink channel resource (e.g., a second sidelink channel occasion, such as a PSCCH occasion and a PSSCH occasion). The wireless user device may receive, during a first time interval (e.g., a first PSFCH occasion) and from one or more second wireless user devices, first sidelink HARQ feedback information responsive to the first and second sidelink signals. The association between the first sidelink channel resource and the first PSFCH occasion may be determined, for example, based on the first SL DCI. The association between the first sidelink channel resource and the first PSFCH occasion may be determined, for example, based on a configuration of a PSFCH time resource (e.g., a PSFCH time resource period) and a scheduled location of the first sidelink channel resource (e.g., a first PSSCH occasion). The association between the second sidelink channel resource and the first PSFCH occasion may be determined, for example, based on the second SL DCI. The association between the second sidelink channel resource and the first PSFCH occasion may be determined, for example, based on a configuration of a PSFCH time resource (e.g., a PSFCH time resource period) and a scheduled location of the second sidelink channel resource (e.g., a second PSSCH occasion). The wireless user device may transmit, to one or more second wireless user devices, a third sidelink signal via a third sidelink channel resource (e.g., a third sidelink channel occasion). The third sidelink signal may be a sidelink signal based on SPS (e.g., PSSCH SPS). The sidelink signal based on SPS may be configured by one or more RRC messages, and DCI activating one or more PSSCH SPS transmissions may be transmitted from the base station to the wireless user device. Upon the SPS activation, a plurality of PSSCH SPS may be transmitted periodically via a plurality of PSSCH occasions. The wireless user device may transmit, based on the third SL DCI, to one or more second wireless user devices, a fourth sidelink signal via a fourth sidelink channel resource (e.g., a fourth sidelink channel occasion, such as a PSCCH occasion and a PSSCH occasion). The wireless user device may receive, during a second time interval (e.g., a second PSFCH occasion) and from one or more second wireless user devices, second sidelink HARQ feedback information responsive to the third and fourth sidelink signals. The association between the third sidelink channel resource and the second PSFCH occasion may be determined, for example, based on an RRC message configuring one or more PSSCH SPS occasions and a configuration of a PSFCH time resource (e.g., a PSFCH time resource period). The association between the fourth sidelink channel resource and the second PSFCH occasion may be determined, for example, based on the third SL DCI. The association between the fourth sidelink channel resource and the second PSFCH occasion may be determined, for example, based on a configuration of a PSFCH time resource (e.g., a PSFCH time resource period) and a scheduled location of the fourth sidelink channel resource (e.g., a fourth PSSCH occasion). The first HARQ feedback timing indicates a timing between the first PSFCH occasion and a third time interval (e.g., a PUCCH slot). The second HARQ feedback timing indicates a timing between the first PSFCH occasion and the third time interval. The third HARQ feedback timing indicates a timing between the second PSFCH occasion and the third time interval.

The wireless user device may determine, based on the first, second, third sidelink HARQ feedback timings and based on the first time interval and the second time interval, the third time interval to transmit sidelink HARQ feedback information indicating the first sidelink HARQ feedback information and the second sidelink HARQ feedback information to the base station. The wireless user device may determine, based on the quantity of the sidelink channel occasions associated with the third interval, a sidelink HARQ codebook (e.g., a size of the sidelink HARQ codebook). The size of the sidelink HARQ codebook may be determined based on the total counter SAI value (e.g., 3). The size of the sidelink HARQ codebook may be incremented by one, for example, if an ACK/NACK for the PSSCH SPS is reported. The wireless user device may determine the size of the HARQ codebook (e.g., 3+1=4). The sidelink HARQ ACK/NACK bits may be sorted, for example, based on lower counter SAI value or higher slot timing value, (e.g., the $K_{SL}$ value). The wireless user device may transmit, during the third time interval and based on the sidelink HARQ codebook and to the base station, an uplink signal indicating the first sidelink HARQ feedback information and the second sidelink HARQ feedback information. The SAI field in each of the first, second, third SL DCI may include a 2-bit value. The value may be determined based on the examples described herein (e.g., Table 15). The wireless user device may determine one or more PSFCH occasions associated with a PUCCH slot in which HARQ feedback information is transmitted to the base station. The wireless user device may determine one or more PSSCH occasions associated with a PSFCH occasion. The wireless user device may determine a PDCCH occasion associated with a PSSCH occasion. SL DCI indicating a PSSCH transmission in the PSSCH occasion may be transmitted via the PDCCH occasion.

This disclosure is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects literally described herein but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving, by a wireless user device from a base station, one or more radio resource control (RRC) signals indicating one or more parameters associated with sidelink communication between wireless user devices;
   receiving, from the base station, sidelink downlink control information (SL DCI) comprising a first indicator field that indicates a sidelink hybrid automatic repeat request (HARQ) feedback timing;
   based on the SL DCI, transmitting, to one or more second wireless user devices, a plurality of sidelink signals via a first quantity of sidelink channel resources;
   during a first time interval, receiving, from the one or more second wireless user devices, first sidelink HARQ feedback information responsive to the plurality of sidelink signals;
   determining, based on the sidelink HARQ feedback timing and based on the first time interval, a second time interval;
   receiving, from the base station, second SL DCI comprising a second indicator field that indicates a second sidelink HARQ feedback timing;
   based on the second SL DCI, transmitting a plurality of second sidelink signals via a second quantity of second sidelink channel resources;
   during a third time interval, receiving second sidelink HARQ feedback information responsive to the plurality of second sidelink signals;
   determining, based on the second sidelink HARQ feedback timing and based on the third time interval, the second time interval to transmit the second sidelink HARQ feedback information;
   determining, based on the first quantity and the second quantity, a sidelink HARQ codebook; and
   during the second time interval and based on the sidelink HARQ codebook, transmitting, to the base station, an uplink signal indicating:
   the first sidelink HARQ feedback information; and
   the second sidelink HARQ feedback information.

2. The method of claim 1, wherein the first sidelink HARQ feedback information and the second sidelink HARQ feedback information are multiplexed in the uplink signal.

3. The method of claim 1, wherein a value of the first indicator field corresponds to a slot timing value between the first time interval and the second time interval, and wherein the first time interval corresponds to a physical sidelink feedback channel (PSFCH) occasion and the second time interval corresponds to a physical uplink control channel (PUCCH) slot.

4. The method of claim 1, wherein the one or more parameters indicates information of a set of slot timing values, $K_{SL}$, wherein each slot timing value indicates a timing between a physical sidelink feedback channel (PSFCH) occasion and a physical uplink control channel (PUCCH) slot, and wherein the PUCCH slot comprises the second time interval.

5. The method of claim 4, wherein the determining the sidelink HARQ codebook comprises determining, based on the set of slot timing values, $K_{SL}$, the sidelink HARQ codebook.

6. The method of claim 1, wherein the determining the sidelink HARQ codebook comprises determining, based on a ratio between a sidelink subcarrier spacing (SCS) configuration and an uplink SCS configuration, the sidelink HARQ codebook.

7. The method of claim 1, wherein the determining the sidelink HARQ codebook comprises determining, based on a period of a physical sidelink feedback channel (PSFCH) time resource, the sidelink HARQ codebook.

8. The method of claim 1, further comprising:
   based on a descending order of slot timing values indicated by the one or more parameters, sorting sidelink HARQ feedback information bits; and
   generating, based on the sorting, the uplink signal.

9. The method of claim 1, wherein:
   the first time interval corresponds to a physical sidelink feedback channel (PSFCH) reception slot; and
   the second time interval corresponds to an uplink slot or a slot comprising one or more uplink symbols.

10. The method of claim 1, wherein the determining the sidelink HARQ codebook comprises determining, based on a quantity of physical sidelink feedback channel (PSFCH) occasions associated with the uplink signal, the sidelink HARQ codebook.

11. The method of claim 1, wherein the plurality of sidelink signals comprise a first sidelink signal transmitted to a wireless user device for which a sidelink HARQ feedback is disabled, and wherein the method further comprises: based on the sidelink HARQ feedback being disabled for the wireless user device and based on a retransmission of a sidelink channel being not required, determining a positive acknowledgment for the first sidelink signal.

12. The method of claim 1, further comprising:
determining a positive acknowledgement associated with a scheduled sidelink channel resource of the first quantity of sidelink channel resources,
wherein the wireless user device does not transmit a sideilnk signal via the scheduled sidelink channel resource.

13. A method comprising:
receiving, by a wireless user device from a base station, sidelink downlink control information (SL DCI) associated with transmission of one or more sidelink signals;
based on the SL DCI, transmitting, to one or more second wireless user devices, the one or more sidelink signals via a first quantity of sidelink channel resources;
during a first time interval, receiving, from the one or more second wireless user devices, first sidelink HARQ feedback information responsive to the one or more sidelink signals;
determining, based on a sidelink HARQ feedback timing and based on the first time interval, a second time interval;
receiving, from the base station, second SL DCI associated with transmission of one or more second sidelink signals, wherein the second SL DCI comprises an indicator field that indicates a second sidelink HARQ feedback timing;
based on the second SL DCI, transmitting one or more second sidelink signals via a second quantity of second sidelink channel resources;
during a third time interval, receiving second sidelink HARQ feedback information responsive to the one or more second sidelink signals; and
determining, based on the second sidelink HARQ feedback timing and based on the third time interval, the second time interval to transmit the second sidelink HARQ feedback information;
determining, based on the first quantity and the second quantity, a sidelink HARQ codebook; and
during the second time interval and based on the sidelink HARQ codebook, transmitting, to the base station, an uplink signal indicating:
the first sidelink HARQ feedback information; and
the second sidelink HARQ feedback information.

14. The method of claim 13, further comprising receiving, from the base station, one or more radio resource control (RRC) signals indicating one or more parameters associated with sidelink communication between wireless user devices,
wherein the one or more parameters comprises information of a set of slot timing values, $K_{SL}$, and
wherein the SL DCI comprises a first indicator field that comprises one of the set of slot timing values, $K_{SL}$, to indicate the sidelink HARQ feedback timing.

15. The method of claim 13, wherein the determining the sidelink HARQ codebook comprises determining, based on a quantity of physical sidelink feedback channel (PSFCH) occasions associated with the uplink signal, a size of the sidelink HARQ codebook.

16. The method of claim 13, wherein the one or more sidelink signals comprise a first sidelink signal transmitted to a wireless user device for which a sidelink HARQ feedback is disabled, and wherein the method further comprises: based on the sidelink HARQ feedback being disabled for the wireless user device and based on a retransmission of a sidelink channel being not required, determining a positive acknowledgment for the first sidelink signal.

17. The method of claim 13, further comprising:
determining a positive acknowledgement associated with a scheduled sidelink channel resource of the first quantity of sidelink channel resources,
wherein the wireless user device does not transmit a sideilnk signal via the scheduled sidelink channel resource.

18. A method comprising:
receiving, by a wireless user device from a base station, one or more radio resource control (RRC) signals indicating one or more parameters associated with sidelink communication between wireless user devices;
receiving, from the base station, sidelink downlink control information (SL DCI) comprising a first indicator field that indicates a sidelink hybrid automatic repeat request (HARQ) feedback timing;
based on the SL DCI, transmitting, to one or more second wireless user devices, a plurality of sidelink signals via a first quantity of sidelink channel resources;
during a first time interval, receiving, from the one or more second wireless user devices, first sidelink HARQ feedback information responsive to the plurality of sidelink signals;
determining, based on the sidelink HARQ feedback timing and based on the first time interval, a second time interval;
determining, based on the first quantity, a sidelink HARQ codebook; and
during the second time interval and based on the sidelink HARQ codebook, transmitting, to the base station, an uplink signal indicating the first sidelink HARQ feedback information,
wherein the determining the sidelink HARQ codebook comprises determining, based on a ratio between a sidelink subcarrier spacing (SCS) configuration and an uplink SCS configuration, the sidelink HARQ codebook.

19. The method of claim 18, wherein the first sidelink HARQ feedback information and second sidelink HARQ feedback information are multiplexed in the uplink signal.

20. The method of claim 18, wherein a value of the first indicator field corresponds to a slot timing value between the first time interval and the second time interval, and wherein the first time interval corresponds to a physical sidelink feedback channel (PSFCH) occasion and the second time interval corresponds to a physical uplink control channel (PUCCH) slot.

21. The method of claim 18, wherein the one or more parameters indicates information of a set of slot timing values, $K_{SL}$,
wherein each slot timing value indicates a timing between a physical sidelink feedback channel (PSFCH) occasion and a physical uplink control channel (PUCCH) slot,
wherein the PUCCH slot comprises the second time interval, and
wherein the determining the sidelink HARQ codebook comprises determining, based on the set of slot timing values, $K_{SL}$, the sidelink HARQ codebook.

22. The method of claim 18, wherein the determining the sidelink HARQ codebook comprises determining, based on a period of a physical sidelink feedback channel (PSFCH) time resource, the sidelink HARQ codebook.

23. The method of claim 18, further comprising:
based on a descending order of slot timing values indicated by the one or more parameters, sorting sidelink HARQ feedback information bits; and
generating, based on the sorting, the uplink signal.

24. The method of claim 18, wherein:
the first time interval corresponds to a physical sidelink feedback channel (PSFCH) reception slot; and
the second time interval corresponds to an uplink slot or a slot comprising one or more uplink symbols.

25. The method of claim 18, wherein the determining the sidelink HARQ codebook comprises determining, based on a quantity of physical sidelink feedback channel (PSFCH) occasions associated with the uplink signal, the sidelink HARQ codebook.

26. The method of claim 18, wherein the plurality of sidelink signals comprise a first sidelink signal transmitted to a wireless user device for which a sidelink HARQ feedback is disabled, and
wherein the method further comprises: based on the sidelink HARQ feedback being disabled for the wireless user device and based on a retransmission of a sidelink channel being not required, determining a positive acknowledgment for the first sidelink signal.

27. The method of claim 18, further comprising:
determining a positive acknowledgement associated with a scheduled sidelink channel resource of the first quantity of sidelink channel resources,
wherein the wireless user device does not transmit a sideilnk signal via the scheduled sidelink channel resource.

28. A method comprising:
receiving, by a wireless user device from a base station, one or more radio resource control (RRC) signals indicating one or more parameters associated with sidelink communication between wireless user devices;
receiving, from the base station, sidelink downlink control information (SL DCI) comprising a first indicator field that indicates a sidelink hybrid automatic repeat request (HARQ) feedback timing;
based on the SL DCI, transmitting, to one or more second wireless user devices, a plurality of sidelink signals via a first quantity of sidelink channel resources;
during a first time interval, receiving, from the one or more second wireless user devices, first sidelink HARQ feedback information responsive to the plurality of sidelink signals;
determining, based on the sidelink HARQ feedback timing and based on the first time interval, a second time interval;
determining, based on the first quantity, a sidelink HARQ codebook;
based on a descending order of slot timing values indicated by the one or more parameters, sorting sidelink HARQ feedback information bits;
generating, based on the sorting, an uplink signal; and
during the second time interval and based on the sidelink HARQ codebook, transmitting, to the base station, the uplink signal, wherein the uplink signal indicates the first sidelink HARQ feedback information.

29. The method of claim 28, wherein the first sidelink HARQ feedback information and second sidelink HARQ feedback information are multiplexed in the uplink signal, wherein a value of the first indicator field corresponds to a slot timing value between the first time interval and the second time interval,
wherein the first time interval corresponds to a physical sidelink feedback channel (PSFCH) occasion and the second time interval corresponds to a physical uplink control channel (PUCCH) slot,
wherein the one or more parameters indicates information of a set of slot timing values, $K_{SL}$,
wherein each slot timing value indicates a timing between a physical sidelink feedback channel (PSFCH) occasion and a physical uplink control channel (PUCCH) slot,
wherein the PUCCH slot comprises the second time interval, and
wherein the determining the sidelink HARQ codebook comprises determining, based on the set of slot timing values, $K_{SL}$, the sidelink HARQ codebook.

30. The method of claim 28, wherein the determining the sidelink HARQ codebook comprises determining, based on a period of a physical sidelink feedback channel (PSFCH) time resource, the sidelink HARQ codebook,
wherein the first time interval corresponds to a physical sidelink feedback channel (PSFCH) reception slot, and
wherein the second time interval corresponds to an uplink slot or a slot comprising one or more uplink symbols.

31. The method of claim 28, further comprising:
determining a positive acknowledgement associated with a scheduled sidelink channel resource of the first quantity of sidelink channel resources,
wherein the wireless user device does not transmit a sideilnk signal via the scheduled sidelink channel resource, and
wherein the determining the sidelink HARQ codebook comprises determining, based on a quantity of physical sidelink feedback channel (PSFCH) occasions associated with the uplink signal, the sidelink HARQ codebook.

32. The method of claim 28, wherein the plurality of sidelink signals comprise a first sidelink signal transmitted to a wireless user device for which a sidelink HARQ feedback is disabled, and
wherein the method further comprises: based on the sidelink HARQ feedback being disabled for the wireless user device and based on a retransmission of a sidelink channel being not required, determining a positive acknowledgment for the first sidelink signal.

33. A method comprising:
receiving, by a wireless user device from a base station, one or more radio resource control (RRC) signals indicating one or more parameters associated with sidelink communication between wireless user devices;
receiving, from the base station, sidelink downlink control information (SL DCI) comprising a first indicator field that indicates a sidelink hybrid automatic repeat request (HARQ) feedback timing;
based on the SL DCI, transmitting, to one or more second wireless user devices, a plurality of sidelink signals via a first quantity of sidelink channel resources;
during a first time interval, receiving, from the one or more second wireless user devices, first sidelink HARQ feedback information responsive to the plurality of sidelink signals;
determining, based on the sidelink HARQ feedback timing and based on the first time interval, a second time interval;

determining, based on the first quantity, a sidelink HARQ codebook; and during the second time interval and based on the sidelink HARQ codebook, transmitting, to the base station, an uplink signal indicating the first sidelink HARQ feedback information, wherein the one or more parameters indicates information of a set of slot timing values, $K_{SL}$, wherein each slot timing value indicates a timing between a physical sidelink feedback channel (PSFCH) occasion and a physical uplink control channel (PUCCH) slot, wherein the PUCCH slot comprises the second time interval, and wherein the determining the sidelink HARQ codebook comprises determining, based on the set of slot timing values, $K_{SL}$, the sidelink HARQ codebook.

34. The method of claim 33, wherein the first sidelink HARQ feedback information and second sidelink HARQ feedback information are multiplexed in the uplink signal, wherein a value of the first indicator field corresponds to a slot timing value between the first time interval and the second time interval, and wherein the first time interval corresponds to a physical sidelink feedback channel (PSFCH) occasion and the second time interval corresponds to a physical uplink control channel (PUCCH) slot, wherein the first time interval corresponds to a physical sidelink feedback channel (PSFCH) reception slot, wherein the second time interval corresponds to an uplink slot or a slot comprising one or more uplink symbols, and wherein the determining the sidelink HARQ codebook comprises determining, based on a quantity of physical sidelink feedback channel (PSFCH) occasions associated with the uplink signal, the sidelink HARQ codebook.

\* \* \* \* \*